US011631014B2

(12) United States Patent
Stocker et al.

(10) Patent No.: US 11,631,014 B2
(45) Date of Patent: Apr. 18, 2023

(54) COMPUTER-BASED SYSTEMS CONFIGURED FOR DETECTING, CLASSIFYING, AND VISUALIZING EVENTS IN LARGE-SCALE, MULTIVARIATE AND MULTIDIMENSIONAL DATASETS AND METHODS OF USE THEREOF

(71) Applicant: Capital One Services, LLC, McLean, VA (US)

(72) Inventors: John C. Stocker, Alexandria, VA (US); Parth Shrotri, McLean, VA (US); Luke Botti, McLean, VA (US); Scott Jemielity, McLean, VA (US); Diana Yoo, McLean, VA (US); Mark Roberts, McLean, VA (US); Naga V. Gumpina, McLean, VA (US); Daniel Snipes, McLean, VA (US); Alan Rozet, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/945,393

(22) Filed: Jul. 31, 2020

(65) Prior Publication Data
US 2021/0034994 A1 Feb. 4, 2021

Related U.S. Application Data

(60) Provisional application No. 62/882,411, filed on Aug. 2, 2019.

(51) Int. Cl.
*G06N 5/04* (2006.01)
*G06F 16/28* (2019.01)
*G06N 20/00* (2019.01)

(52) U.S. Cl.
CPC ............. *G06N 5/04* (2013.01); *G06F 16/283* (2019.01); *G06N 20/00* (2019.01)

(58) Field of Classification Search
CPC ......... G06N 5/04; G06N 20/00; G06F 16/283
See application file for complete search history.

(56) References Cited

U.S. PATENT DOCUMENTS

| 2012/0137367 A1* | 5/2012 | Dupont ................... G06F 21/00 726/25 |
| 2016/0217022 A1* | 7/2016 | Velipasaoglu ...... G06F 11/0772 |

(Continued)

*Primary Examiner* — Kamran Afshar
*Assistant Examiner* — Ryan C Vaughn
(74) *Attorney, Agent, or Firm* — Greenberg Traurig, LLP

(57) ABSTRACT

Systems and methods of the present disclosure include at least one processor that receives a data set of a data stream from a data source, where the data set includes a time-varying data points. The processor determines event observations associated with data points of the time-varying data points based on a detection model to identify types of the event observations, including: i) anomalies, ii) change-points, iii) patterns, or iv) outliers. The processor generates anomaly records in an event data store based on the event observations and automatically generates event records for at least one of the anomaly records based on variables of at least one dimension of the time-varying data points, where the event record links one or more event observations. The processor automatically applies changes in the event record to each event observation of the one or more event observations based on the linking by the event record.

20 Claims, 42 Drawing Sheets

(56) References Cited

U.S. PATENT DOCUMENTS

| | | | |
|---|---|---|---|
| 2017/0277582 A1* | 9/2017 | Chen | H04L 43/045 |
| 2017/0277727 A1* | 9/2017 | Chen | G06F 16/2465 |
| 2017/0279694 A1* | 9/2017 | Sartran | H04L 41/14 |
| 2018/0174062 A1* | 6/2018 | Simo | G06N 3/0454 |
| 2018/0248903 A1* | 8/2018 | Villella | H04L 63/20 |
| 2018/0324199 A1* | 11/2018 | Crotinger | H04L 63/1425 |
| 2018/0367551 A1* | 12/2018 | Muddu | G06N 20/00 |
| 2019/0075126 A1* | 3/2019 | Muddu | H04L 43/045 |
| 2019/0081876 A1* | 3/2019 | Ghare | H04L 63/1408 |
| 2020/0351283 A1* | 11/2020 | Salunke | H04L 63/1425 |
| 2020/0387797 A1* | 12/2020 | Ryan | G06F 11/3058 |
| 2020/0394455 A1* | 12/2020 | Lee | G06K 9/6259 |

* cited by examiner

Explorer

Showing Anomalies in X a[...]
Segment A ▾, Metric B ▾ a[...]

☆ Anomaly #548
Juliet

Classification ⓘ

[ In    or    ▾ ]    Status: Cleared

Description

[                                    ]

Rating            Average: 4.5 (11 votes)

○  ①  ②  ③  ④  ⑤
No score  Mild           Severe

☐ Overrule average rating
Replaces the average rating with your specific rating.

⟲ History        Add to Event  [ Save ]
                 Show details >

FIG. 14

☆ Add to Event
3 anomalies selected

Event Name

Awesome Event ⌄

Classification

Input Data Error

Description

A standard description of awesome event that spans two lines of the available space.

Rating

4.5 average (11 votes)

Save

FIG. 20

Anomaly details for anomalies in Segment A, Metric B, and Number of Dogs.

| OPEN | BACKLOG | PENDING | CLEARED | RESOLVED |

| | # | ISSUER ▼ | VALUE |
|---|---|---|---|
| ☑ | 4810 | Alpha | $9.81 B |
| ☑ | 201 | Bravo | $400 M |
| ☑ | 958 | Charlie | $102 M |
| ☐ | 174 | Delta | $2.24 B |
| ☐ | 7437 | Echo | $10.2 B |

[Classify]  [Add to Event]  [Create Event]

FIG. 22

☆ Create Event
3 anomalies selected

Event Name

[ Something Catchy ]

Classification ⓘ

[ Input Data Error ▼ ]

Status: Cleared

Description

[                            ]

Rating          Average: 4.5 (11 votes)

○   ①   ②   ③   ④   ⑤
No score   Mild           Severe

☐ Overrule average rating
Replaces the average rating with your specific rating.

[ Save ]

⟲ History        Show details >

Events

| | NAME ▼ | CLASSIFICATION | DATE RANGE | # OF ANOMALIES |
|---|---|---|---|---|
| ☐ | This is the Event Name | Input Data Error | Aug. 1, 2019 - Dec. 12, 2019 | 20 |
| ☐ | This is the Event Name | Input Data Error | Aug. 1, 2019 - Dec. 12, 2019 | 20 |
| ☐ | This is the Event Name | Input Data Error | Aug. 1, 2019 - Dec. 12, 2019 | 20 |
| ☐ | This is the Event Name | Input Data Error | Aug. 1, 2019 - Dec. 12, 2019 | 20 |
| ☐ | This is the Event Name | Input Data Error | Aug. 1, 2019 - Dec. 12, 2019 | 20 |
| ☐ | This is the Event Name | Input Data Error | Aug. 1, 2019 - Dec. 12, 2019 | 20 |
| ☐ | This is the Event Name | Input Data Error | Aug. 1, 2019 - Dec. 12, 2019 | 20 |

[Merge Events] [Create Event]

FIG. 27

Add anomalies

1,204 anomalies selected based on filters below.

| Dataset | Anomaly Type |
|---|---|
| All ▾ | All ▾ |

| Segment | Metric |
|---|---|
| All ▾ | All ▾ |

| Relationship | Type |
|---|---|
| X ▾ | Y ▾ |

| Indicator | Group |
|---|---|
| All ▾ | All ▾ |

Date range

January 2019 ▾

Skip this step        Back    Next

FIG. 29

Merge Events

Select an event to merge into a second event. The anomalies from the first event will take on the classification of the new event they merged into.

Merge From Event

[ Select one ▾ ]

Merge To Event

[ Select one ▾ ]

[ Save ]

FIG. 32

This is the Event Name  ✕

ANOMALIES  DETAILS

Event Name

Something Catchy

Classification ⓘ

Input Data Error  ▾

Status: Cleared

Description

Rating  Average: 4.5 (11 votes)

◯ | ① ② ③ ④ ⑤
No score | Mild           Severe

☐ Overrule average rating
Replaces the average rating with your specific rating.

Save

FIG. 34

This is the Event Name ✕

ANOMALIES  DETAILS

| ☐ | # | GROUP ▼ | DATE |
|---|---|---------|------|
| ☑ | 4810 | Alpha | Aug. 8, 2019 |
| ☑ | 201 | Bravo | Aug. 8, 2019 |
| ☑ | 958 | Charlie | Aug. 8, 2019 |
| ☐ | 174 | Delta | Aug. 8, 2019 |
| ☐ | 7437 | Echo | Aug. 8, 2019 |

Remove from Event    [ Create Event ]    [ Add to ]

FIG. 35

COMPUTER-BASED SYSTEMS CONFIGURED FOR DETECTING, CLASSIFYING, AND VISUALIZING EVENTS IN LARGE-SCALE, MULTIVARIATE AND MULTIDIMENSIONAL DATASETS AND METHODS OF USE THEREOF

RELATED APPLICATIONS

This application claims benefit of U.S. Provisional Patent Application No. 62/882,411, filed Aug. 2, 2019, entitled "Systems Configured for Detecting, Classifying, and Visualizing Events in Large-Scale, Multivariate and Multidimensional Datasets and Methods Thereof".

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC., All Rights Reserved.

FIELD OF TECHNOLOGY

The present disclosure generally relates to computer-based systems configured for one or more novel technological applications of detecting, classifying, and visualizing events in large-scale, multivariate and multidimensional datasets and methods thereof.

BACKGROUND OF TECHNOLOGY

A computer network system may include a group of computers (e.g., clients, servers, smart routers (e.g., trading smart routers)) and other computing hardware devices that are linked together through one or more communication channels to facilitate communication and/or resource-sharing, via one or more specifically programmed graphical user interfaces (GUIs) of the present disclosure, among a wide range of users. Collection of data from computer network systems can provide large datasets of multivariate and multidimensional data. Finding events in the data, such as anomalies, and classifying the anomalies in an efficient, accurate and user-friendly manner can be difficult. Typically, event detection and classification is limited to merely representing data as either an event or not. Such solutions provide little value in diagnosing root causes and patterns.

SUMMARY OF THE DESCRIPTION

An embodiment of the present invention described herein includes a method for anomaly and event analysis including steps of receiving, by at least one processor, at least one data set of at least one data stream from at least one data source, where the at least one data set includes a plurality of time-varying data points, where each time-varying data point of the plurality of time-varying data points includes at least one variable of at least one dimension; determining, by the at least one processor, a plurality of event observations associated with at least one data point of the plurality of time-varying data points based at least in part on a detection model, where the detection model includes at least one anomaly detection model trained according to a respective plurality of independent event training data sets to identify types of the plurality of event observations, where the types of the plurality of event observations include at least one of: i) anomalies, ii) change-points, iii) patterns, or iv) outliers; generating, by the at least one processor, a plurality of anomaly records in at least one event data store based at least in part on the plurality of event observations; automatically generating, by the at least one processor, at least one event record for at least one anomaly record of the plurality of anomaly records based at least in part on the at least one variable of the at least one dimension, where the at least one event record links one or more event observations of the plurality of event observations; and automatically applying, by the at least one processor, at least one change in the at least one event record of the at least one anomaly event to each event observation of the one or more event observations based on the linking of the one or more event observations to the event record.

Another embodiment of the present invention described herein includes a system for anomaly and event analysis including components of at least one data store configured to store at least one data set and at least one processor. The at least one processor is configured to: receive at least one data set of at least one data stream from at least one data source, where the at least one data set includes a plurality of time-varying data points, where each time-varying data point of the plurality of time-varying data points includes at least one variable of at least one dimension; determine a plurality of event observations associated with at least one data point of the plurality of time-varying data points based at least in part on a detection model, where the detection model includes at least one anomaly detection model trained according to a respective plurality of independent event training data sets to identify types of the plurality of event observations, where the types of the plurality of event observations include at least one of: i) anomalies, ii) change-points, iii) patterns, or iv) outliers; generate a plurality of anomaly records in at least one event data store based at least in part on the plurality of event observations; automatically generate at least one event record for at least one anomaly record of the plurality of anomaly records based at least in part on the at least one variable of the at least one dimension, where the at least one event record links one or more event observations of the plurality of event observations; and automatically apply at least one change in the at least one event record of the at least one anomaly event to each event observation of the one or more event observations based on the linking of the one or more event observations to the event record.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

FIGS. 1-42 show one or more schematic flow diagrams, certain computer-based architectures, and/or screenshots of various specialized graphical user interfaces which are illustrative of some exemplary aspects of at least some embodiments of the present disclosure.

DETAILED DESCRIPTION

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Embodiments of the present invention describe a technically improved event recognition system built to detect anomalies in datasets and provide users an ability to visualize the data and the anomalies. A detection model at a centralized platform can communicate with data stores, including any data storage solution (e.g., databases) storing multidimensional and multivariate data to detect anomalies, change-points, patterns, and/or outliers, and filter them into buckets by, e.g., communicating the anomalies, change-points, patterns, and/or outliers into an event data store. A recommendation engine recognizes characteristics of the anomalies, change-points, patterns, and/or outliers via communication with the anomaly data stores, and transmit anomaly, change-point, pattern, and/or outlier recognition information to a user computing device for improved visualization. Thus, the exemplary event recognition system improves on database communication of large-scale datasets to facilitate greater user access, annotation, collaboration and diagnosis of anomalies, change-points, patterns, and/or outliers.

Figure 1:
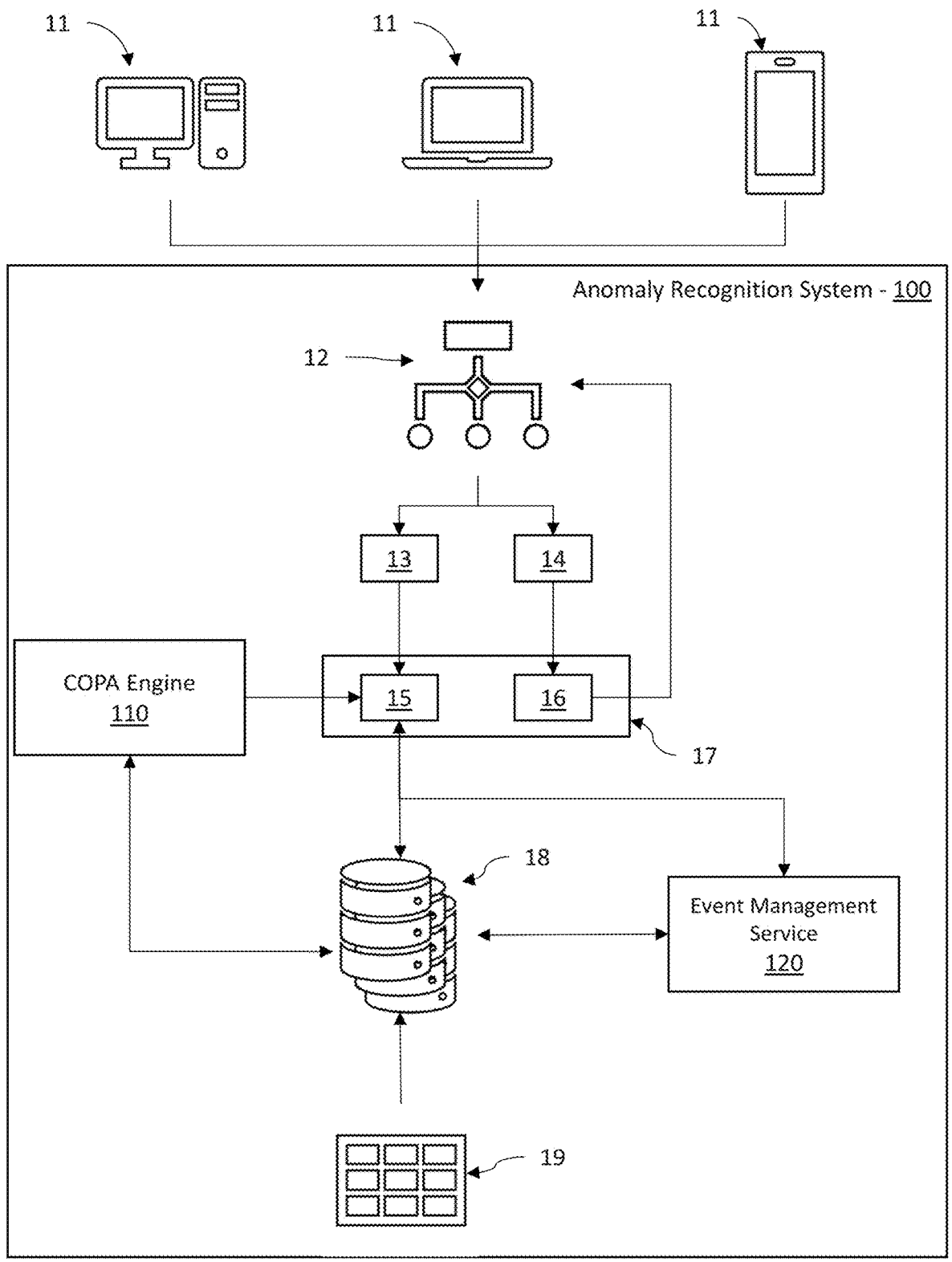

FIG. 1 illustrates a diagram of an exemplary inventive event recognition system according to an illustrative embodiment of the present disclosure.

In some embodiments, an anomaly and/or outlier may include any unexpected observation, or value, in a variable or set of variables. A change-point may include a point in a variable or set of variables where there is an observed change in the trend of values, for example from level to increasing or steady to fluctuating. A pattern may be where a variable or set of variables include a particular sequence of absolute values, or sequence of changes in values in either absolute or relative terms.

In some embodiments, a variable is a part of a data set that may be a time-series data set. Change-points, outliers, patterns, and/or anomalies may be identified by a human or one or more detection models, individually, or in ensemble configurations. Anomalies exist for specific variables in given data sets. In an example of a financial securities data set: stock prices, stock trading volumes, and/or stock volatility measures may be different variables with distinct change-points, outliers, patterns, and/or anomalies. In an example of taxi ridership, variables may include ride volume, ride durations, ride distances, fare amounts, and tip amounts. In some embodiments, the data sets may include any set of data that vary across one or more dimensions, such as data that varies spatially, geographically, temporally, spectrally, or by some other dimensions. For example, stock prices and taxi ridership may vary across time, traffic may vary across geographic area, spectroscopy measurements may vary spectrally, among any other set of variables that vary across one or more dimensions.

In some embodiments, an event may include one or more of change-points, anomalies, patterns, and/or outliers with similar characteristics and in the most beneficial embodiment, the same classification and root cause. Multiple change-point, outlier, pattern, and/or anomaly observations may exist at the same point in multiple variables because of an association between the variables that manifests in coincident observations of each variable. Associated change-points, outliers, patterns, and/or anomalies may be indicated by a similar reference location index into each variable or by an associated time-stamp variable, in the case of time-series data sets. In the exemplary financial securities data set, one or more of the stock price, trading volume, and volatility variables for one or more securities will have change-points, anomalies, patterns, and/or outliers, at the same time-stamp because of because of associations between the variables.

In some embodiments, it may be more efficient to consider a set of coincident change-points, outliers, patterns, and/or anomalies as a single event instead of considering each as an individual event. Accordingly, the exemplary inventive event recognition system of the present disclosure may be programmed to allow users to manually identify events, utilize algorithms and/or models to automatically identify events, or both. In some embodiments, the exemplary inventive event recognition system of the present disclosure may be programmed to automatically record associations of events with individual change-points, outliers, patterns, and/or anomalies; and manipulate events and related individual change-points, outliers, patterns, and/or anomalies and/or event associations. In some embodiments, the exemplary inventive event recognition system of the present disclosure may be programmed to associate individual change-points, outliers, patterns, and/or anomalies with other individual change-points, anomalies, patterns, and/or outliers by way of each individual change-point's, anomaly's, pattern's, and/or outlier's association to a common event.

In some embodiments, the anomaly recognition system 100 includes a Change-point, Outlier, Pattern, and Anomaly (COPA) engine 110, e.g., for automated event detection, including association of the individual change-points, outliers, patterns, and/or anomalies, with the event, and automated manipulation of the events as well as related change-points, outliers, patterns, and/or anomalies and/or event associations. In some embodiments, the anomaly recognition system 100 also or alternatively includes an event management service 120, e.g., for manual event detection, including association of the individual change-points, outliers, patterns, and/or anomalies, with the event, and manual manipulation of the events as well as related change-points, outliers, patterns, and/or anomalies and/or event associations.

In some embodiments, the anomaly recognition system 100 provides for multi-dimensional anomaly detection. In some embodiments, individual observations in individual variables may or may not be identified as individual irregularities in the data across one or more dimensions, such as time, location, classification, geography, or other dimension. In some embodiments, irregularities may include change-points, outliers, patterns, and/or anomalies. Yet in some embodiments, collectively associated irregularities, even if they are not individually identified as change-points, outliers, patterns, and/or anomalies may contribute to the identification of a multi-dimensional change-points, anomalies, patterns, and/or outlier events. Machine learning models, e.g., of the COPA engine 110 may associate irregularities across a large number of dimensions, or variables, to detect subtle events that would not be indicated as by univariate change-points, outliers, patterns, and/or anomalies detection models. Detecting multi-dimensional change-point, outlier, pattern, and/or anomaly events, which may be nuanced, is challenging at best. The anomaly recognition system 100 provides the technical underpinnings to manage datasets in a way to make building and scoring multi-dimensional detection models as straightforward as possible. The anomaly recognition system 100 may also provide data storage and management capacity to subsequently record and manage identified events and their relationships to individual irregularities, be they univariate change-points, outliers, patterns, and/or anomalies or not, in each appropriate variable.

In some embodiments, the anomaly recognition system 100 may leverage data reduction tools to improve efficiency of event detection and management. Reducing individual change-points, outliers, patterns, and/or anomalies into a smaller, and potentially much smaller, number of events provides significant statistical power to subsequent models that predict classification, severity, and root cause. Statistical power is increased by reducing the necessary degrees of freedom in subsequent models to effectively capture behavior in the smaller number of event observations as compared to the much larger set of individual change-point, outlier, pattern, and/or anomaly observations. Classification, severity, and root cause model complexity would grow exponentially without associating these individual irregularities together into a smaller number of events. Additionally, computational time to build and scoring such models will be significantly reduced. In some cases, the increased computational efficiency facilitates the creation of more powerful models. Indeed, building classification, severity, and root cause models without reducing individual change-points, outliers, patterns, and/or anomalies into events may not be computationally feasible.

In some embodiments, the exemplary anomaly recognition system 100 is directed to practical technological improvement in computer data processing. For example, it is simply impractical for a human to reason over thousands of individual change-points, outliers, patterns, and/or anomalies that are associated with tens of events. For example, in complex data sets with a large number of associated variables, a single real-world event may trigger scores of individual change-points, outliers, patterns, and/or anomalies. The exemplary anomaly recognition system 100 may be programmed for generating/creating events. The exemplary anomaly recognition system 100 may be programmed to summarize and display information collected about each event.

In some embodiments, the anomaly recognition system 100, due to numerous capabilities, which are described in greater detail below, may improve computational speed. In some embodiments, the exemplary anomaly recognition system 100, utilizing the classification, severity, and root cause models, may perform faster with fewer event data points to compute, store, and/or reference. For example, in real life, at least tens of irregularities may be associated with a single event, resulting in at least a one and sometimes two order of magnitude reduction in the number of data points.

In embodiments of an illustrative anomaly recognition system 100, data stores 18 may store data provided by a data pipeline 19. The data pipeline 19 may receive a data feed of raw data from various data sources, such as, without limitation, banking or credit account transactions, merchant transactions, network traffic data, debug logs, process and task histories, among other data sources and combinations thereof. In some embodiments, the raw data are updated by an event, and in other embodiments, the raw data are updated on a regular basis, e.g., hourly, daily, weekly, or by any other suitable update period, such as, in real-time. Thus, the data may form a time-varying set of data. The data pipeline 19 may transform, standardize, and/or organize the data and communicate the transformed, standardized, and/or organized data to the data stores 18 for storage, e.g., in a cloud storage system, one or more discrete database servers or storage devices, among other database configurations. In embodiments, the data pipeline 19 may transform, standardize, and/or organize the data into a time-series format. The data pipeline 19 may micro-batch streaming data as needed to transform, standardize, and/or organize the data into a time-series format prior to communicating the data to the databases.

In embodiments, one or more users may monitor or otherwise access the data to diagnose behaviors of devices and systems associated with the data, such as upstream sensors, data collection systems, and data transformation pipelines. However, viewing many facets of the data, such as hundreds, thousands, tens of thousands, hundreds of thousands, even millions, or more of the combinations of variables and dimensions, which may include time, does not lend towards efficient interpretability. Thus, in embodiments, the COPA engine 110 communicates with the data stores 18 to produce event observations based on characteristics of the transformed, standardized, and/or organized data stored in the data stores 18. For more accurate and efficient generation of event observations, in some embodiments, the COPA engine 110 utilizes one or more machine learning models to interpret the data and discover, recognize and interpret irregularities including change-points, outliers, patterns, and anomalies in the data. In an embodiment, the event observation may include all related data points for all variables and combinations of dimensions common to the detected event in at least one dimension, such as all data points for all variables in all dimensions that occur at the same point in time as the event. In an embodiment, the event observation may include metadata of each anomaly, change-point, pattern, and/or outlier event and/or a separate file linked to a respective anomaly, change-point, pattern, and/or outlier event.

For example, in some embodiments, the COPA engine 110 employs, e.g., a detection model in conjunction with a recommendation model to generate the event observations. The detection model may utilize multiple detection methodologies to discover data points within the data in the data stores 18 that are events, such as, change-points, outliers, patterns, and anomalies. The events may represent the result of, e.g., an error in system function, externalities affecting the data, errors in data collection, or other abnormal behaviors related to the data collection. In an embodiment, to most accurately and efficiently discover the events, the detection model is an ensemble model that employs multiple detection methodologies. However, in other embodiments, to improve simplicity and reduce resources, a single detection model with one detection methodology is employed.

In an embodiment, the recommendation engine of the COPA engine 110 may perform various filtering and classification interpretations of the data to recognize and characterize the outliers, including change-points, outliers, patterns, and anomalies, to produce the event observations. The recommendation engine may employ supervised machine learning models, such as classification models, or unsupervised models, such as clustering models. In an embodiment, the recommendation engine may produce event observations including recommendations for characteristics, such as, without limitation, severity, type, root cause, and other associated events for each event discovered. Thus, the recommendation engine produces a comprehensive report of the change-points, outliers, patterns, and anomalies, and other outliers. For example, the recommendation engine may recognize an association between multiple independent data-points within the data and combine them into a single event observation, thus facilitating efficient computation of the event observations.

In embodiments, users may access the event observations via user computing devices 11 in communication with the exemplary anomaly recognition system 100. The computing device 11 may include but are not limited to any suitable computing device, such as, a laptop computer, desktop computer, smartphone, tablet or any other computing device for communication with the anomaly recognition system 100. The computing devices 11 may communicate with the anomaly recognition system 100 via a suitable electronic communication connection, such as, without limitation, a direct wired connection, a direct wireless connection, a wired or wireless network, a fiber optic connection, and using a suitable protocol such as, without limitation, the internet, an intranet, Wi-Fi, Bluetooth™, a wireless communication network such as, Global System for Mobile Communications (GSM), Code Division Multiple Access (CDMA), Long Term Evolution (LTE) (4G), 5G wireless communication, or any other communication or networking protocol.

In embodiments, the user may access the anomaly recognition system 100 by communicating with an application load balancer 12 via a graphical user interface (GUI) at a computing device 11 to view and interact with the data and the event observations. The application load balancer 12 may include a computing device or computing system for orchestrating tasks and processes in the anomaly recognition system 100. As such, in embodiments, the application load balancer 12 may include one or more processing devices and/or one or more memory devices for caching, buffering and storing application load information, such as resource usage, task queues, task and process requirements, among other information.

In embodiments, based on the application load information, the application load balancer 12 may coordinate requests between the computing devices 11 and the event detection system using, e.g., an elastic container service (ECS) 17. The ECS 17 may include multiple containers for instantiating tasks and processes for, e.g., responding to requests from the computing devices 11 and instantiating the COPA engine 110. Thus, in some embodiments, the ECS 17 may include, e.g., one or more processing devices, such as a processor or multiple processors along with memory and storage devices, among other suitable hardware for instantiating tasks and processors. As such, the ECS 17 provides a processing environment to coordinate the operations of the COPA engine 110, the data stores 18, and communication with the computing devices 11 via the application load balancer 12, among other operations. In embodiments, each operation, such as each task or process, or data operation, among other operations, may be instantiated in an independent container to facilitate secure and reliable instantiation of each task and process. The containers may elastically scale to maximize efficiency of resource usage according to management by the application load balancer 12. In some embodiments, the application load balancer 12 may instantiate and scale each container in the ECS 17 according to requests from the computing devices 11 as well as the COPA engine 110.

In particular, in embodiments, the computing devices 11 and the COPA engine 110 may interface with the ECS 17 using API tasks 15. Using the GUI, a user may select aspects of the data to organize and filter event observations, such as various types of data irregularities. Such a selection may be sent to the application load balancer 12, which in turn may generate and direct application programming interface (API) tasks 15 using an API target group 13. The API tasks 15 may include a request for a process to be instantiated within the ECS 17, such as, without limitation, a request for irregularities matching particular descriptions selected in the GUI. For example, in some embodiments, a user may select a "heat map" of irregularity counts based on date and severity. In an embodiment, a heat map is a two-dimensional grid having an x-axis and a y-axis, where grid spaces depict a quantity of irregularities, such as anomalies, change-points, patterns, and/or outliers, at the intersection of a value on the x-axis and a value on the y-axis. The application load balancer 12 may then generate an API target group 13 for orchestrating the ECS 17 to call, using respective API tasks 15, event observations organized by, e.g., date and severity, or any other suitable x- and y-axes. Thus, in embodiments, the API tasks 15 may communicate with the COPA engine 110 and the data stores 18 to retrieve, extract, and operate on the data associated with the user request. For example, the API tasks 15 may include irregularity detection and recommendation tasks to recognize irregularities including, but not limited to, change-points, anomalies, patterns, and/or outliers and produce event observations. Thus, the API tasks 15 may call the COPA engine 110 for instantiation to generate the appropriate event observations in real time. Alternatively, the COPA engine 110 may be independently instantiated to produce event observations for new data when triggered, such as, without limitation, when the data pipeline has completed its execution. Alternatively, the COPA engine 110 may be independently instantiated to produce event observations for new data on a periodic basis, such as, without limitation, every minute, hourly, daily, weekly, biweekly, monthly, or according to any other suitable period. The event observations may then be returned to one or more databases for recording event observations of the data stores 18. In embodiments, where the event observations are maintained in the data stores 18, the API tasks 15 may call the event observations from the data stores 18 upon, e.g., user request for sets of the event observations. Accordingly, users may interact with the data in the data stores 18 via the API target group 13 generated by the application load balancer 12. Such interactions may include, e.g., overriding automatic designations of an anomaly or change point, override the severity or classification by the COPA engine 110, annotate anomalies with metadata, include root cause analysis, task management tickets such as, without limitation, JIRA™ tickets, links to documentation, among other modifications to the event observations. Such interactions may be performed by multiple users at multiple computing devices 11 in a collaborative fashion.

In an embodiment, such a user request, as well as other possible user requests via the GUI may have associated user interface (UI) requests to display the data in the selected format. Thus, the application load balancer 12 may also generate a UI target group 14 for orchestrating the ECS 17 to produce the UI features to be returned to the computing device 11. Similar to the API target group 13 and associated API tasks 15, the UI target group 14 may also result in associated UI tasks 16 at the ECS 17 based on the orchestration by the application load balancer 12. The UI tasks 16 may then instantiate tasks to generate and return the UI features. Each of the API tasks 15 and the UI tasks 16 may be orchestrated by the application load balancer 17 according to, e.g., task requirements, resource availability, among other factors. The UI features may be selected and/or customized at the computing devices 11, and generated by the ECS 17 upon the UI target group 14 instantiation as associated UI tasks 16. Thus, users may visually explore events and irregularities, such as change-points, outliers, patterns, and anomalies, and their respective event observations, in customizable views, e.g., charts and tables in the context of surrounding data points. Users may analyze events and irregularities in one variable and a set of dimensions in the context of related variables and dimensions, as well as associate events with each other. The GUI provides tools for visualizations that may be formed and returned by the ECS 17 via the application load balancer 12 such that data requested via the API target group 13 are organized in a user friendly and interpretable manner.

In embodiments, the ECS 17 is centrally accessed, thus forming a central point of access to the data stores 18 and the COPA engine 110. As a result, in some embodiments of the exemplary event recognition system, users may visually explore events, such as change-points, outliers, patterns, and anomalies, in a collaborative fashion. For example, in embodiments, users may change, vote on, or add to annotations and metadata by other users, add and respond to comments, communicate in discussion boards and threads, among other collaboration activities and associated tools. As a result, the exemplary inventive anomaly recognition system 100 facilitates viewing, analyzing and collaborating on events and the associated event observations, such as change-points, outliers, patterns, and anomalies in large scale datasets, facilitating assessment of overall event status, root cause and disposition. Because the COPA engine 110 generates in-depth event observations automatically, these engagement activities are improved and simplified, while also making the visualization of change-points, outliers, patterns, and/or anomalies related information more efficient and accurate.

Figure 2:
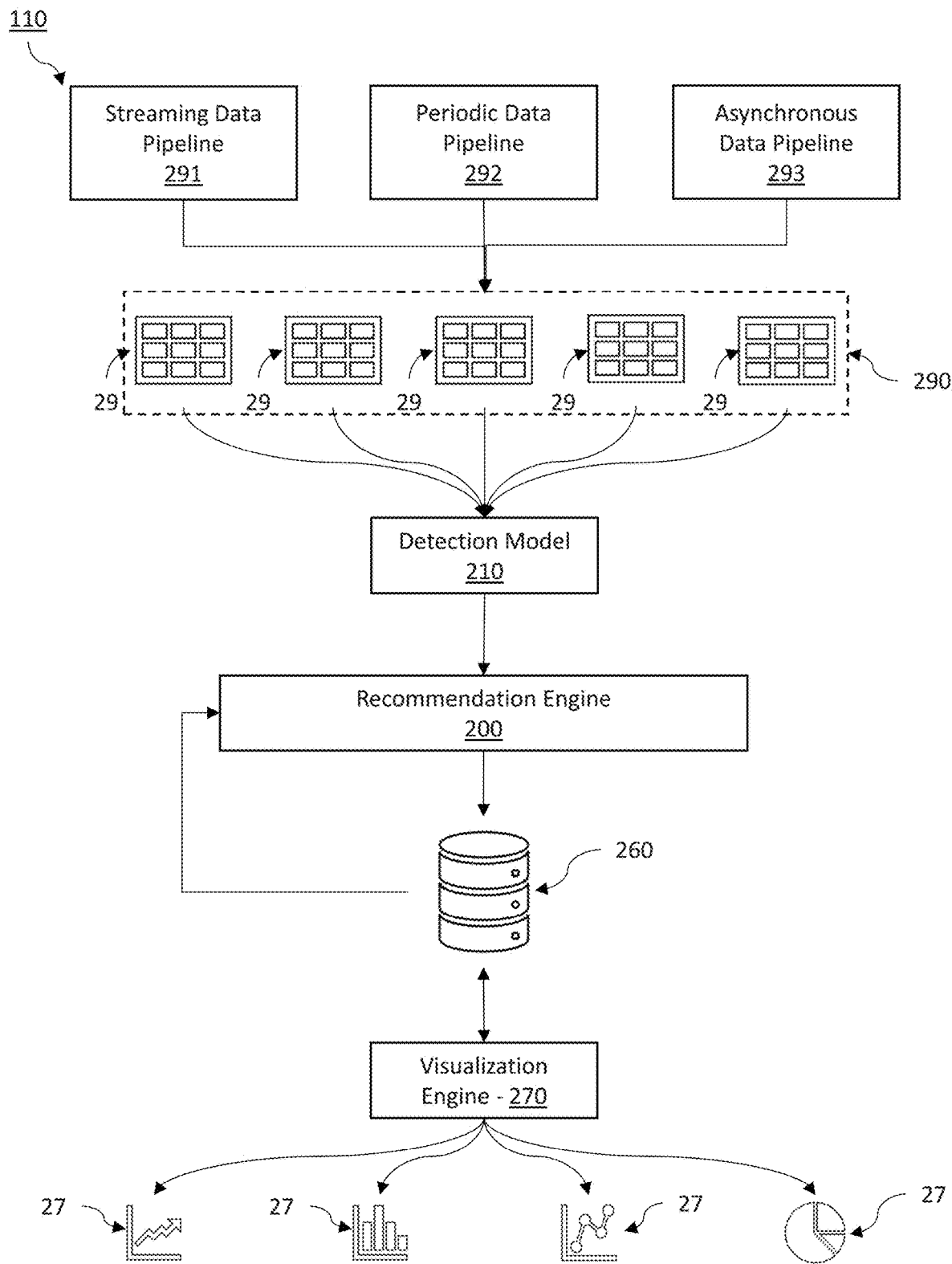

FIG. 2 is a block diagram of an exemplary COPA engine for recognizing and analyzing change-points, outliers, patterns, and anomalies in the exemplary event recognition system of an illustrative embodiment of the present invention. in accordance with one or more embodiments of the present disclosure.

In an embodiment, a COPA engine 110 may include a detection model 210, a recommendation engine 200 and a visualization engine 270. Using the detection model 210, the recommendation engine 200 and the visualization engine 270, the recommendation engine 200 may receive a corpus of data 290 including data sets 29 from one or more sources.

The recommendation engine 200 may automatically discover, classify and characterize events in the data sets 29, such as change-points, outliers, patterns, and anomalies, to produce event observations. The COPA engine 110 may retrieve data sets 29, e.g., in real-time with streaming or micro-batch updates to some or all of data set 29 via a streaming data pipeline 291, or, e.g. triggered by an external event, such as the notification of the availability of new data, via an asynchronous data pipeline 293. Additionally, or alternatively, the COPA engine 110 may retrieve the data 290 according to scheduled or periodic updates to some or all of the data sets 29 via a periodic data pipeline 292, e.g., on a scheduled basis, such as, without limitation, hourly, daily, weekly, biweekly, monthly, or by another suitable period.

In an embodiment, the detection model 210 may be a univariate, supervised or unsupervised, model that may be applied on time-series data or it may be a supervised or unsupervised multivariate model that may be applied to point in time snapshot of the data to identify anomalies, change points, patterns and/or outliers in the data. The univariate model may include but not limited to various open source anomaly detection models including, e.g., fbprophet, SHESD, Luminol, Exponential Moving Average, Matrix Profile-STAMP, STOMP. In some implementations, multivariate detection some of the models that may include to DBSCAN, Local Outlier Factor (LOF), LSTM (Long Short-Term Memory) Neural Network, and/or GAN (Generative Adversarial Network). In another embodiment, the detection model 210 may encapsulate various detection models, e.g., those mentioned above, into one ensemble model. While one detection model could be used, the detection model 210 formed from a variety of individual models may facilitate discovering more events, such as change-points, outliers, patterns, and anomalies, among others. Thus, in an ensemble approach, false negatives may be less likely to occur. In embodiments, the detection model 210 may include, e.g., a processing device, a memory device and or a storage device for storing and executing instructions for change-points, outliers, patterns, anomalies, and or any other event detection according to the one or more detection methodologies.

The detection model 210 may retrieve dataset and detect change-points, outliers, patterns, and anomalies e.g., in real-time with streaming or micro-batch updates to each data set 29, or, e.g. triggered by an external event, such as the notification of the availability of new data, or, or, e.g., on a periodic basis, such as, without limitation, hourly, daily, weekly, biweekly, monthly, or by another suitable period.

In embodiment, the detected events are communicated from the detection model 210 to the recommendation engine 200 via, e.g., a wired or wireless electronic connection. The recommendation engine 200 may include, e.g., a processing device, a memory device and or a storage device for generating event observations with recommendations. The recommendation engine 200 may receive events, such as change-points, outliers, patterns, and anomalies, from the detection model 210, e.g., in real-time with the streaming or micro-batch detection of change-points, outliers, patterns, and anomalies by the detection model 210, or, e.g. triggered by an external event, such as the notification of the availability of new events, e.g., on a periodic basis, such as, without limitation, hourly, daily, weekly, biweekly, monthly, or by another suitable period. The periodic basis may be the same as the detection period of the detection model 210 or a different period.

In embodiments, the recommendations may include a severity rank, a classification, relationships to other change-points, outliers, patterns, and/or anomalies, among other recommendations to a user to assist in diagnoses of root cause, disposition, and other forms of analysis. Thus, in embodiments, the recommendation engine 200 may include machine learning algorithms and/or models stored on the memory device and/or storage device, such as, without limitation, classification algorithms. Each type of recommendation may be performed by an independent machine learning model on independent hardware, or using a single model, such as a deep learning model, to at once determine each recommendation for each change-point, outlier, pattern and/or anomaly. In other embodiments, some recommendations may have individual associated models, while other recommendations may be produced with shared models.

In an embodiment, for each anomaly, an event observation is generated and communicated to a COPA database 260, for example, of the data stores 18 described above or as a separate independent database associated with the COPA engine 110. The database 260 is in communication with the visualization engine 270. In embodiments, the visualization engine 270 extracts the event observations from the COPA database 260 to generate visualizations 27 of change-points, outliers, patterns, and/or anomalies data from the event observations. As such, in embodiments, the visualization engine 270 may be a part of the COPA engine 110 that operates responsive to API tasks, such as the API tasks 15 in the ECS 17 described above, or as a part of the ECS 17 itself. In embodiments, the visualization engine 270 is interactive via a GUI at a user device. Thus, the visualizations 27 may be provided to a user's computing device. The user may then annotate, modify, remove, or otherwise interact with the data in the visualizations 27. In embodiments, user interactions are received by the visualization engine 270 and resubmitted to the COPA database 270 to update the event observations. Thus, the visualization engine 270 may provide a mechanism for both viewing the event observations in a user friendly, interpretable manner, as well as receive changes to the event observations.

In some embodiments, the recommendation engine 200 employs one or more supervised or semi-supervised models for making recommendations when generating event observations. Thus, changes to event observations in the database 260 are tracked and recorded. The changes may then be fed back to the recommendation engine 200 via, e.g., backpropagation, to update and train the recommendation engine 200. For example, in embodiments, an error function at the recommendation engine 200 receives the updated event observations and compares the updated event observations to the event observations prior to the update. The recommendation engine 200 may then determine an error between the generated event observations and the updated event observations and, e.g., backpropagate the error to update models used for generated the event observations. However, other learning methods are contemplated. As a result, the recommendation engine 200 is continually updated and improved to more accurately and efficiently generate event observations indicative of characteristics of each anomaly in each dataset 29.

Figure 3:
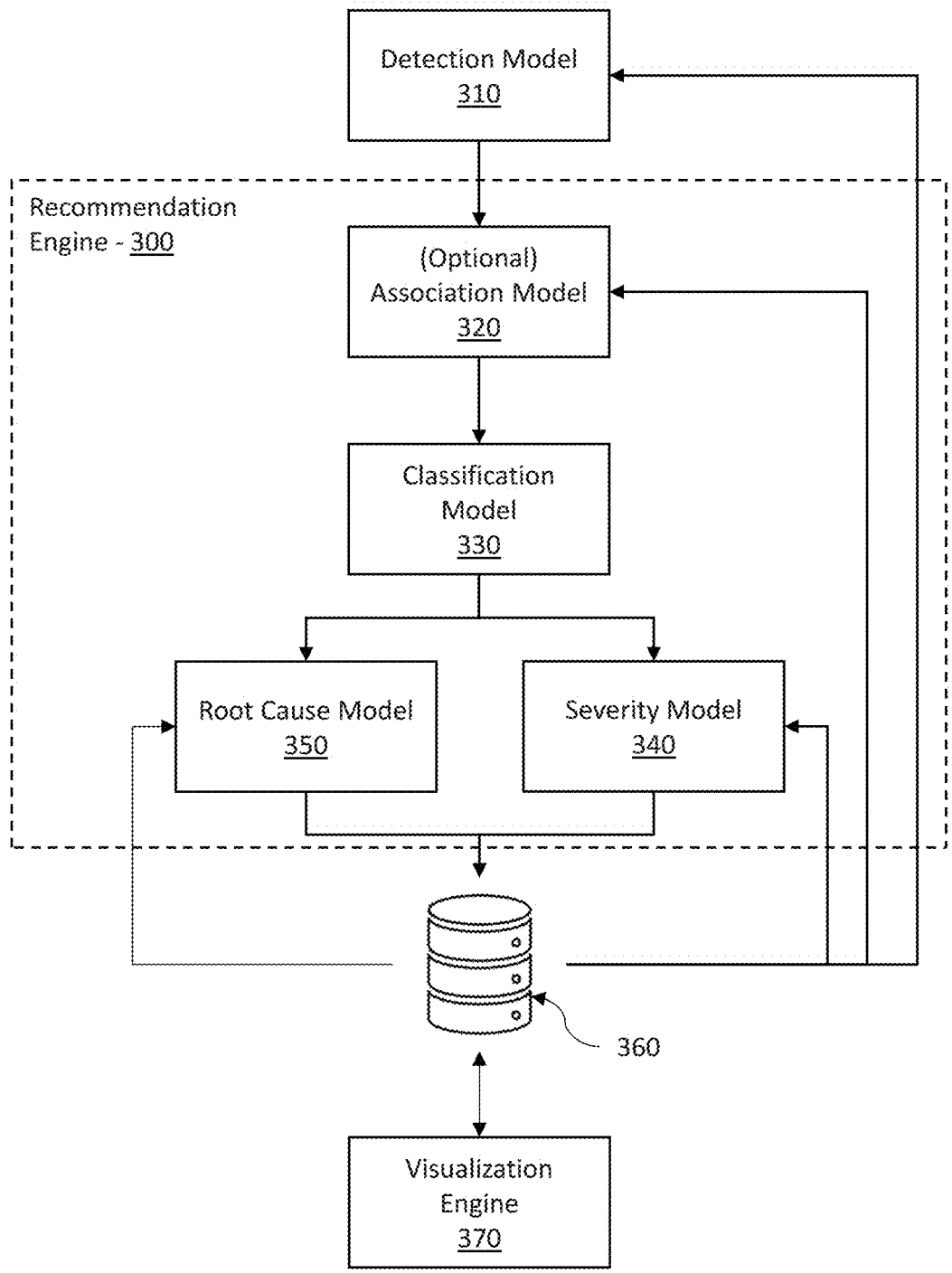

FIG. 3 is a block diagram of another exemplary anomaly recognition system 100 having another COPA engine having a recommendation engine architecture for recognizing and analyzing change-points, outliers, patterns, and anomalies of an illustrative embodiment of the present disclosure.

In embodiment, detected anomalies are communication from a detection model 310, such as a detection model 210 described above, to a recommendation engine 300 via, e.g., a wired or wireless electronic connection. The recommendation engine 300 may include, e.g., a processing device, a memory device and or a storage device for generating event observations with recommendations. The recommendation engine 300 may receive change-points, outliers, patterns, and anomalies from the detection model 310, e.g., in real-time with the streaming or micro-batch detection of change-points, outliers, patterns, and anomalies by the detection model 310, e.g. triggered by an external event, such as the notification of the availability of new data, or, e.g., on a periodic basis, such as, without limitation, hourly, daily, weekly, biweekly, monthly, or by another suitable period. The periodic basis may be the same as the detection period of the detection model 310 or a different period.

In embodiments, the recommendations may include a severity rank, a classification, relationships to other events, including, but not limited to, change-points, outliers, patterns, and/or anomalies, a root-cause prediction, among other recommendations to assist in diagnoses of root cause, disposition, and other forms of analysis. Thus, in embodiments, the recommendation engine 300 may include machine learning algorithms and/or models stored on the memory device and/or storage device, such as, without limitation, classification algorithms. Each type of recommendation may be performed by an independent machine learning model on independent hardware, or using a single model, such as a deep learning model, to at once determine each recommendation for each change-point, outlier, pattern and/or anomaly. In other embodiments, some recommendations may have individual associated models, while other recommendations may be produced with shared models.

In an embodiment, the recommendation engine 300 includes an association model 310 to predict or recommend a link between multiple anomalies and/or change-points, a classification model 330 to predict or recommend a classification of a type of change-point, outlier, pattern, or anomaly, a severity model 340 to predict or recommend a rank of the severity of the change-point, outlier, pattern, or anomaly, e.g., relative to each other change-points, outliers, patterns, and/or anomalies, and a root-cause model 350 to predict or recommend a root cause of the change-point, outlier, pattern, or anomaly. Each model of the recommendation engine 300 may include, e.g., a processing device, a memory device and or a storage device. Alternatively, the models of the recommendation engine 300 may share a common processing device, memory device and/or storage device.

In an embodiment, where the detection model 310 is a univariate detection model, the association model 320, retrieves the detected change-points, outliers, patterns, and anomalies from the detection model 310. In datasets, such as large datasets, many change-points, outliers, patterns, and anomalies may exist in the data. While the change-points, outliers, patterns, and anomalies may come from different data sources, such as from credit card transactions and from investment transactions, or any two or more different sources of data, or may present in different dataset or data types, some change-points, outliers, patterns, and anomalies may be a result of a common event. It may be difficult and costly to sort through the change-points, the outliers, the patterns, and the anomalies to infer associated pairs or groups resulting from, e.g., a same root-cause or event, especially where the change-points, outliers, patterns, and anomalies are provided by different sources and/or event detection is performed using exclusively univariate detection models. In embodiments, the association model 320 automatically links associated change-points, outliers, patterns, and anomalies to a single event observation. For example, the association model 320 determines that two or more change-points, outliers, patterns, and/or anomalies are related based on, e.g., common variables, related variables, and/or related dimensions having similar change-point, outlier, pattern, and/or anomaly types. Commonalities in aspects of the variables and dimension may be indicative of a common causal event giving rise to each of the associated change-points, outliers, patterns, and anomalies. Thus, in embodiments, the association model 320 analyzes the variables and dimensions of each change-point, outlier, pattern and/or anomaly and determines one or more of the change-points, outliers, patterns, and anomalies that are associated based on commonalities in the variables and dimensions.

In embodiments, the association model 320 determines associated change-points, outliers, patterns, and anomalies using, e.g., a machine learning model such as a classifier. In embodiments, the classifier is a supervised model that is trained based on feedback and/or training data. Accordingly, in some embodiments, the association model 320 may include a suitable classification model, such as a linear classifier, e.g., Fisher's linear discriminant or a naïve Bayes classifier, a multilayer perceptron, a support vector machine, a k-Nearest Neighbor (k-NN) classifier, gradient descent boosting (GDB) classifiers, decision trees such as random-forests, neural networks including convolutional neural networks (CNN), association rule learning algorithms including Apriori algorithms and eclat algorithms, among other supervised classifiers and detection models including combinations thereof. In other embodiments, the association model 320 may include unsupervised models, such as clustering including k-means clustering, density-based clustering (DB-SCAN), among other clustering and other unsupervised models, and detection models including combinations thereof. Using one or more the supervised and unsupervised models, the association model 320 may combine the associated change-points, outliers, patterns, and anomalies into a single anomaly including, e.g., the metadata and other change-points, outliers, patterns, and/or anomalies information to form an event observation for each change-point, outlier, pattern, and/or anomaly. Thus, in embodiments, the detected change-points, outliers, patterns, and anomalies may be reduced down to a reduced set of unique change-points, outliers, patterns, and anomalies by combining related change-points, outliers, patterns, and anomalies.

In embodiments, a classification model 330 may receive the set of change-points, outliers, patterns, and anomalies from the detection model 310, such as, without limitation, by accessing a memory or storage of the association model 320, by accessing a common memory or storage, or by receiving a transfer of the set of change-points, outliers, patterns, and anomalies. In other embodiments, a classification model 330 may receive the reduced set of change-points, outliers, patterns, and anomalies from the association model 320, such as, without limitation, by accessing a memory or storage of the association model 320, by accessing a common memory or storage, or by receiving a transfer of the reduced set of change-points, outliers, patterns, and anomalies. The classification model 330 may then generate a classification recommendation for change-point, outlier, pattern, or anomaly type of each change-point, outlier, pattern and/or anomaly in the reduced set. In embodiments, change-points, outliers, patterns, and/or anomalies classifications may include a type that is indicative of, e.g., an actual event giving rise to the change-point, outlier, pattern, and/or anomaly, unknown, a market shift, a methodology change, a false-positive, a vendor error, a data error, a sensor error, a system error, a data pipeline processing error, among other change-points, outliers, patterns, and/or anomalies types.

In embodiments, the classification model 330 may determine a type of each change-point, outlier, pattern, and/or anomaly in the reduced set of change-points, outliers, patterns, and/or anomalies using a machine learning model to predict a type based on, e.g., variables, variable types, dimensions, source, and/or time according to information in, e.g., metadata of each change-point, outlier, pattern and/or anomaly. Based on the information in the metadata as well as variables, variable types and dimensions, the classification model 330 predicts a type according to, e.g., supervised training for change-points, outliers, patterns, and/or anomalies classification. In some embodiments, the classification model 330 may, therefore, include a supervised model, such as, a linear classifier set forth above, including, e.g., Fisher's linear discriminant or a naïve Bayes classifier, a multilayer perceptron, a support vector machine, kernel estimation such as k-Nearest Neighbor (k-NN), decision trees such as random-forests, neural networks including convolutional neural networks (CNN), linear vector quantization, among other supervised classifiers and detection models including combinations thereof. In embodiments, the classification model 330 is trained in a supervised fashion to infer the type of each change-point, outlier, pattern and/or anomaly by, e.g., the nature of the event. Where the datasets relate to, e.g., financial transactions, events may include, e.g., high sales, fraud, power outage, natural disaster, news coverage, or other events and externalities effecting financial transactions. The type may then be appended to the event observation for each change-point, outlier, pattern and/or anomaly to update event observations with the classified type of the change-points, outliers, patterns, and/or anomalies for each event observation.

In an embodiment, the reduced set of change-points, outliers, patterns, and anomalies including the record of type and associations in the event observation via, e.g., associated metadata or linked files, are communicated from the classification model 330 to each of a severity model 340 and a root cause model 350.

In an embodiment, the severity model 340 analyzes the type of each change-point, outlier, pattern, and/or anomaly as well as e.g., variables, variable types, dimensions, source, and/or time according to information in, e.g., metadata of each change-point, outlier, pattern and/or anomaly, to recommend a severity relative to other change-points, outliers, patterns, and anomalies. In embodiments, severity refers to an importance of a change-point, outlier, pattern, or anomaly within the context of the data and/or type. For example, merchant sales may have a recommended severity in the form of a sales rank relative to other sales change-points, outliers, patterns, or anomalies. In some embodiments, the severity is related to the relative magnitude of the difference between an expected value and the observed value. For example, an unexpected spike in sales volume either in terms of the number of transactions or the dollar value of the transactions significant increase, from a specific geography, merchant, and/or brand of merchant. In this case, the greater the difference in either the number of expected transactions or the expected dollar amount of the transactions, the greater the severity. In the case of an extreme difference, there might be an extreme severity identified for the change-point, outlier, pattern, or anomaly.

Based on the information in the metadata as well as type, variables, variable types and dimensions, the severity model 340 predicts a severity according to, e.g., supervised training for change-points, outliers, patterns, and/or anomalies severity. In some embodiments, the severity model 340 may, therefore, include a supervised model, such as a linear classifier set forth above, including but not limited to, e.g., Fisher's linear discriminant or a naïve Bayes classifier, a multilayer perceptron, a support vector machine, kernel estimation such as k-Nearest Neighbor (k-NN), decision trees such as random-forests, neural networks including convolutional neural networks (CNN), linear vector quantization, among other supervised classifiers and detection models including combinations thereof. In embodiments, the severity model 340 is trained in a supervised fashion to infer the importance or severity, e.g., in the form of a rank within the reduced set of change-points, outliers, patterns, and anomalies. The severity may then be appended to the event observation of each event, such as change-points, outliers, patterns, and/or anomalies, to update event observations with the severity, importance and/or rank of the change-points, outliers, patterns, and/or anomalies for each event observation.

In an embodiment, the root-cause model 350 analyzes the type of each change-point, outlier, pattern, and/or anomaly as well as e.g., variables, variable types, dimensions, source, and/or time according to information in, e.g., metadata of each change-point, outlier, pattern, and/or anomaly, to predict a root-cause recommendation of each change-point, outlier, pattern, and/or anomaly. In embodiments, the datasets and the change-points, outliers, patterns, and anomalies relate to financial transactions. In such embodiments, the root-cause may take the form of, e.g., promotions, holiday shopping, vacations, merchant fraud, account fraud, among other events causing outlier variations in transaction data.

Based on the information in the metadata as well as type, variables, variable types and dimensions, the root-cause model 350 predicts the root-cause according to, e.g., supervised training classifying root-causes. For example, the root-cause model 350 may be trained with training datasets where a set of causal events giving rise to known anomalies are known and labeled in the data. Thus, the root-cause model 350 may be trained to recognize root-causes from characteristics of the change-points, outliers, patterns, and anomalies. Thus, in some embodiments, the root-cause model 350 may include a supervised model, such as a linear classifier set forth above, including but not limited to, e.g., Fisher's linear discriminant or a naïve Bayes classifier, a multilayer perceptron, a support vector machine, kernel estimation such as k-Nearest Neighbor (k-NN), decision trees such as random-forests, neural networks including convolutional neural networks (CNN), linear vector quantization, among other supervised classifiers and detection models including combinations thereof. The predicted root-cause may then be appended to the event observation of each change-point, outlier, pattern and/or anomaly to update event observations with the type of causal event associated with the change-points, outliers, patterns, and/or anomalies for each event observation.

In an embodiment, the root-cause model 350 and the severity model 340 operate in parallel. Thus, prior to storing the event observations in a database 360, the root-cause recommendation and the severity recommendation are merged into a common event observation having the associations, type, severity and root-cause of each change-point, outlier, pattern, and/or anomaly detected by the ensemble detection method 310. The event observation for each change-point, outlier, pattern, and/or anomaly may take the form of a separate file linked to the respective change-point, outlier, pattern, or anomaly, or may take the form of metadata of the change-point, outlier, pattern, or anomaly. Other forms of attaching the associations, type, severity and root-cause of each change-point, outlier, pattern, and/or anomaly to form respective event observations are contemplated. Each event observation may then be stored in a COPA database 360, such as the COPA database 260 described above.

In an embodiment, each event observation is communicated to the COPA database 360. The database 360 is in communication with the visualization engine 370. In embodiments, the visualization engine 370 extracts the event observations from the COPA database 360 to generate visualizations of change-points, outliers, patterns, and/or anomalies data from the event observations. As such, in embodiments, the visualization engine 370 may be a part of the COPA engine 110 that operates responsive to API tasks, such as the API tasks 15 in the ECS 17 described above, or as a part of the ECS 17 itself. In embodiments, the visualization engine 370 is interactive via a GUI at a user device. Thus, the visualizations may be provided to a user's computing device. The user may then annotate, modify, remove, or otherwise interact with the data in the visualizations. In embodiments, user interactions are received by the visualization engine 370 and resubmitted to the COPA database 370 to update the event observations. Thus, the visualization engine 370 may provide a mechanism for both viewing the event observations in a user friendly, interpretable manner, as well as receive changes to the event observations.

In some embodiments, the recommendation engine 300 changes to event observations in the database 360 are tracked and recorded. The changes may then be fed back to the recommendation engine 300 via, e.g., backpropagation, to update and train each of the severity model 340, root-cause model 350, classification model 330, association model 320 and detection model 310. For example, in embodiments, an error function at each of the severity model 340, root-cause model 350, classification model 330, association model 320 and detection model 310 receives the updated event observations and compares the updated event observations to the event observations prior to the update. Each of the severity model 340, root-cause model 350, classification model 330, association model 320 and detection model 310 may then determine an error between the generated event observations and the updated event observations and, e.g., backpropagate the error to update models used for generated the event observations. However, other learning methods are contemplated.

In embodiments, the severity model 340, root-cause model 350, classification model 330, association model 320 and detection model 310 each only determine an error where a change related to the respective model is detected. For example, where a user changes a type of an event, the visualization engine 370 may mark the event as changed by type. The respective updated event observation may then only be sent to the classification model 330 to train the classification according to the change. However, the where user changes a severity, the event observation may be updated according to a change in severity and marked as such. The event observation may then be fed back to only the severity model 340 to train the severity model according to the change. Similarly, in embodiments, user changes with respect to change-point, outlier, pattern, and/or anomaly statuses, associations, type, severity and root-cause may result in an update to the respective event observation with an indication of the change made so that the updated event observation may be fed back to the appropriate model of the recommendation engine 300. As a result, the recommendation engine 300 is continually updated and improved to more accurately and efficiently generate event observations indicative of characteristics of each anomaly in each time-series of data.

Figure 4:
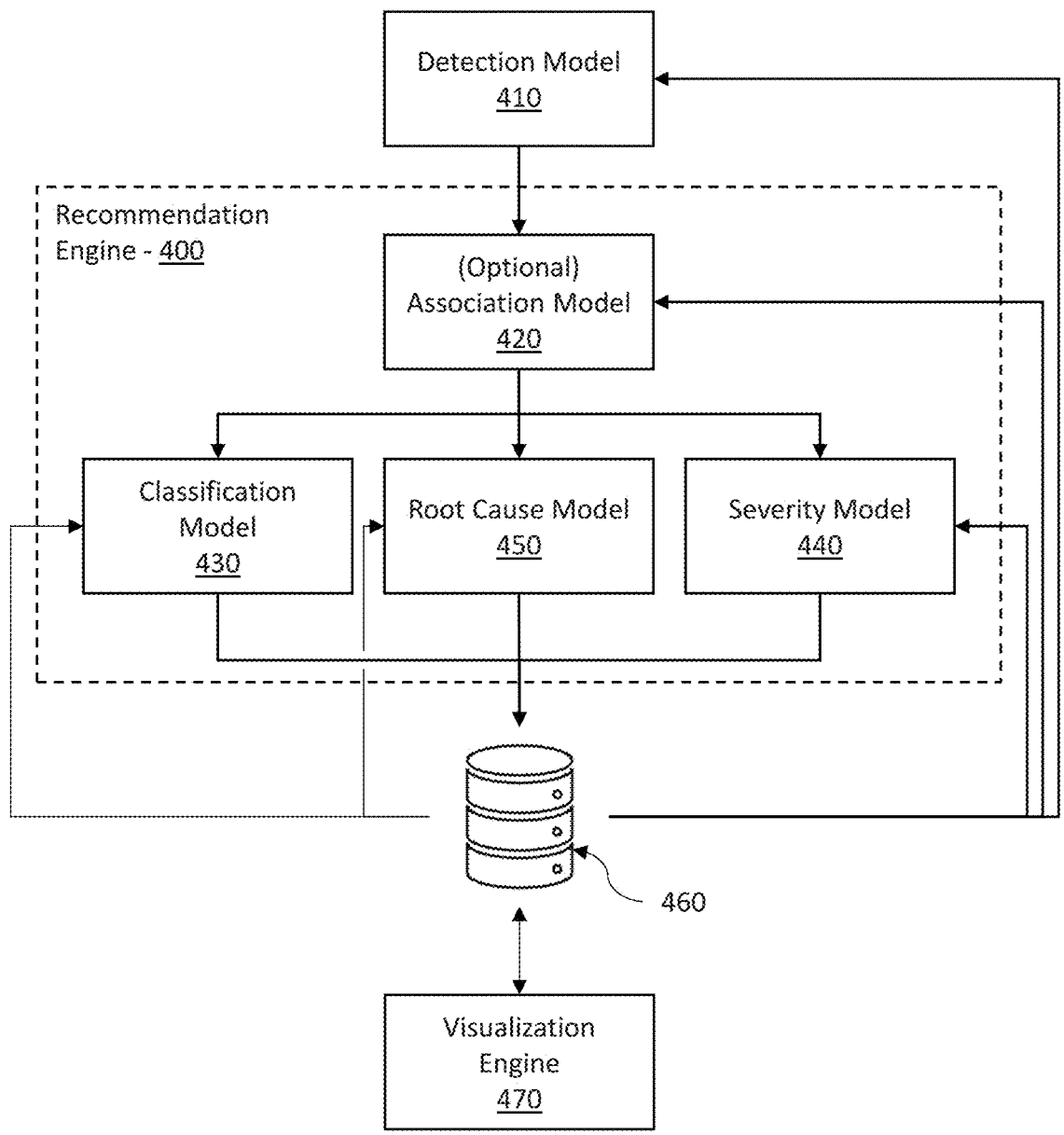

FIG. 4 is a block diagram of another exemplary anomaly recognition system 100 having another COPA engine having another recommendation engine architecture for recognizing and analyzing change-points, outliers, patterns, and anomalies of another illustrative embodiment of the present disclosure.

In some embodiments, detected anomalies are communicated from a detection model 410, such as a detection model 210 described above, to a recommendation engine 400 via, e.g., a wired or wireless electronic connection. The recommendation engine 400 may include, e.g., a processing device, a memory device and or a storage device for generating event observations with recommendations. The recommendation engine 400 may receive change-points, outliers, patterns, and anomalies from the detection model 410, e.g., in the real-time with streaming or micro-batch detection of change-points, outliers, patterns, and anomalies by the detection model 410, or, e.g. triggered by an external event, such as the notification of the availability of new data, e.g., on a periodic basis, such as, without limitation, hourly, daily, weekly, biweekly, monthly, or by another suitable period. The periodic basis may be the same as the detection period of the detection model 410 or a different period.

In embodiments, the recommendations may include a severity rank, a classification, a relationship to other change-points, outliers, patterns, and/or anomalies, a root-cause prediction, among other recommendations to a user to assist in diagnoses of root cause, disposition, and other forms of analysis. Thus, in embodiments, the recommendation engine 400 may include machine learning algorithms and/or models stored on the memory device and/or storage device, such as, without limitation, classification algorithms. Each type of recommendation may be performed by an independent machine learning model on independent hardware, or using a single model, such as a deep learning model, to at once determine each recommendation for each change-point, outlier, pattern and/or anomaly. In other embodiments, some recommendations may have individual associated models, while other recommendations may be produced with shared models.

In an embodiment, the recommendation engine 400 includes an association model 410 to predict or recommend a link between multiple anomalies and/or change-points, a classification model 430 to predict or recommend a classification of a type of change-point, outlier, pattern, or anomaly, a severity model 440 to predict or recommend a rank of the severity of the change-point, outlier, pattern, or anomaly, e.g., relative to each other change-points, outliers, patterns, and/or anomalies, and a root-cause model 450 to predict or recommend a root cause of the change-point, outlier, pattern, or anomaly. Each of model of the recommendation engine 400 may include, e.g., a processing device, a memory device and or a storage device. Alternatively, the models of the recommendation engine 400 may share a common processing device, memory device and/or storage device.

In an embodiment, where the detection model 310 is a univariate detection model, the association model 420 retrieves the detected change-points, outliers, patterns, and anomalies from the detection model 410. In datasets, such as large datasets, many change-points, outliers, patterns, and anomalies may exist in the data. While the change-points, outliers, patterns, and anomalies may come from different data sources, such as from credit card transactions and from investment transactions, or any two or more different sources of data, or may present in different dataset or data types, some change-points, outliers, patterns, and anomalies may be a result of a common event. It may be difficult and costly to sort through the change-points, the outliers, the patterns, and the anomalies to infer associated pairs or groups resulting from, e.g., a same root-cause or event, especially where the change-points, outliers, patterns, and anomalies are provided by different sources. In embodiments, the association model 420 automatically links associated change-points, outliers, patterns, and anomalies into a single event observation. For example, the association model 420 determines that two or more change-points, outliers, patterns, and/or anomalies are related based on, e.g., common variables, related variables, and/or related dimensions having similar change-point, outlier, pattern, and/or anomaly types. Commonalities in aspects of the variables and dimension may be indicative of a common causal event giving rise to each of the associated change-points, outliers, patterns, and anomalies. Thus, in embodiments, the association model 420 analyzes the variables and dimensions of each change-point, outlier, pattern and/or anomaly and determines one or more of the change-points, outliers, patterns, and anomalies that are associated based on commonalities in the variables and dimensions.

In embodiments, the association model 420 determines associated change-points, outliers, patterns, and anomalies using, e.g., a machine learning model such as a classification model. In embodiments, the classification model is a supervised model that is trained based on feedback and/or training data. Accordingly, in some embodiments, the association model 420 may include a suitable classification model, such as a linear classifier as set forth above, including but not limited to, e.g., Fisher's linear discriminant or a naïve Bayes classifier, a multilayer perceptron, a support vector machine, kernel estimation such as k-Nearest Neighbor (k-NN), decision trees such as random-forests, neural networks including convolutional neural networks (CNN), association rule learning algorithms including Apriori algorithms and éclat algorithms, among other supervised classifiers and detection models including combinations thereof. In other embodiments, the association model 420 may include unsupervised models, such as clustering including k-means clustering, among other clustering and other unsupervised models, and detection models including combinations thereof. Using one or more the supervised and unsupervised models, the association model 420 may combine the associated change-points, outliers, patterns, and anomalies into a single anomaly including, e.g., the metadata and other change-points, outliers, patterns, and/or anomalies information to form an event observation for each change-point, outlier, pattern, and/or anomaly. Thus, in embodiments, the detected change-points, outliers, patterns, and anomalies may be reduced down to a reduced set of unique change-points, outliers, patterns, and anomalies by combining related change-points, outliers, patterns, and anomalies.

In an embodiment, where the detection model 310 is a univariate detection model, the reduced set of change-points, outliers, patterns, and anomalies including the record of associations in the event observation via, e.g., associated metadata or linked files, are communicated from the association model 420 to each of a classification model 430, a severity model 440 and a root cause model 450. In other embodiments, the set of change-points, outliers, patterns, and anomalies are communicated from the association model 420 to each of a classification model 430, a severity model 440 and a root cause model 450.

In some embodiments, a classification model 430 may receive the reduced set of change-points, outliers, patterns, and anomalies from the association model 420, such as, without limitation, by accessing a memory or storage of the association model 420, by accessing a common memory or storage, or by receiving a transfer of the reduced set of change-point, outlier, pattern, and anomaly. The classification model 430 may then generate a classification recommendation for change-point, outlier, pattern, or anomaly type of each change-point, outlier, pattern, and/or anomaly in the reduced set. In some embodiments, change-points, outliers, patterns, and/or anomalies classifications may include a type that is indicative of, e.g., an actual event giving rise to the change-point, outlier, pattern, and/or anomaly, unknown, a market shift, a methodology change, a false-positive, a vendor error, a data error, a sensor error, a system error, a data pipeline processing error, among other change-points, outliers, patterns, and/or anomalies types.

In embodiments, the classification model 430 may determine a type of each change-point, outlier, pattern and/or anomaly in the reduced set of change-points, outliers, patterns, and/or anomalies s using a machine learning model to predict a type based on, e.g., variables, variable types, dimensions, source, and/or time according to information in, e.g., metadata of each change-point, outlier, pattern and/or anomaly. Based on the information in the metadata as well as variables, variable types and dimensions, the classification model 430 predicts a type according to, e.g., supervised training for change-points, outliers, patterns, and/or anomalies classification. In some embodiments, the classification model 430 may, therefore, include a supervised model, such as, a linear classifier set forth above, including but not limited to, e.g., Fisher's linear discriminant or a naïve Bayes classifier, a multilayer perceptron, a support vector machine, kernel estimation such as k-Nearest Neighbor (k-NN), decision trees such as random-forests, neural networks including convolutional neural networks (CNN), linear vector quantization, among other supervised classifiers and detection models including combinations thereof. In embodiments, the classification model 430 is trained in a supervised fashion to infer the type of each change-point, outlier, pattern, and/or anomaly by, e.g., the nature of the event. Where the datasets relate to, e.g., financial transactions, events may include, e.g., high sales, fraud, power outage, natural disaster, news coverage, or other events and externalities effecting financial transactions. The type may then be appended to the event observation of each change-point, outlier, pattern, and/or anomaly to update event observations with the classified type of the change-point, outlier, pattern, and/or anomaly for each event observation.

In an embodiment, the severity model 440 analyzes the associations of each change-point, outlier, pattern and/or anomaly as well as e.g., variables, variable types, dimensions, source, and/or time according to information in, e.g., metadata of each change-point, outlier, pattern, and/or anomaly, to recommend a severity relative to other change-points, outliers, patterns, and anomalies. In embodiments, severity refers to an importance of a change-point, outlier, pattern, or anomaly within the context of the data and/or type. For example, merchant sales may have a recommended severity in the form of a sales rank relative to other sales change-points, outliers, patterns, and anomalies.

Based on the information in the metadata as well as type, variables, variable types and dimensions, the severity model 440 predicts a severity according to, e.g., supervised training for change-points, outliers, patterns, and/or anomalies severity. In some embodiments, the severity model 440 may, therefore, include a supervised model, such as, a linear classifier set forth above, including, e.g., Fisher's linear discriminant or a naïve Bayes classifier, a multilayer perceptron, a support vector machine, kernel estimation such as k-Nearest Neighbor (k-NN), decision trees such as random-forests, neural networks including convolutional neural networks (CNN), linear vector quantization, among other supervised classifiers and detection models including combinations thereof. In embodiments, the severity model 440 is trained in a supervised fashion to infer the importance or severity, e.g., in the form of a rank within the reduced set of change-points, outliers, patterns, and anomalies. The severity may then be appended to the event observation of each change-point, outlier, pattern and/or anomaly to update event observations with the severity, importance and/or rank of the change-points, outliers, patterns, and/or anomalies for each event observation.

In an embodiment, the root-cause model 450 analyzes the associations of each change-point, outlier, pattern, and/or anomaly as well as e.g., variables, variable types, dimensions, source, and/or time according to information in, e.g., metadata of each change-point, outlier, pattern, and/or anomaly, to predict a root-cause recommendation of each change-point, outlier, pattern, and/or anomaly. In embodiments, the datasets and the change-points, outliers, patterns, and anomalies relate to financial transactions. In such embodiments, the root-cause may take the form of, e.g., promotions, holiday shopping, vacations, merchant fraud, account fraud, among other events causing outlier variations in transaction data.

Based on the information in the metadata as well as associations, variables, variable types and dimensions, the root-cause model 450 predicts the root-cause according to, e.g., supervised training classifying root-causes. For example, the root-cause model 450 may be trained with training datasets where a set of causal events giving rise to known anomalies are known and labeled in the data. Thus, the root-cause model 450 may be trained to recognize root-causes from characteristics of the change-points, outliers, patterns, and anomalies. Thus, in some embodiments, the root-cause model 450 may include a supervised model, such as, a linear classifier set forth above, including but not limited to, e.g., Fisher's linear discriminant or a naïve Bayes classifier, a multilayer perceptron, a support vector machine, kernel estimation such as k-Nearest Neighbor (k-NN), decision trees such as random-forests, neural networks including convolutional neural networks (CNN), linear vector quantization, among other supervised classifiers and detection models including combinations thereof. The predicted root-cause may then be appended to the event observation of each change-point, outlier, pattern, and/or anomaly to update event observations with the type of causal event associated with the change-points, outliers, patterns, and/or anomalies for each event observation.

In an embodiment, the classification model 430, the root-cause model 450 and the severity model 440 operate in parallel. Thus, prior to storing the event observations in a database 460, the type recommendation, the root-cause recommendation and the severity recommendation are merged into a common event observation having the associations, type, severity and root-cause of each change-point, outlier, pattern and/or anomaly detected by the ensemble detection method 410. The event observation for each change-point, outlier, pattern and/or anomaly may take the form of a separate file linked to the respective change-point, outlier, pattern, or anomaly, or may take the form of metadata of the change-point, outlier, pattern, or anomaly. Other forms of attaching the associations, type, severity and root-cause of each change-point, outlier, pattern and/or anomaly to form respective event observations are contemplated. Each event observation may then be stored in a COPA database 460, such as the COPA database 260 described above.

In an embodiment, each event observation is communicated to the COPA database 460. The database 460 is in communication with the visualization engine 470. In embodiments, the visualization engine 470 extracts the event observations from the COPA database 460 to generate visualizations of change-points, outliers, patterns, and/or anomalies data from the event observations. As such, in embodiments, the visualization engine 470 may be a part of the COPA engine 110 that operates responsive to API tasks, such as the API tasks 15 in the ECS 17 described above, or as a part of the ECS 17 itself. In embodiments, the visualization engine 470 is interactive via a GUI at a user device. Thus, the visualizations may be provided to a user's computing device. The user may then annotate, modify, remove, or otherwise interact with the data in the visualizations. In embodiments, user interactions are received by the visualization engine 470 and resubmitted to the COPA database 470 to update the event observations. Thus, the visualization engine 470 may provide a mechanism for both viewing the event observations in a user friendly, interpretable manner, as well as for receiving changes to the event observations.

In some embodiments, the recommendation engine 400 changes to event observations in the database 460 are tracked and recorded. The changes may then be fed back to the recommendation engine 400 via, e.g., backpropagation, to update and train each of the severity model 440, root-cause model 450, classification model 430, association model 420 and detection model 410. For example, in embodiments, an error function at each of the severity model 440, root-cause model 450, classification model 430, association model 420 and detection model 410 receives the updated event observations and compares the updated event observations to the event observations prior to the update. Each of the severity model 440, root-cause model 450, classification model 430, association model 420 and detection model 410 may then determine an error between the generated event observations and the updated event observations and, e.g., backpropagate the error to update models used for generating the event observations. However, other learning methods are contemplated.

In embodiments, the severity model 440, root-cause model 450, classification model 430, association model 420 and detection model 410 each only determine an error where a change related to the respective model is detected. For example, where a user changes a type of an anomaly, the visualization engine 470 may mark the anomaly as changed by type. The respective updated event observation may then only be sent to the classification model 430 to train the classification according to the change. However, the where user changes a severity, the event observation may be updated according to a change in severity and marked as such. The event observation may then be fed back to only the severity model 440 to train the severity model according to the change. Similarly, in embodiments, user changes with respect to change-point, outlier, pattern, and/or anomaly statues, associations, type, severity and root-cause may result in an update to the respective event observation with an indication of the change made so that the updated event observation may be fed back to the appropriate model of the recommendation engine 400. As a result, the recommendation engine 400 is continually updated and improved to more accurately and efficiently generate event observations indicative of characteristics of each anomaly in each time-series of data.

Figure 5:
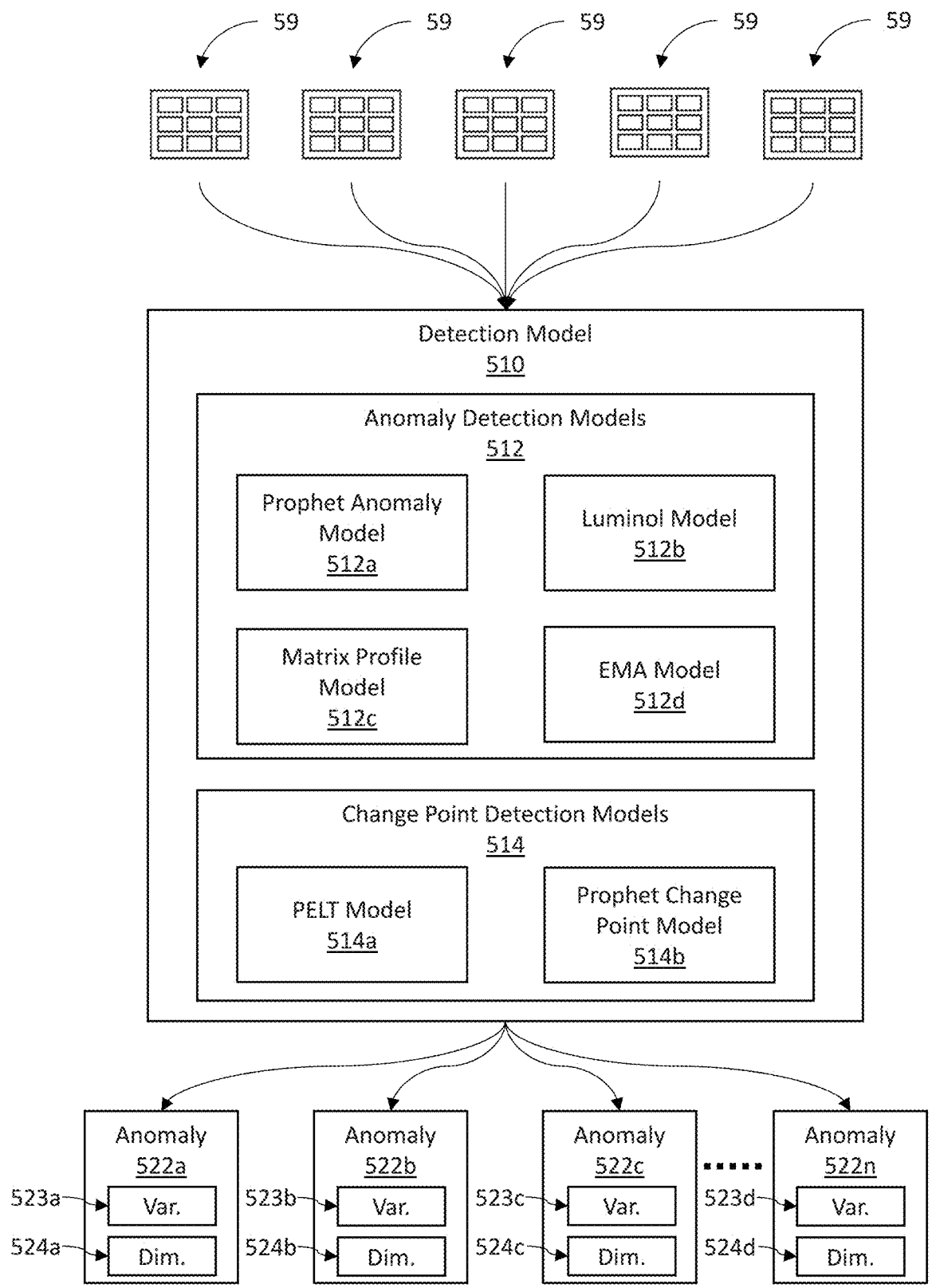

FIG. 5 is a block diagram of another exemplary anomaly recognition system 100 having a detection model for detecting change-points, outliers, patterns, and anomalies of an illustrative embodiment of the present disclosure.

In embodiments of an exemplary inventive anomaly recognition system 100, a detection model 510 may receive dataset 59 to identify anomalies 522a, 522b, 522c, through 522n. In an embodiment, the detection model 510 is configured to detect both anomalies in the dataset 59, as well as change-points. In this description, a change-point refers to a change in a dataset including, e.g., a change in mean, variance, correlation and/or spectral density. Accordingly, the detection model 510 may include both anomaly detection models 512 and change-point detection models 514. The anomaly detection models 512 and/or the change-point detection models 514 of the detection model 510 may include, e.g., a processing device, a memory device and/or a storage device. Alternatively, the models of the detection model 510 may share a common processing device, memory device and/or storage device.

In embodiments, the change-point detection models 514, outlier detection models 511, pattern detection models 513, and the anomaly detection models 512 are configured to operate in parallel. As such, each dataset 59 is provided to each of the anomaly detection models 512 and each of the change-point detection models 514 concurrently. Thus, a set of anomalies is generated by each model of the anomaly detection models 512 and the change-point detection models 514. In an embodiment, each of the models in the anomaly detection models 512 and the change-point detection models 514 may be different models that operate according to different methodologies and/or training sets. However, even without duplicate models, the set of anomalies detected in the dataset 59 by each model may include duplicates generated by multiple models of the anomaly detection models 512 and the change-point detection models 514. In an embodiment, to reduce memory consumption, the duplicate anomalies may be reduced by deleting one or more duplicate anomalies so only one instance of each detected anomaly is generated.

In some embodiment, the anomaly detection models 512 include approximately four detection models 512a, 512b, 512c and 512d. In an embodiment, the four models may include, e.g., a Prophet anomaly model 512a, a Luminol anomaly model 512b, a Matrix Profile anomaly model 512c and an exponential moving average (EMA) anomaly model 512d. Each of the anomaly detection models 512 analyzes each dataset 59 to determine anomalous data-points.

Similarly, in an embodiment, the change-point detection models 514 include approximately two detection models 514a and 514b. In an embodiment, the two models may include, e.g., a pruned extract linear time (PELT) model 514a and a Prophet anomaly model 514b. Each of the change-point detection models 514 analyzes each dataset 59 to determine change-points in the data.

In an embodiment, the detection model 510 aggregates all of the change-points and anomalies into, e.g., a list, a table, a tuple, an array, or as separate files for each change-point, outlier, pattern and/or anomaly compiled in a database such as the COPA database 260, 360, and/or 460 described above. As a result, the detection model 510 produces a set of detected anomalies 522a, 522b, 522c, through 522n, including change-points. In embodiments, each of the anomalies 522a-n include metadata having information for variables 523*a-n* related to the data-point of the respective anomaly 522*a-n*, as well as the dimensions 524*a-n* of the respective anomaly 522*a-n*. Thus, in embodiments, the anomalies 522*a-n* may be provided to, e.g., a recommendation engine, such as the recommendation engine 200, 300, or 400 described above. The recommendation engine may use the variable information 523*a-n* and the dimension information 524*a-n* contained in the metadata to predict characteristics of each anomaly 522*a-n*, such as, without limitation, associated anomalies 522*a-n* of the anomalies 522*a-n*, type, severity, root cause, among other characteristics. As a result, the detection model 510 of the exemplary inventive anomaly recognition system 100 detects and extracts anomalies 522*a-n* from a large set of time-series data 59 that is both accurate and makes efficient use of resources.

Figure 6:
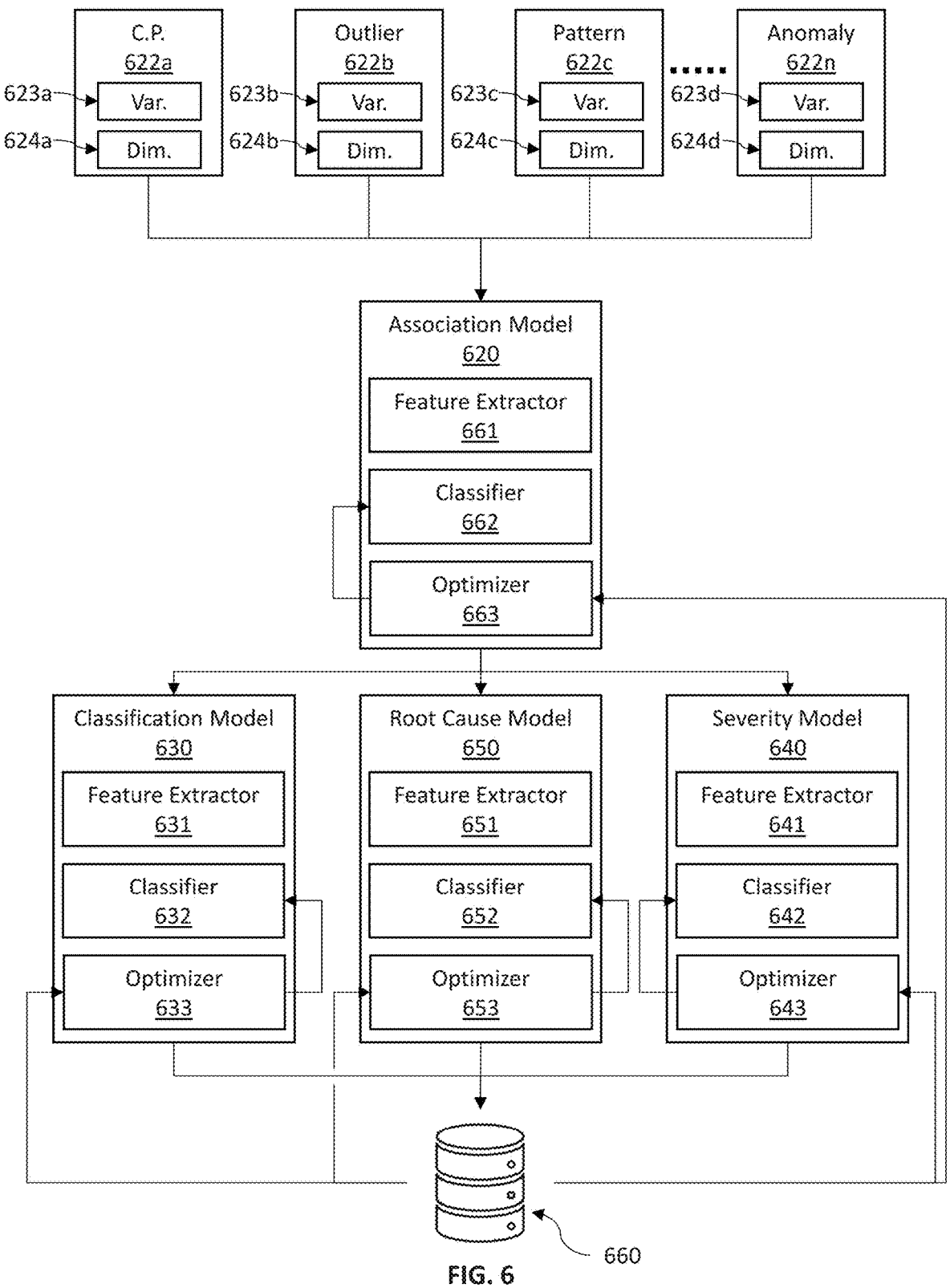

FIG. 6 is a block diagram of another exemplary anomaly recognition system 100 having a recommendation engine for recognizing and analyzing change-points, outliers, patterns, and anomalies in accordance with one or more embodiments of the present disclosure.

In embodiment, a set of detected events such as change-points 622*a*, outliers 622*b*, patterns 622*c*, and/or other anomalies 622*n* are communicated from a detection model, such as a detection model 210 described above, to a recommendation engine 600 via, e.g., a wired or wireless electronic connection. Herein, the events 622*a-n* include both detected anomalies and detected change-points, as well as any other outlier useful for interpreting the behavior of the time-series of data. In embodiments, each of the events 622*a-n* include metadata having information for variables 623*a-n* related to the data-point of the respective event 622*a-n*, as well as the dimensions 624*a-n* of the respective event 622*a-n*. Thus, in embodiments, the events 622*a-n* may be provided to a recommendation engine 600. The recommendation engine may use the variable information 623*a-n* and the dimension information 624*a-n* contained in the metadata to predict characteristics of each event 622*a-n*, such as, without limitation, other associated events 622*a-n* of the event 622*a-n*, type, severity, and/or root cause, among other characteristics.

The recommendation engine 600 may include, e.g., a processing device, a memory device and or a storage device for generating event observations with recommendations. The recommendation engine 600 may receive change-points, outliers, patterns, and anomalies from the detection model, e.g., in real-time with streaming or micro-batch the detection of change-points, outliers, patterns, and anomalies by the detection model, or, e.g. triggered by an external event, such as the notification of the availability of new data, e.g., on a periodic basis, such as, without limitation, hourly, daily, weekly, biweekly, monthly, or by another suitable period. The periodic basis may be the same as the detection period of the detection model or a different period.

In embodiments, the recommendations may include a severity rank, a classification, a relationship to other change-points, relationship to other outliers, relationship to other patterns, relationship to other anomalies, and/or a root-cause prediction, among other recommendations to a user to assist in diagnoses of root cause, disposition, and other forms of analysis. Thus, in embodiments, the recommendation engine 600 may include machine learning algorithms and/or models stored on the memory device and/or storage device, such as, without limitation, classification algorithms. Each type of recommendation may be performed by an independent machine learning model on independent hardware, or using a single model, such as a deep learning model, to at once determine each recommendation for each change-point, outlier, pattern and/or anomaly. In other embodiments, some recommendations may have individual associated models, while other recommendations may be produced with shared models.

In an embodiment, the recommendation engine 600 includes an association model 620 to predict or recommend a link between multiple anomalies and/or change-points, a classification model 630 to predict or recommend a classification of a type of change-point, outlier, pattern, or event 622*a-n*, a severity model 640 to predict or recommend a rank of the severity of the change-point, outlier, pattern, or event 622*a-n*, e.g., relative to each other change-points, outliers, patterns, and/or events 622*a-n*, and a root-cause model 650 to predict or recommend a root cause of the change-point, outlier, pattern, or anomaly. Each model of the recommendation engine 600 may include, e.g., a processing device, a memory device and or a storage device. Alternatively, the models of the recommendation engine 600 may share a common processing device, memory device and/or storage device.

In an embodiment, the association model 620 retrieves the detected events 622*a-n* from the detection model 610. In datasets, such as large datasets, many events 622*a-n* may exist in the data. While the events 622*a-n* may come from different data sources, such as from credit card transactions and from investment transactions, or any two or more different sources of data, or may present in different dataset or data types, some events 622*a-n* may be a result of a common event. It may be difficult and costly to sort through the events 622*a-n* and the change-points to infer associated pairs or groups resulting from, e.g., a same root-cause or event, especially where the events 622*a-n* are provided by different sources. In embodiments, the association model 620 automatically links associated events 622*a-n* into a single event observation. For example, the association model 620 determines that two or more events 622*a-n* and/or change-points are related based on, e.g., common variables, related variables, and/or related dimensions having similar change-point, outlier, pattern, and/or anomaly types. Commonalities in aspects of the variables and dimension may be indicative of a common causal event giving rise to each of the associated events 622*a-n*.

Therefore, in embodiments, the association model 620 includes a feature extractor 661 to analyze the variables and dimensions of each event 622*a-n* and generate a feature vector. Using the feature vector of each event 622*a-n*, the association model 620 may determine one or more of the events 622*a-n* that are associated based on commonalities in the variables and dimensions.

In embodiments, the association model 620 determines associated events 622*a-n* using, e.g., a machine learning model such as a classifier 662. In embodiments, the classifier 662 is a supervised model that is trained based on feedback and/or training data to receive the feature vector of each event 622*a-n* and generate an association with other similar events 622*a-n*. Accordingly, in some embodiments, the classifier 662 may include a suitable classification model, such as a linear classifier set forth above, including but not limited to, e.g., Fisher's linear discriminant or a naïve Bayes classifier, a multilayer perceptron, a support vector machine, kernel estimation such as k-Nearest Neighbor (k-NN), decision trees such as random-forests, neural networks including convolutional neural networks (CNN), association rule learning algorithms including Apriori algorithms and eclat algorithms, among other supervised classifiers and detection models including combinations thereof. In other embodiments, the classifier 662 may include unsupervised models, such as clustering including k-means clustering, among other clustering and other unsupervised models, and detection models including combinations thereof.

In an embodiment, the classifier 662 may generate, from the feature vector, a class associated with each, e.g., type of change in the respective time-series forming the events 622a-n. Thus, the classifier 662 may be trained based on types of data variations according to the variables 623a-n and the dimensions 624a-n using, e.g., supervised training. In an embodiment, the type of each event 622a-n is logged in an optimizer 663. In an embodiment, the event observation includes labeled data from a supervised learning data set. Using the types of data variation, the association model 620 may combine the events 622a-n with common data variation types into a single event 622a-n including, e.g., the metadata and other change-points, outliers, patterns, and/or anomalies information to form an event observation for each change-point, outlier, pattern, and/or anomaly. Thus, in embodiments, the detected anomalies 622a-n may be reduced down to a reduced set of unique events 622a-n by combining related event 622a-n.

In an embodiment, the reduced set of anomalies 622a-n including the record of associations in, e.g., associated metadata or linked files, are communicated from the association model 620 to each of a classification model 630, a severity model 640 and a root cause model 650.

In embodiments, a classification model 630 may receive the reduced set of events 622a-n from the association model 620, such as, without limitation, by accessing a memory or storage of the association model 620, by accessing a common memory or storage, or by receiving a transfer of the reduced set of events 622a-n. The classification model 630 may then generate a classification recommendation for change-point, outlier, pattern, or anomaly type of each change-point, outlier, pattern and/or anomaly in the reduced set. In embodiments, change-points, outliers, patterns, and/or anomalies classifications may include a type that is indicative of, e.g., an actual event giving rise to the change-point, outlier, pattern, and/or anomaly, unknown, a market shift, a methodology change, a false-positive, a vendor error, a data error, a sensor error, a system error, a data pipeline processing error, among other change-points, outliers, patterns, and/or anomalies types.

In embodiments, the classification model 630 includes a feature extractor 631 to analyze the variables and dimensions of each event 622a-n and generate a feature vector. Using the feature vector of each event 622a-n, the classification model 630 may generate a classification recommendation for change-point, outlier, pattern, or anomaly type of each event 622a-n.

In an embodiment, the classification model 630 uses the feature vector to generate the recommended classification using a trained model, such as a classifier 632. In embodiments, the classifier 662 is a supervised model that is trained based on feedback and/or training data to receive the feature vector of each event 622a-n and generate the type of anomaly according to, e.g., supervised training for change-points, outliers, patterns, and/or anomalies classification. In some embodiments, the classifier 632 may, therefore, include a supervised model, such as, a linear classifier set forth above, including but not limited to, e.g., Fisher's linear discriminant or a naïve Bayes classifier, a multilayer perceptron, a support vector machine, kernel estimation such as k-Nearest Neighbor (k-NN), decision trees such as random-forests, neural networks including convolutional neural networks (CNN), linear vector quantization, among other supervised classifiers and detection models including combinations thereof.

In embodiments, the classifier 632 is trained in a supervised fashion to infer the type of each change-point, outlier, pattern and/or anomaly by, e.g., the nature of the event. Where the datasets relate to, e.g., financial transactions, events may include, e.g., high sales, fraud, power outage, natural disaster, news coverage, or other events and externalities effecting financial transactions. Thus, in an embodiment, the classifier 632 may generate, from the feature vector, a class associated with each, e.g., type of event causing a respective event 622a-n in the respective time-series forming the events 622a-n. Thus, the classifier 632 may be trained based on types of events 622a-n according to the variables 623a-n and the dimensions 624a-n using, e.g., supervised training. In an embodiment, the type of each anomaly 622a-n is logged in an optimizer 633. The type may then be appended to the event observation of each change-point, outlier, pattern and/or anomaly to update event observations with the classified type of the change-points, outliers, patterns, and/or anomalies for each event observation.

In an embodiment, the severity model 640 analyzes the associations of each event 622a-n as well as e.g., variables, variable types, dimensions, source, and/or time according to information in, e.g., metadata of each change-point, outlier, pattern and/or anomaly, to predict a recommendation of a severity relative to other events 622a-n. In embodiments, severity refers to an importance of a change-point, outlier, pattern, or anomaly within the context of the data and/or type. For example, merchant sales may have a recommended severity in the form of a sales rank relative to other sales events 622a-n.

Based on the information in the metadata as well as type, variables, variable types and dimensions, the severity model 640 predicts a severity according to, e.g., supervised training for change-points, outliers, patterns, and/or anomalies severity. In embodiments, the severity model 640 includes a feature extractor 641 to analyze the variables and dimensions of each event 622a-n and generate a feature vector. Using the feature vector of each event 622a-n, the severity model 640 may generate the severity recommendation for each event 622a-n.

In an embodiment, the severity model 640 uses the feature vector to generate the recommended severity using a trained model, such as a classifier 642. In embodiments, the classifier 642 is a supervised model that is trained based on feedback and/or training data to receive the feature vector of each event 622a-n and generate the recommended severity. In some embodiments, the classifier 642 may, therefore, include a supervised model, such as, a linear classifier set forth above, including, e.g., Fisher's linear discriminant or a naïve Bayes classifier, a multilayer perceptron, a support vector machine, kernel estimation such as k-Nearest Neighbor (k-NN), decision trees such as random-forests, neural networks including convolutional neural networks (CNN), linear vector quantization, among other supervised classifiers and detection models including combinations thereof.

In embodiments, the classifier 642 is trained in a supervised fashion to infer the importance or severity, e.g., in the form of a rank within the reduced set of events 622a-n. In an embodiment, the classifier 642 may generate, from the feature vector, a class associated with each, e.g., type of change in the respective time-series forming the anomalies 622a-n. Thus, the classifier 642 may be trained based on degrees of severity of data variations according to the variables 623a-n and the dimensions 624a-n using, e.g., supervised training. In an embodiment, the severity of each event 622*a-n* is logged in an optimizer 643. The severity may then be appended to the event observation of each change-point, outlier, pattern and/or anomaly to update event observations with the severity, importance and/or rank of the change-points, outliers, patterns, and/or anomalies for each event observation.

In an embodiment, the root-cause model 650 analyzes the associations of each change-point, outlier, pattern and/or anomaly as well as e.g., variables, variable types, dimensions, source, and/or time according to information in, e.g., metadata of each change-point, outlier, pattern and/or anomaly, to predict a root-cause recommendation of each change-point, outlier, pattern and/or anomaly. To do so, in embodiments, the root-cause model 650 includes a feature extractor 651 to analyze the variables and dimensions of each event 622*a-n* and generate a feature vector. Using the feature vector of each event 622*a-n*, the root-cause model 650 may generate the severity recommendation for each event 622*a-n*. In embodiments, the datasets and the events 622*a-n* relate to financial transactions. In such embodiments, the root-cause may take the form of, e.g., promotions, holiday shopping, vacations, merchant fraud, account fraud, among other events causing outlier variations in transaction data.

Based on the information in the metadata as well as associations, variables, variable types and dimensions as encoded in the feature vector, the root-cause model 650 predicts the root-cause according to, e.g., supervised training for classifying root-causes using a classifier 652. For example, the classifier 652 may be trained with training datasets where a set of causal events giving rise to known events 622*a-n* are known and labeled in the data. Thus, the classifier 652 may be trained to recognize root-causes from characteristics of the events 622*a-n* as encoded in the feature vector. Thus, in some embodiments, the classifier 652 may include a supervised model, such as, a linear classifier set forth above, including but not limited to, e.g., Fisher's linear discriminant or a naïve Bayes classifier, a multilayer perceptron, a support vector machine, kernel estimation such as k-Nearest Neighbor (k-NN), decision trees such as random-forests, neural networks including convolutional neural networks (CNN), linear vector quantization, among other supervised classifiers and detection models including combinations thereof.

In an embodiment, the classifier 652 may generate, from the feature vector, a class associated with each, e.g., actual event type causing the events 622*a-n* in the respective time-series. Thus, the classifier 652 may be trained based on types of events according to the variables 623*a-n* and the dimensions 624*a-n* using, e.g., supervised training. In an embodiment, the type of each event 622*a-n* is logged in an optimizer 653. The predicted root-cause may then be appended to the event observation of each change-point, outlier, pattern and/or anomaly to update event observations with the type of causal event associated with the change-points, outliers, patterns, and/or anomalies for each event observation.

In an embodiment, the classification model 630, the root-cause model 650 and the severity model 640 operate in parallel. However, in embodiments, such as described above with reference to FIG. 3, other configurations are possible. For example, the classification model 630 may generate a prediction prior to parallel predictions by both the root-cause model 650 and the severity model 640. Other configurations are contemplated. To the extent that the various models operate concurrently and/or in parallel, prior to storing the event observations in a database 660, the type recommendation, the root-cause recommendation and the severity recommendation are merged into a common event observation having the associations, type, severity and root-cause of each change-point, outlier, pattern and/or anomaly detected by the ensemble detection method 610. The event observation for each change-point, outlier, pattern and/or anomaly may take the form of a separate file linked to the respective change-point, outlier, pattern, or anomaly, or may take the form of metadata of the change-point, outlier, pattern, or anomaly. Other forms of attaching the associations, type, severity and root-cause of each change-point, outlier, pattern and/or anomaly to form respective event observations are contemplated. Each event observation may then be stored in a COPA database 660, such as the COPA database 260 described above.

In an embodiment, each event observation is communicated to the COPA database 660. The database 660 is in communication with a visualization engine. In embodiments, the visualization engine extracts the event observations from the COPA database 660 to generate visualizations of change-points, outliers, patterns, and/or anomalies data from the event observations. As such, in embodiments, the visualization engine may be a part of the COPA engine 110 that operates responsive to API tasks, such as the API tasks 15 in the ECS 17 described above, or as a part of the ECS 17 itself. In embodiments, the visualization engine is interactive via a GUI at a user device. Thus, the visualizations may be provided to a user's computing device. The user may then annotate, modify, remove, or otherwise interact with the data in the visualizations. In embodiments, user interactions are received by the visualization engine and resubmitted to the COPA database 660 to update the event observations. Thus, the visualization engine may provide a mechanism for both viewing the event observations in a user friendly, interpretable manner, as well as for receiving changes to the event observations.

In some embodiments, the changes from recommendation engine 600 to event observations are tracked and recorded, e.g., in each optimizer 663, 633, 643, and 653, as described above. The changes due to user input as stored in the COPA database 660 may then be fed back to the recommendation engine 600 via, e.g., backpropagation, to update and train each of the severity model 640, root-cause model 650, classification model 630 and association model 620. For example, in embodiments, an error function at each of the optimizer 643 of the severity model 640, the optimizer 653 of the root-cause model 650, the optimizer 633 of the classification model 630 and the optimizer 663 of the association model 620 receives the updated event observations and compares the updated event observations to the event observations prior to the update. Each of the optimizers 663, 633, 643 and 653 may then determine an error between the predicted anomaly recommendations and the updated event observations and, e.g., backpropagate the error to each respective classifier 662, 632, 642 and 652 to update the models used for generating the event observations. However, other learning methods are contemplated.

In embodiments, the optimizers 643, optimizers 653, optimizers 633 and optimizers 663 each only determine an error where a change related to the respective model is detected. For example, where a user changes a type of an anomaly, the visualization engine may mark the anomaly as changed by type. The respective updated event observation may then only be sent to the classification model 630 to train the classifier 632 according to an error determined by the optimizer 633 based on the change. However, where user changes a severity, the event observation may be updated according to a change in severity and marked as such. The event observation may then be fed back to only the severity model 640 to train the classifier 642 according to an error determined by the optimizer 643 based on the change. Similarly, in embodiments, user changes with respect to change-point, outlier, pattern, and/or anomaly statuses, associations, type, severity and root-cause may result in an update to the respective event observation with an indication of the change made so that the updated event observation may be fed back to the appropriate model of the recommendation engine 600. As a result, the recommendation engine 600 is continually updated and improved to more accurately and efficiently generate event observations indicative of characteristics of each anomaly in each time-series of data.

Figure 7:
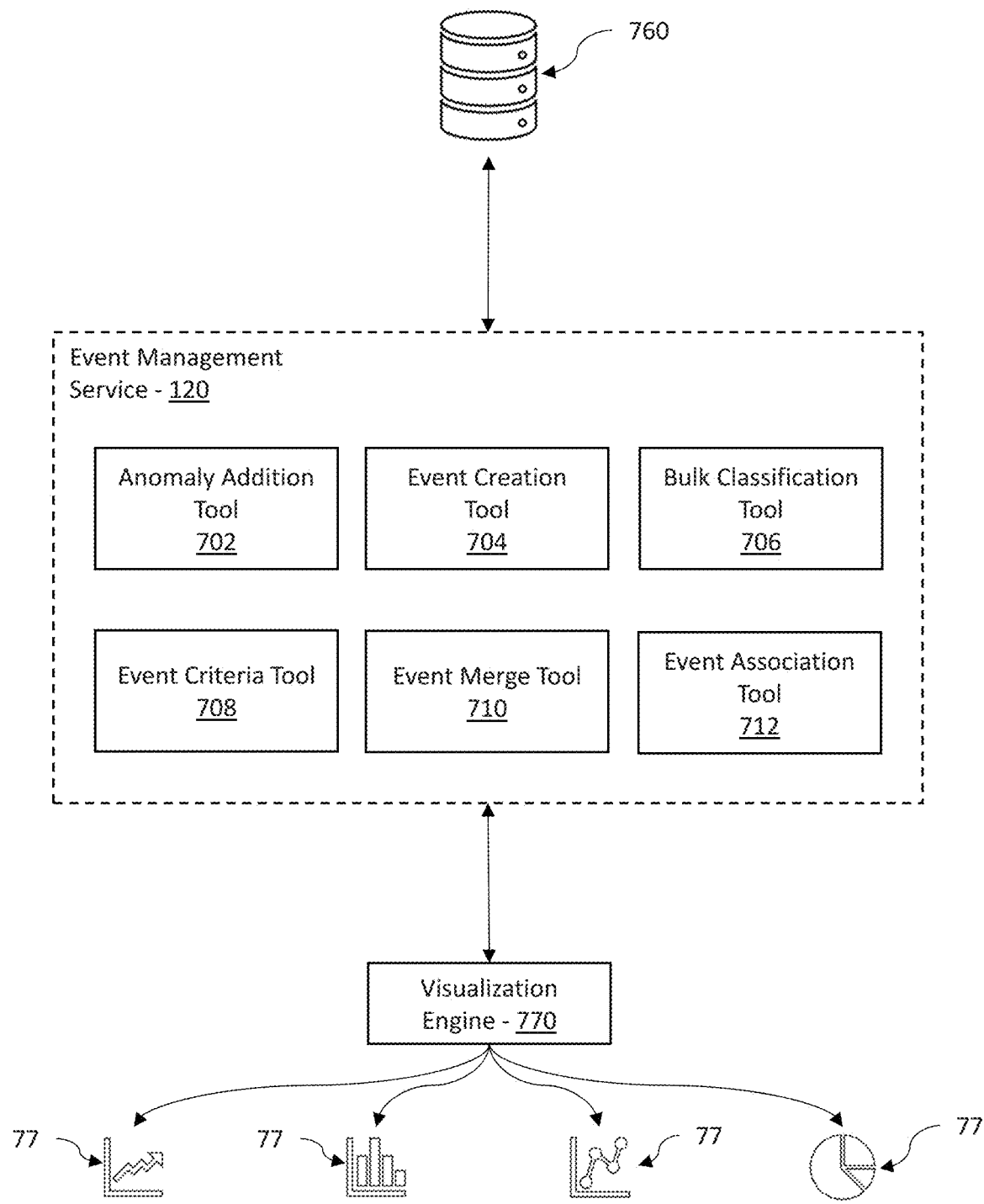

FIG. 7 is a block diagram of an exemplary event management service for manually recognizing, analyzing and managing change-points, outliers, patterns, and anomalies for manual definition of modification of events in the exemplary event recognition system of an illustrative embodiment of the present invention. in accordance with one or more embodiments of the present disclosure.

In an embodiment, the database 760 may include stored event observations and associated change-points, outliers, patterns, and/or anomalies, as well as individual change-points, outliers, patterns, and/or anomalies. While the COPA engine 110, as described above, may automatically determine associations amongst the change-points, outliers, patterns, and/or anomalies to produce the event observations, manual management of the change-points, outliers, patterns, and/or anomalies and events may be beneficial, e.g., for training the models of the COPA engine 110, correcting incorrectly associated change-points, outliers, patterns, and/or anomalies, and otherwise manage events and change-points, outliers, patterns, and/or anomalies. Accordingly, the database 760 is in communication with the event management service 120 and a visualization engine 770.

In embodiments, the event management service 120 and the visualization engine 770 may be programmed to extract the event observations from the database 760 to generate visualizations 77 of change-points, outliers, patterns, and/or anomalies data from the event observations, as well as event observations themselves. As such, in embodiments, the visualization engine 770 may be a part of the event management service 120 that operates responsive to API tasks, such as the API tasks 15 in the ECS 17 described above, or as a part of the ECS 17 itself.

In embodiments, the visualization engine 770 may be interactive via a GUI at a user device. Thus, the visualizations 77 may be provided to a user's computing device. The user may then annotate, modify, remove, or otherwise interact with the data in the visualizations 77 using the various tools of the event management service 120 to manage associations amongst change-points, outliers, patterns, and/or anomalies and events including the change-points, outliers, patterns, and/or anomalies. In embodiments, user interactions are received by the event management service 120 via the visualization engine 770 and resubmitted to the database 770 to update the event observations as well as the individual change-points, outliers, patterns, and/or anomalies. Thus, the visualization engine 770 may provide a mechanism to engage with the tools of the event management service 120 to manually manage datasets in a way to make building and scoring multi-dimensional detection models as straightforward as possible. The system also provides data storage and management capacity to subsequently record and manage identified events and their relationships to individual observations, be they univariate change-points, anomalies, patterns, and/or outliers or not, in each appropriate variable both viewing the event observations in a user friendly, interpretable manner, as well as receive changes to the event observations.

For example, in some embodiments, the visualization engine 770 may provide user interactable interfaces for interacting with the event management service 120 to manage both events recorded in the database 760, as well as manage individual change-points, outliers, patterns, and/or anomalies in the database 760. For example, the visualization engine 770 may provide a dashboard (see, for example, FIG. 12) allowing the user to select views for engaging with different tools of the event management service 120.

In some embodiments, a change-points, outliers, patterns, and/or anomalies (referred to collectively as "individual observations") explorer view (see, FIG. 13) may provide access to anomaly management tools of the event management service 120. In some embodiments, for example, the event management service 120 may include an anomaly addition tool 702 to add recorded individual observations to an existing event in the database 760. The event management service 120 may, also or instead, include an event creation tool 704 that enables a user to create an event from a selection of detected individual observations. The event management service may, also or instead, include a bulk classification tool 706 to bulk classify recorded individual observations, e.g., as being associated with an event or each other, or both. Other tools may be implemented in the event management service 120 and produced for user interaction by the visualization engine 770 in order to enable a user to manually manage associations amongst various individual observations.

In some embodiments, an events view (see, FIG. 27) may provide access to event management tools of the event management service 120. The event management service 120 may, also or instead, include an event criteria tool 708 to establish criteria and create events from anomalies in the database 760 that meet the criteria. The event management service 120 may, also or instead, include an event merge tool 710 to merge events in the database 760, such as events that match each other but were not detected as a common event by the COPA engine 110. The event management service 120 may, also or instead, include an event dissociation tool 712 to view events and the individual observations associated therewith, and dissociate selected individual observations from the events. Other tools may be implemented in the event management service 120 and produced for user interaction by the visualization engine 770 in order to enable a user to manually manage events recorded in the database 760 (e.g., detected by the COPA engine 110) including the individual observations associated with the events.

Figure 8:
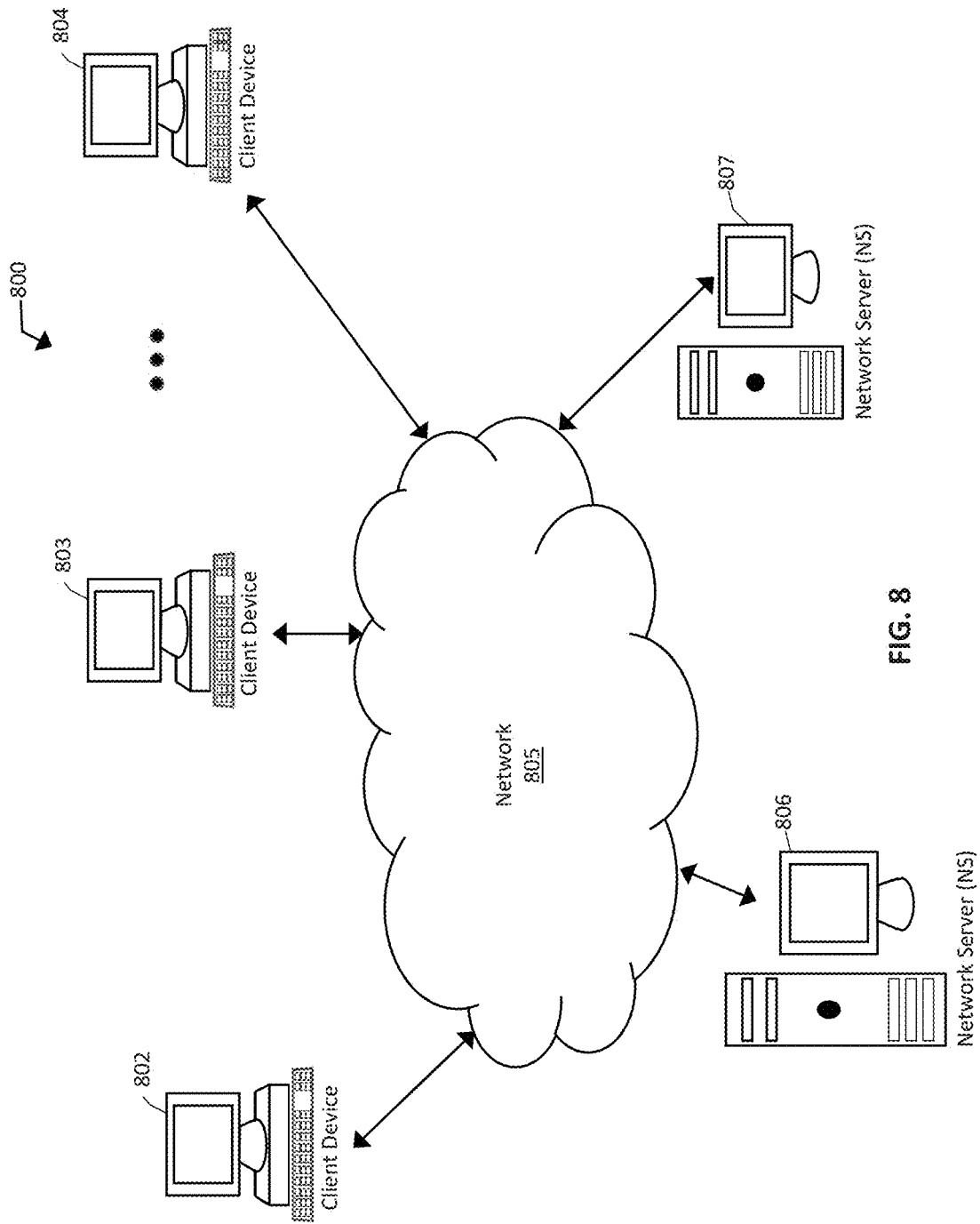

FIG. 8 depicts a block diagram of an exemplary computer-based system/platform 800 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform 800 may be configured to manage a large number of members and/or concurrent transactions, as detailed herein. In some embodiments, the exemplary computer-based system/platform 800 may be based on a scalable computer and/or network architecture that incorporates various strategies for assessing the data, caching, searching, and/or database connection pooling. An example of the scalable architecture is an architecture that is capable of operating multiple servers.

In some embodiments, referring to FIG. 8, members 802-804 (e.g., clients) of the exemplary computer-based system/platform 800 may include virtually any computing device capable of receiving and sending a message over a network (e.g., cloud network), such as network 805, to and from another computing device, such as servers 806 and 807, each other, and the like. In some embodiments, the member devices 802-804 may be personal computers, multiprocessor systems, microprocessor-based or programmable consumer electronics, network PCs, and the like. In some embodiments, one or more member devices within member devices 802-804 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 802-804 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, Wi-Fi, Wi-Max, CDMA, satellite, Zigbee, etc.). In some embodiments, one or more member devices within member devices 802-804 may run one or more applications, such as Internet browsers, mobile applications, voice calls, video games, videoconferencing, and email, among others. In some embodiments, one or more member devices within member devices 802-804 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 802-804 may be specifically programmed by either Java™, .Net, QT, C, C++ and/or other suitable programming language. In some embodiments, one or more member devices within member devices 802-804 may be specifically programmed to include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 805 may provide network access, data transport and/or other services to any computing device coupled to it. In some embodiments, the exemplary network 805 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (Wi-MAX) forum. In some embodiments, the exemplary network 805 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 805 may include and implement, as an alternative or in conjunction with one or more of the above, a Wi-MAX architecture defined by the Wi-MAX forum. In some embodiments and, optionally, in combination of any embodiment described above or below, the exemplary network 805 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 805 may be transmitted based at least in part on one of more communication modes such as but not limited to: NFC, RFID, Narrow Band Internet of Things (NBIOT), Zigbee, 3G, 4G, 5G, GSM, GPRS, Wi-Fi, Wi-Max, CDMA, satellite and any combination thereof. In some embodiments, the exemplary network 805 may also include mass storage, such as network attached storage (NAS), a storage area network (SAN), a content delivery network (CDN) or other forms of computer or machine-readable media.

In some embodiments, the exemplary server 806 or the exemplary server 807 may be a web server (or a series of servers) running a network operating system, examples of which may include but are not limited to Microsoft Windows Server™, Novell NetWare™, or Linux™ In some embodiments, the exemplary server 806 or the exemplary server 807 may be used for and/or provide cloud and/or network computing. Although not shown in FIG. 8, in some embodiments, the exemplary server 806 or the exemplary server 807 may have connections to external systems like email, SMS messaging, text messaging, ad content providers, etc. Any of the features of the exemplary server 806 may be also implemented in the exemplary server 807 and vice versa.

In some embodiments, one or more of the exemplary servers 806 and 807 may be specifically programmed to perform, in a non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 801-804.

In some embodiments and, optionally, in combination with any embodiment described above or below, for example, one or more exemplary computing member devices 802-804, the exemplary server 806, and/or the exemplary server 807 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 9:
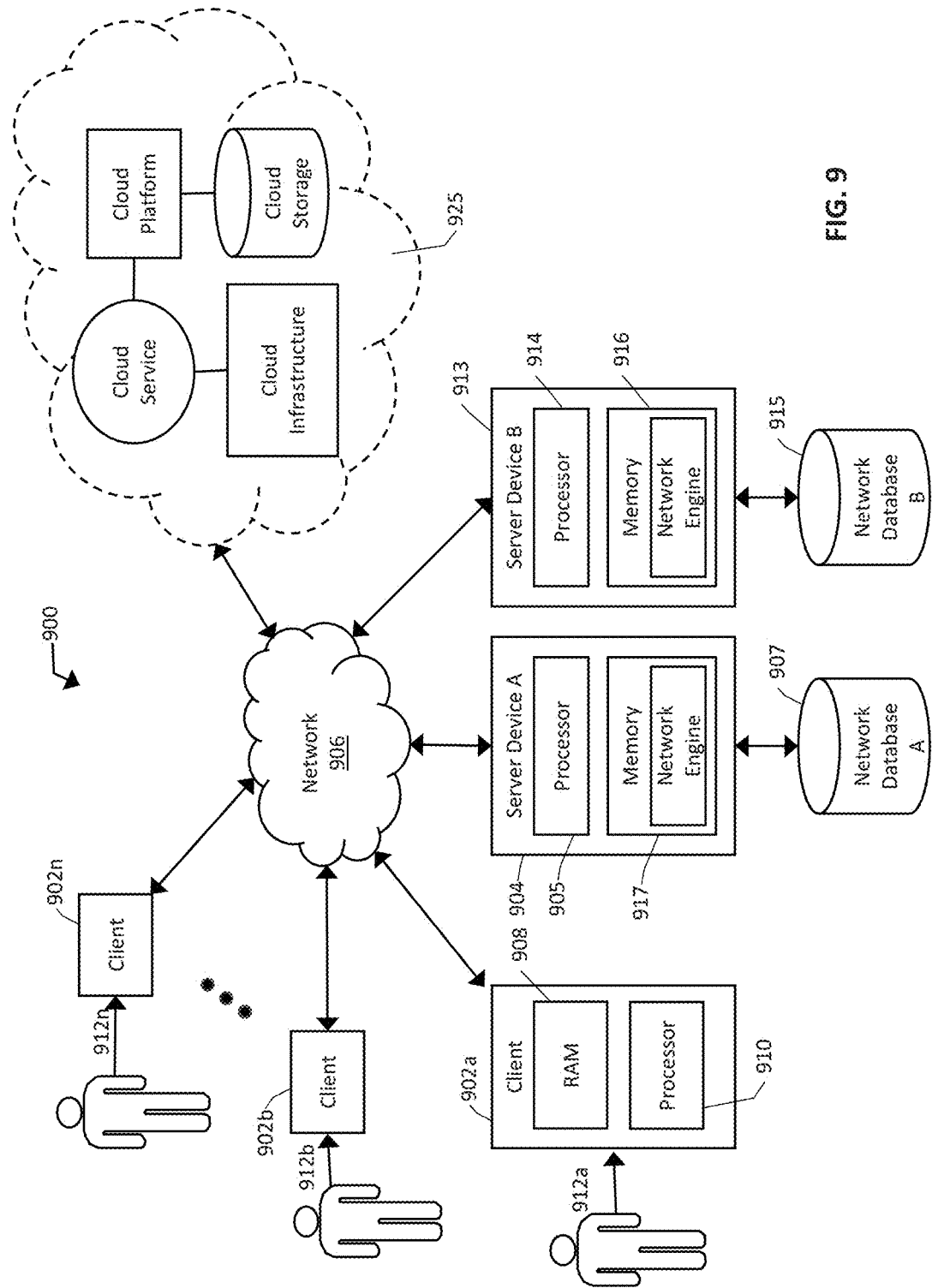

FIG. 9 depicts a block diagram of another exemplary computer-based system/platform 900 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 902a, 902b thru 902n shown each at least includes a computer-readable medium, such as a random-access memory (RAM) 908 coupled to a processor 910 or FLASH memory. In some embodiments, the processor 910 may execute computer-executable program instructions stored in memory 908. In some embodiments, the processor 910 may include a microprocessor, an ASIC, and/or a state machine. In some embodiments, the processor 910 may include, or may be in communication with, media, for example computer-readable media, which store instructions that, when executed by the processor 910, may cause the processor 910 to perform one or more steps described herein. In some embodiments, examples of computer-readable media may include, but are not limited to, an electronic, optical, magnetic, or other storage or transmission device capable of providing a processor, such as the processor 910 of client 902a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor may read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java™, Python, Perl, JavaScript™, and others.

In some embodiments, member computing devices 902a-n may also comprise a number of external or internal devices such as a mouse, a CD-ROM, DVD, a physical or virtual keyboard, a display, or other input or output devices. In some embodiments, examples of member computing devices 902a-n (e.g., clients) may be any type of processor-based platforms that are connected to a network 906 such as, without limitation, personal computers, digital assistants, personal digital assistants, smart phones, pagers, digital tablets, laptop computers, Internet appliances, and other processor-based devices. In some embodiments, member computing devices 902a-n may be specifically programmed with one or more application programs in accordance with one or more principles/methodologies detailed herein. In some embodiments, member computing devices 902a-n may operate on any operating system capable of supporting a browser or browser-enabled application, such as Microsoft™, Windows™, and/or Linux™. In some embodiments, member computing devices 902a-n shown may include, for example, personal computers executing a browser application program such as Microsoft Corporation's™ Internet Explorer™, Apple Computer, Inc.'s Safari™, Mozilla Firefox™, and/or Opera™. In some embodiments, through the member computing client devices 902a-n, users, 912a-n, may communicate over the exemplary network 906 with each other and/or with other systems and/or devices coupled to the network 906. As shown in FIG. 9, exemplary server devices 904 and 913 may be also coupled to the network 906. In some embodiments, one or more member computing devices 902a-n may be mobile clients.

In some embodiments, at least one database of exemplary databases 907 and 915 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle™ database, IBM DB2, Adaptive Server Enterprise, FileMaker, Microsoft Access™, Microsoft™ SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that are stored. In some embodiments, the database may be simply a collection of similarly structured files, such as JSON, Avro, Parquet, or ORC that facilitate type-safe queries and processing using analytical engines such as Apache Spark™, Apache Hadoop™, Apache Hive™ or the Amazon Athena™ serverless query service. These files may be organized into partitions in order provide more efficient and therefore faster execution of analyses performed on the data contained therein. In some embodiments the files may be stored in distributed filesystems, such as the Apache Hadoop™ File System, or object stores such as Amazon Simple Storage Service™ to provide faster execution of queries via parallel read/write and computation on the files. In some embodiments the files may be stored entirely in memory as data frames in analytical engines such as Python™, R, Scala, or Spark™ for faster execution of analyses.

Figure 10:
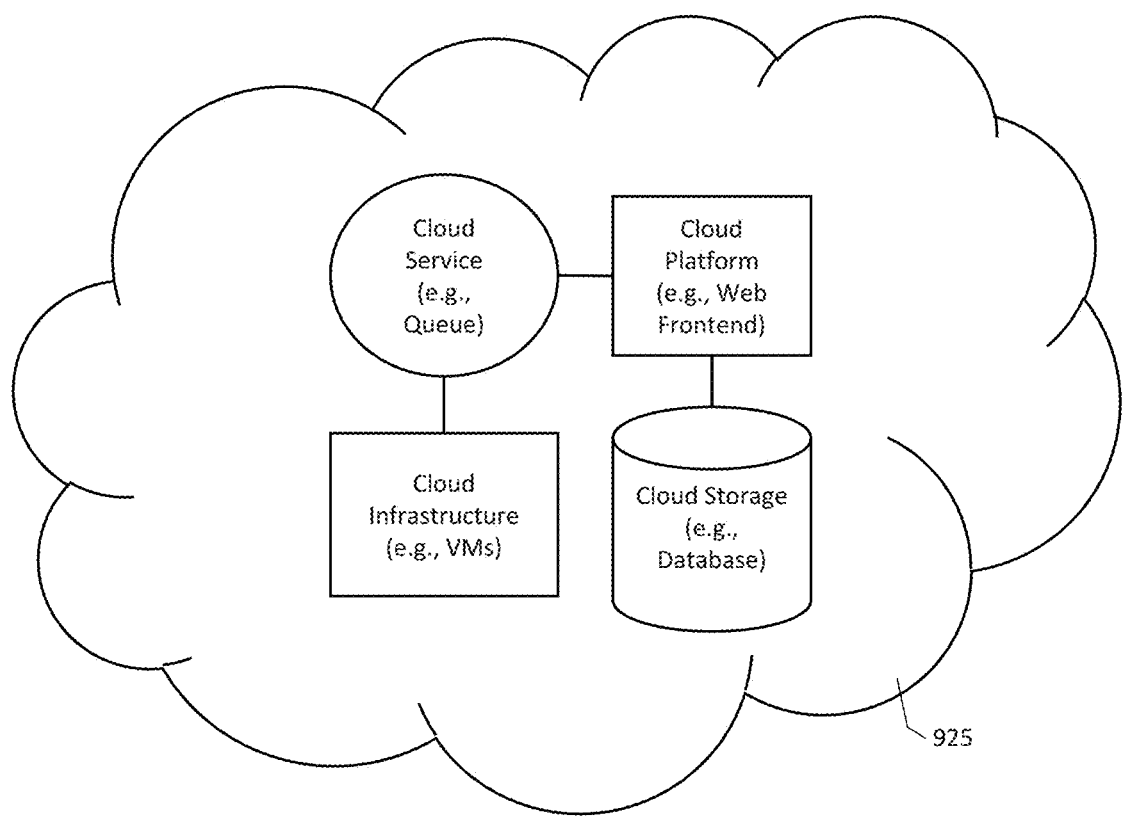
Figure 11:
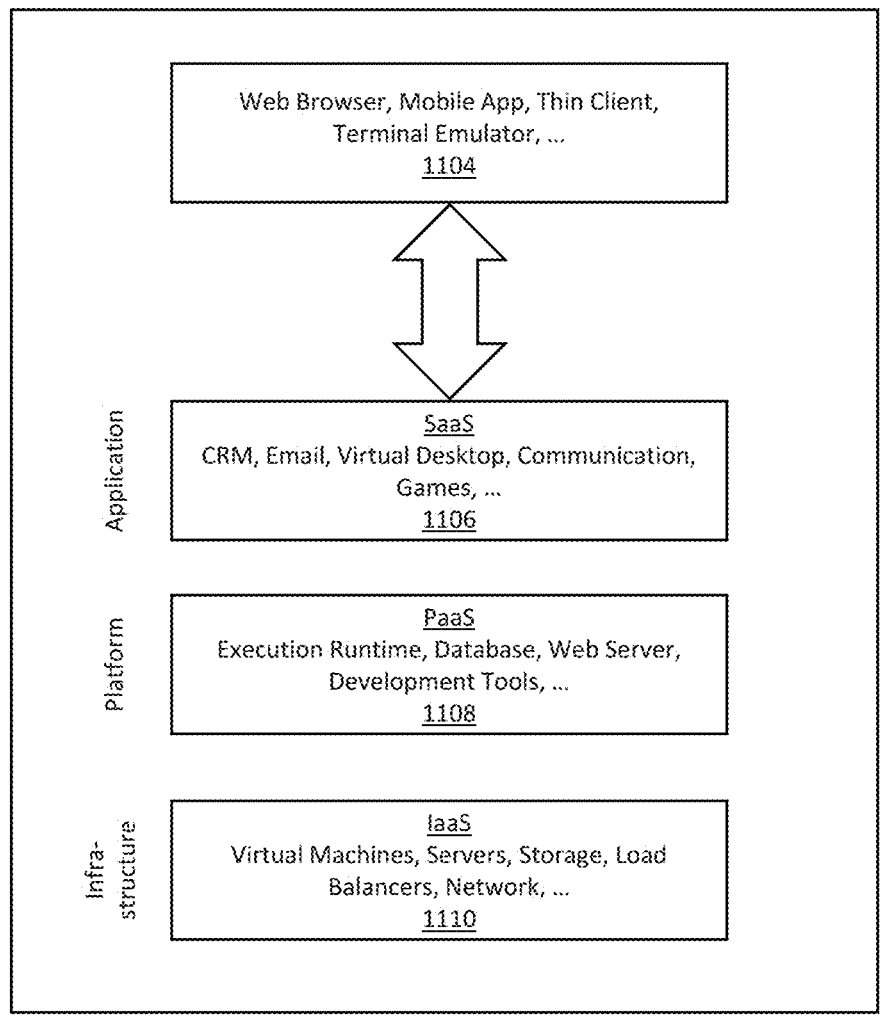

In some embodiments, the exemplary inventive computer-based systems/platforms, the exemplary inventive computer-based devices, and/or the exemplary inventive computer-based components of the present disclosure may be specifically configured to operate in a cloud computing/architecture such as, but not limited to: infrastructure a service (IaaS) 1110, platform as a service (PaaS) 1108, and/or software as a service (SaaS) 1106 using a web browser, mobile app, thin client, terminal emulator or other endpoint 1104. FIG. 10 and FIG. 11 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

In some embodiments, the exemplary inventive computer-based systems of the present disclosure may be configured to utilize one or more exemplary AI/machine learning techniques chosen from, but not limited to, decision trees, boosting, support-vector machines, neural networks, nearest neighbor algorithms, Naive Bayes, bagging, random-forests, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:
  i) Define neural network architecture/model,
  ii) Transfer the input data to the exemplary neural network model,
  iii) Train the exemplary model incrementally,
  iv) determine the accuracy for a specific number of timesteps,
  v) apply the exemplary trained model to process the newly-received input data,
  vi) optionally and in parallel, continue to train the exemplary trained model with a predetermined periodicity.

In some embodiments and, optionally, in combination with any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination with any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination with any embodiment described above or below, the exemplary aggregation function may be a mathematical function that combines (e.g., sum, product, etc.) input signals to the node. In some embodiments and, optionally, in combination with any embodiment described above or below, an output of the exemplary aggregation function may be used as input to the exemplary activation function. In some embodiments and, optionally, in combination with any embodiment described above or below, the bias may be a constant value or function that may be used by the aggregation function and/or the activation function to make the node more or less likely to be activated.

Examples of possible neural network structures may include, e.g., convolutional neural networks (CNN) having a suitable number of convolutional layers, recurrent neural networks (RNN) including gated recurrent units and/or long short-term memory (LSTM) units, graph neural networks (GNN), generative adversarial networks (GAN), and/or deep neural networks (DNN), among other neural network architectures.

Figure 12:
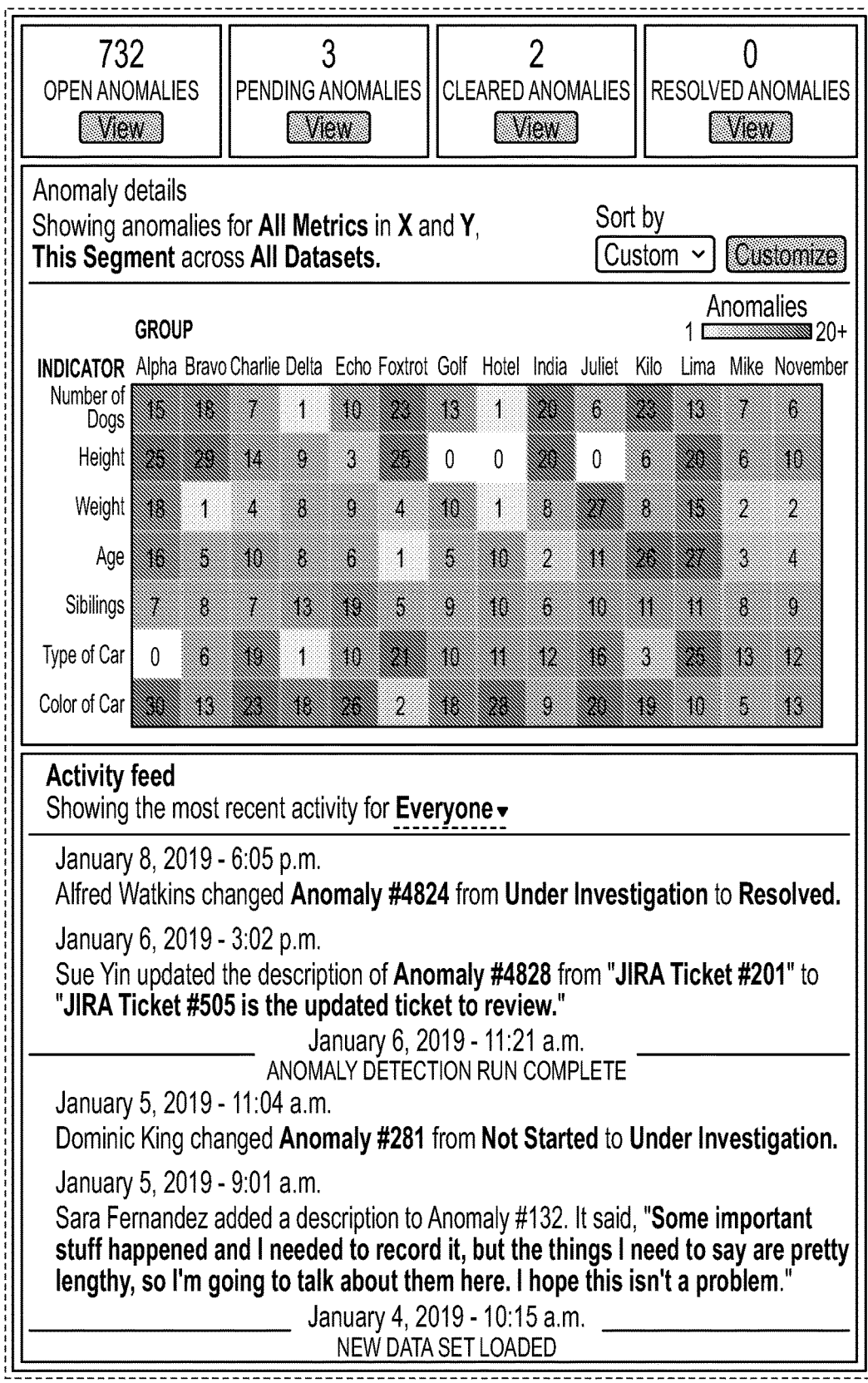

FIG. 12 is a depiction of a dashboard of an anomaly GUI for an exemplary anomaly recognition system 100 in accordance with one or more embodiments of the present disclosure.

In embodiments of the exemplary inventive anomaly recognition system 100, event observations associated with change-points, outliers, patterns, and anomalies in datasets may be provided to users via a GUI at a user computing device. In embodiments, the anomaly recognition system 100 may characterize detected change-points, outliers, patterns, and anomalies according to, e.g., type, associations with other change-points, outliers, patterns, and anomalies, severity, and root cause, among other characterizations. Additionally, the change-points, outliers, patterns, and anomalies may include information regarding, e.g., time and date of the anomaly, source, anomalous data, variables, dimensions, among other information. The information and the characterizations formed by the anomaly recognition system 100 may be included in, e.g., metadata of anomalous data, a file linked to the anomalous data, and/or in respective fields associated with the anomalous data in a table or list, among other formats. Visualization in the GUI may then be performed based on characterizations and information of the anomalous data. Accordingly, in embodiments, the GUI may include functions for organizing the change-points, outliers, patterns, and anomalies according to various combinations of information and characterizations. For example, as depicted in FIG. 12, a heat map may be constructed in the form of a two-dimensional grid, where columns relate to variations in one type of information, and rows related to variations in a second type of information. For example, rows may relate to type of data (e.g., height, weight, age, siblings, number of dogs, type of car, color of car, or any other data type), and columns may relate to a group of data gathered. Where rows and columns intersect, a number of anomalies having both the row and the column type of information may be tallied to cross-reference two types of information and characterizations for easy viewing and diagnosis of anomalous behaviors in the data. The dashboard may include one or more heat maps, or other types of visualizations, such as pie charts, line graphs, bar graphs, and/or geographic heat maps, among others.

Additionally, in embodiments, the dashboard may include workload information for a user. For example, a user may be accessing the GUI to address anomalous behaviors and be assigned, or otherwise have access to, a particular set of change-points, outliers, patterns, and anomalies. Alternatively, each permissioned user may be able to view information for all change-points, outliers, patterns, and anomalies. An overview of the set of change-points, outliers, patterns, and anomalies may be provided by showing a number of anomalies, a number of open anomalies, a number of cleared anomalies, a number of pending anomalies, and/or a number of resolved anomalies, among other general workload and overview information to facilitate ease of use and ease of navigation for addressing change-points, outliers, patterns, and anomalies provided by the exemplary anomaly recognition system 100.

In an embodiment, the dashboard may also provide a view of user activities in the form of an activity feed. The activity feed may show comments from a respective user and other users connected to the respective user, for example users in a workgroup. The activity feed may show substantially real-time updates for comments made for anomalies, annotations, status changes, external application integration behaviors, such as task management application integration with applications such as JIRA™, among other activities. The activity feed may be filterable by groups of users, e.g., "everyone", workgroup, department, office, location, among other filter categories. The activity feed may also provide updates on behaviors of the anomaly recognition system 100, such as, without limitation, a notification that a new data set has been loaded, that an anomaly detection run has occurred, and/or that an anomaly recommendation run has completed, among other anomaly recognition system 100 activities.

Figure 13:
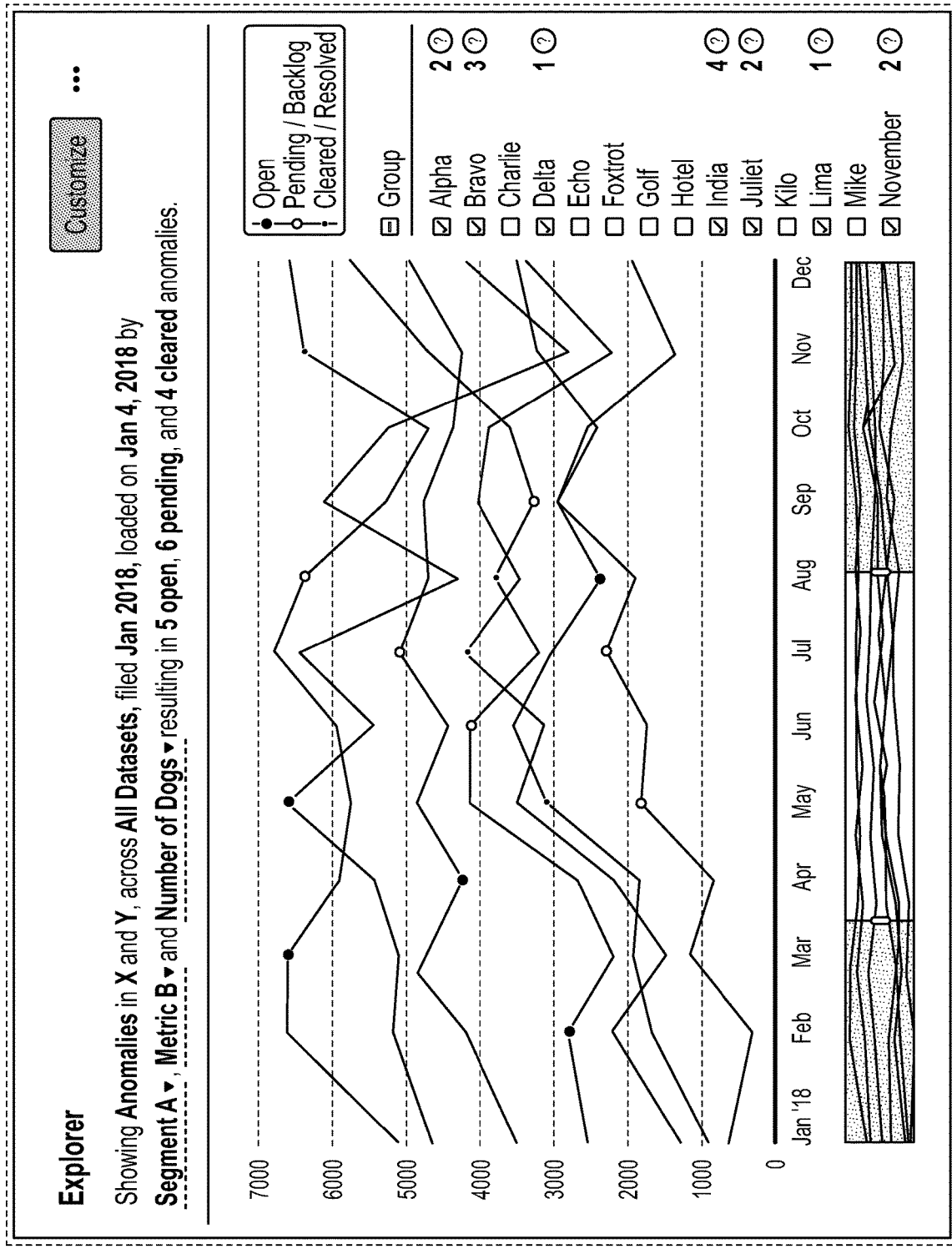

FIG. 13 is a depiction of an exploration screen of an anomaly GUI for an exemplary anomaly recognition system 100 in accordance with one or more embodiments of the present disclosure.

In embodiments of the exemplary inventive anomaly recognition system 100, event observations associated with change-points, outliers, patterns, and anomalies in datasets may be provided to users via a GUI at a user computing device. In embodiments, the anomaly recognition system 100 may characterize detected change-points, outliers, patterns, and anomalies according to, e.g., type, associations with other change-points, outliers, patterns, and anomalies, severity, and root cause, among other characterizations. Additionally, the change-points, outliers, patterns, and anomalies may include information regarding, e.g., time and date of the anomaly, source, anomalous data, variables, and/or dimensions, among other information. The information and the characterizations formed by the anomaly recognition system 100 may be included in, e.g., metadata of anomalous data, a file linked to the anomalous data, and/or in respective fields associated with the anomalous data in a table or list, among other formats.

Visualization in the GUI may then be performed based on characterizations and information of the anomalous data to facilitate user exploration of anomalies and anomaly trends. Accordingly, in embodiments, the GUI may include functions for organizing the change-points, outliers, patterns, and anomalies according to various combinations of information and characterizations. For example, as depicted in FIG. 13, an exploration screen of the GUI may include a graphical depiction of data and anomaly histories. A user may select groups or sets of data to view, and define the variables to plot according to the information and characterizations of the anomalies. For example, the x-axis may relate to type of data (e.g., date), and the y-axis may relate to a metric measured in the data. For example, the explorer screen may provide a dataset in a line graph showing number of dogs over time, with indications of anomalies and status of the anomalies. Thus, a user may easily view the historical data and when the anomalies occurred to easily determine which anomalies to address.

FIG. 14 is a depiction of an anomaly annotation tool in an exploration screen of an anomaly GUI for an exemplary anomaly recognition system 100 in accordance with one or more embodiments of the present disclosure.

In an embodiment, the explorer screen, such as the explorer screen of FIG. 13 described above, may include a tool for viewing and editing characteristics of particular anomalies. In embodiments, the exemplary inventive anomaly recognition system 100 may provide recommendations via, e.g., a recommendation engine, for characteristics of each anomaly, such as classification, severity, linked/associated other anomalies, and/or root cause, among other characterizations. The viewing and editing tool may display the characteristics of a selected anomaly, along with a field for comments or descriptions, and option to view anomaly history or additional details, and/or an option to override one or more recommended characteristics, among other options for modifying and annotating anomalies. For example, the anomaly recognition system 100 may recommend a severity rating of, e.g., 3 out of 5, and a user, upon viewing information related to the anomaly, may select to override the recommended rating and select a user determined rating. Similarly, in embodiments, the user may override the classification, root-cause, and/or associated anomalies, among other characteristics. Upon a change to a characteristic, the exemplary inventive anomaly recognition system 100 may feedback the user selected characteristics to the recommendation engine to train, e.g., a model associated with the characteristic being changed. Thus, the user may easily view and engage with recommended characteristics, while also improving the recommendations by correcting any incorrect recommendations.

Figure 15:
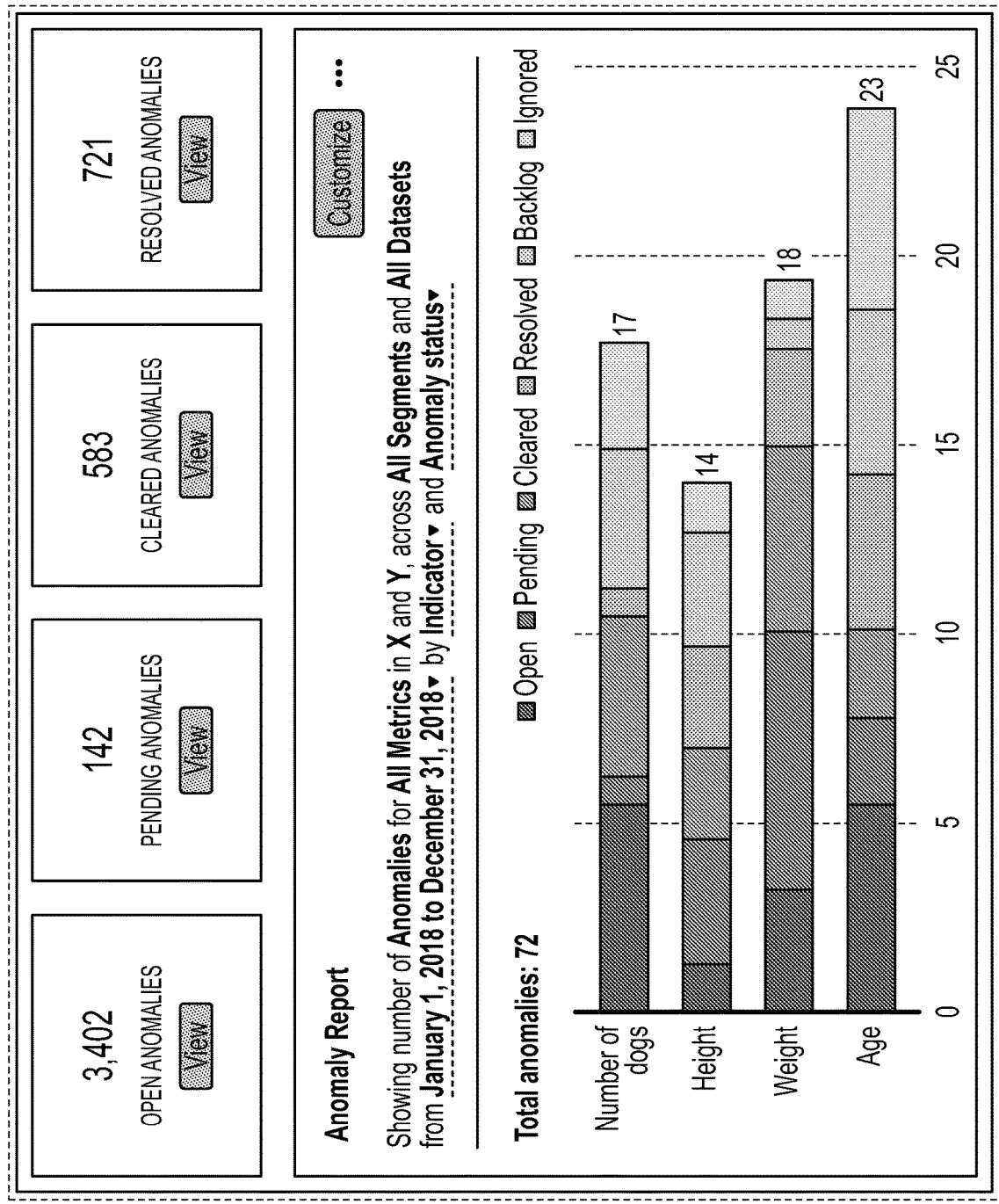

FIG. 15 is a depiction of an anomaly report overview of an anomaly GUI for an exemplary anomaly recognition system 100 in accordance with one or more embodiments of the present disclosure.

In embodiments, a reports section of a GUI for the exemplary inventive anomaly recognition system 100 may include an overview screen. The overview screen may include workload information for a user. For example, a user may be accessing the GUI to address anomalous behaviors and be assigned, or otherwise have access to, a particular set of change-points, outliers, patterns, and anomalies. Alternatively, each permissioned user may be able to view information for all change-points, outliers, patterns, and anomalies. An overview of the set of change-points, outliers, patterns, and anomalies may be provided by showing a number of anomalies, a number of open anomalies, a number of cleared anomalies, a number of pending anomalies, a number of resolved anomalies, among other general workload and overview information to facilitate ease of use and ease of navigation for addressing change-points, outliers, patterns, and anomalies provided by the exemplary anomaly recognition system 100.

Additionally, the overview screen may depict an anomaly report, depicting a visualization of change-points, outliers, patterns, and/or anomalies workload statistics. For example, the anomaly report may show a bar graph of a number of anomalies according to type of data, with each bar segmented by status of anomalies in a respective data type. Thus, a user may easily ascertain workload status across all data types being analyzed.

Figure 16:
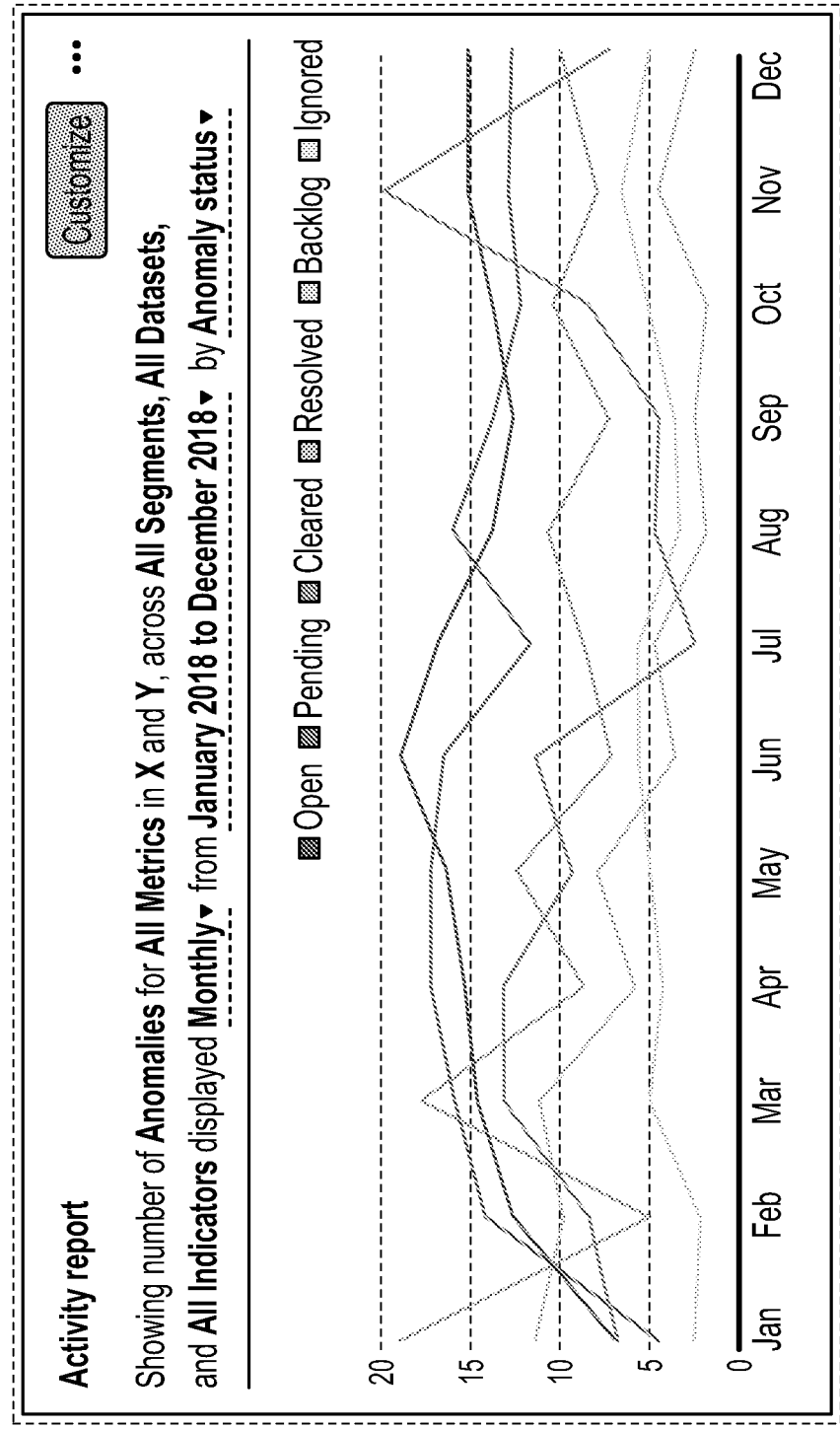

FIG. 16 is a depiction of an anomaly report history of an anomaly GUI for an exemplary anomaly recognition system 100 in accordance with one or more embodiments of the present disclosure.

In embodiments, a reports section of a GUI for the exemplary inventive anomaly recognition system 100 may include a historical overview screen including an activity report. In an embodiment, the historical overview screen may depict an activity report having a visualization of anomaly histories, for example, according to status of anomalies. However, histories with respect to other anomaly characteristics may also be visualized, such as histories of anomaly types, anomaly severity, data types, and/or percentages of anomalies for each data type, among other histories. In some embodiments, the activity report may show a number of open, pending, cleared, resolved, backlogged and ignored anomalies through time.

Figure 17:
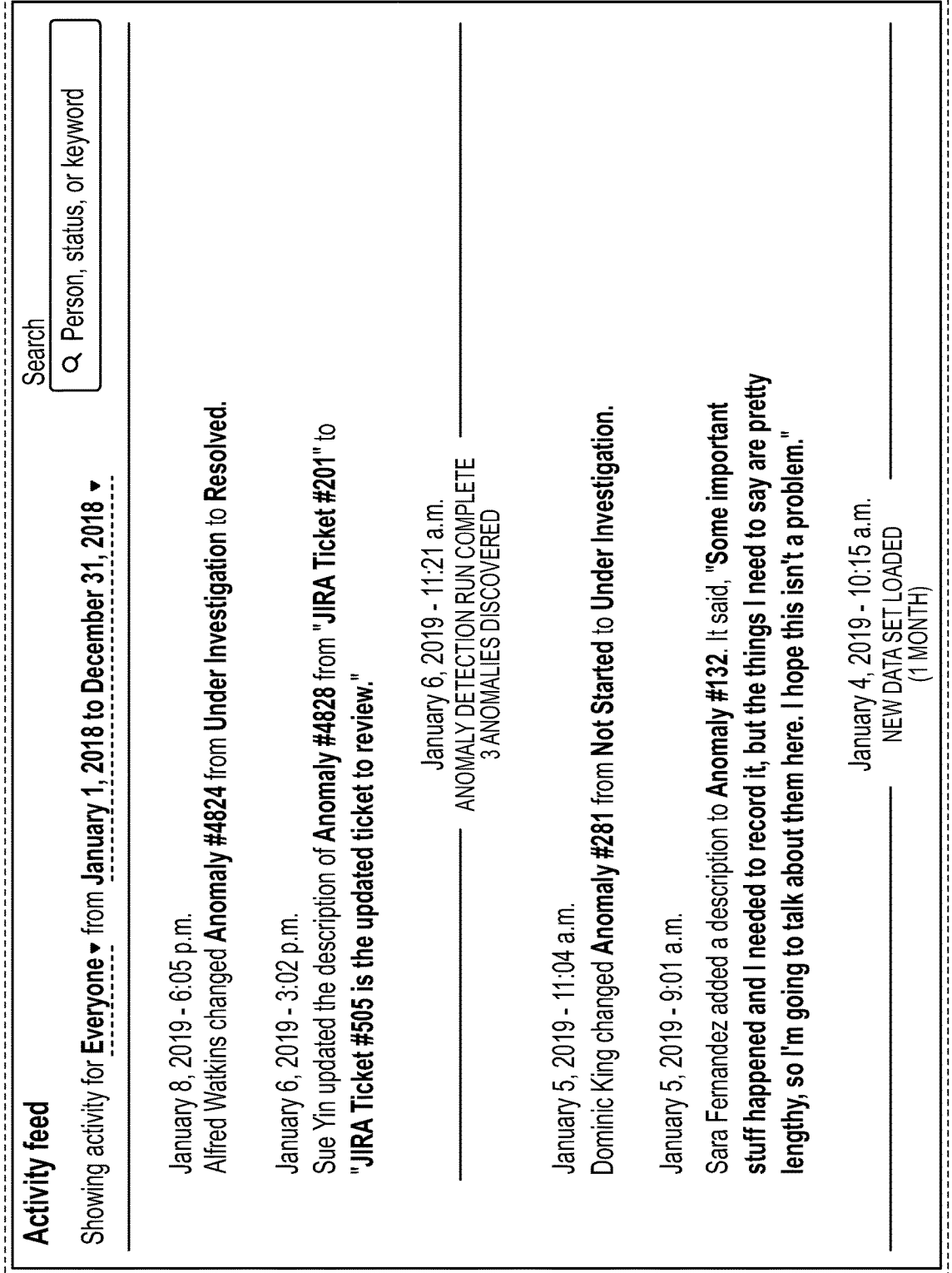

FIG. 17 is a depiction of an activity feed of an anomaly GUI for an exemplary anomaly recognition system 100 in accordance with one or more embodiments of the present disclosure.

In embodiments, a reports section of a GUI for the exemplary inventive anomaly recognition system 100 may include an activity feed. The activity feed may show comments from a respective user and other users connected to the respective user, for example users in a workgroup. The activity feed may show substantially real-time updates for comments made for anomalies, annotations, status changes, external application integration behaviors, such as task management application integration with applications such as JIRA™, among other activities during a selected time period. The activity feed may be filterable by groups of users, e.g., "everyone", workgroup, department, office, and/or location, among other filter categories. In embodiments, the activity feed may also include a capability for searching for particular users, anomalies, anomaly characteristics, anomaly status, and/or anomaly recognition system 100 activities, among other information. The activity feed may also provide updates on behaviors of the anomaly recognition system 100, such as, without limitation, a notification that a new data set has been loaded, and/or that an anomaly detection run has occurred, that an anomaly recommendation run has completed, among other anomaly recognition system 100 activities.

Figure 18:
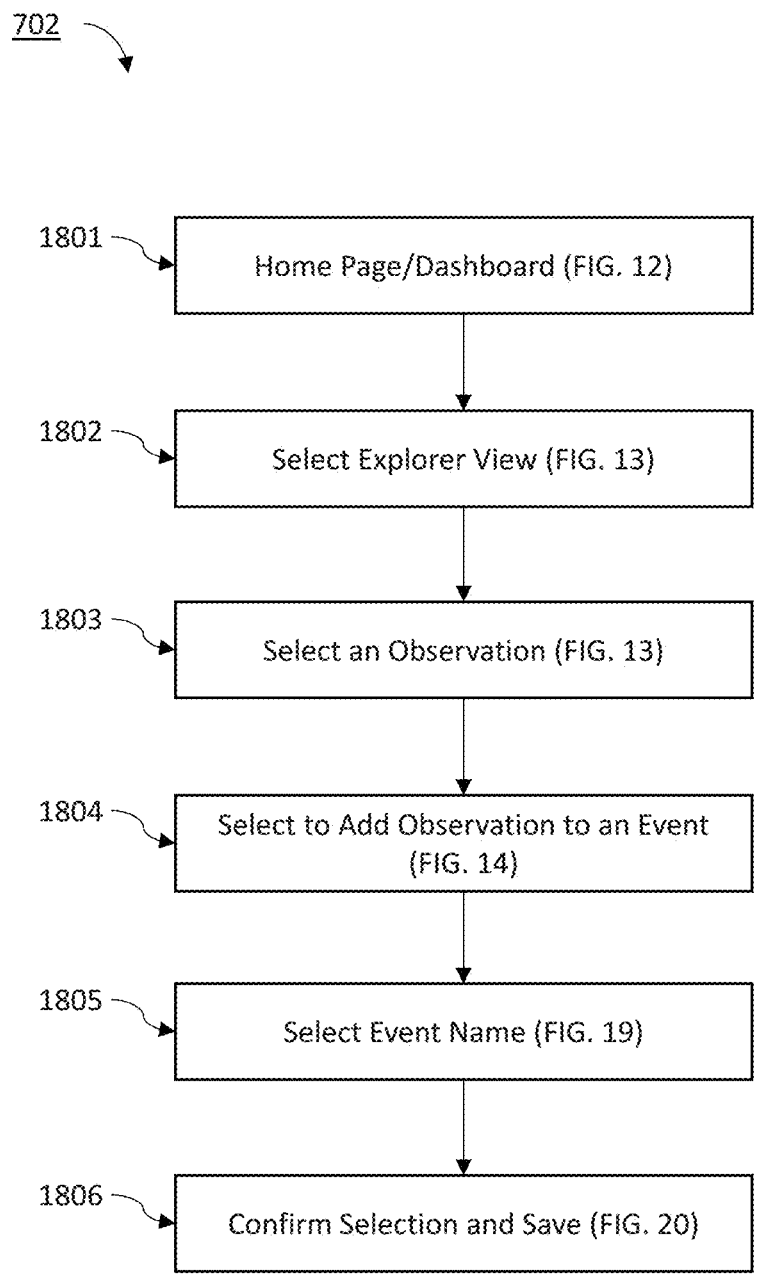

FIG. 18 depicts an exemplary flowchart of the anomaly addition tool of the event management service for enable manual management of individual observations and events in accordance with one or more embodiments of the present invention.

In some embodiments, the anomaly addition tool 702 provides users with the ability to select individual observations and add them to an existing event using, e.g., API tasks 15 in response to user inputs into the visualization engine 770. To do so, the anomaly addition tool 702 may control the visualization engine 770 to produce, at block 1801, a home page or dashboard, such as the dashboard of FIG. 12, described above. In some embodiments, the dashboard may depict an overview of activities by the user and other users interacting with the system 100, as well as recorded observations and events.

In some embodiments, a user may interact with the dashboard by selecting, at block 1802, an interface element for the explorer view. In some embodiments, the selection causes the anomaly addition tool 702 to control the visualization engine 770 to produce the explorer view, e.g., the explorer view described above with reference to FIG. 13, to enable user interaction. In some embodiments, the explorer view depicts individual observation data points, such as anomalies, change-points, patterns and/or outliers across datasets and date ranges according to user selections. In some embodiments, the explorer view provides the user with interface elements enabling selection and management of particular individual observations or user defined sets thereof.

In some embodiments, upon viewing the observations of the explorer view, e.g., of FIG. 13, the user may select, at block 1803, an interface element for a particular observation, such as a change-point, anomaly, pattern and/or outlier. Selection of the observation causes the anomaly addition tool 702 to instruct the visualization engine 770 to produce a prompt, such as the prompt depicted in FIG. 14, enabling user selection of perform one or more management actions related to the observation. For example, a user may utilize the prompt to add the observation to an event with which the observation is not yet associated.

Thus, in some embodiments, the prompt, e.g., of FIG. 14, enables the user to select, at block 1804, an interface element for the action in the prompt to add the observation to an event. In some embodiments, selection of the addition element of the prompt may cause the anomaly addition tool 702 to instruct the visualization engine 770 to produce an event addition prompt, such as the event addition prompt depicted in FIG. 19. In some embodiments, the event addition prompt includes interface elements enabling user selection of one or more events to which the user would like to add the observation.

Figure 19:
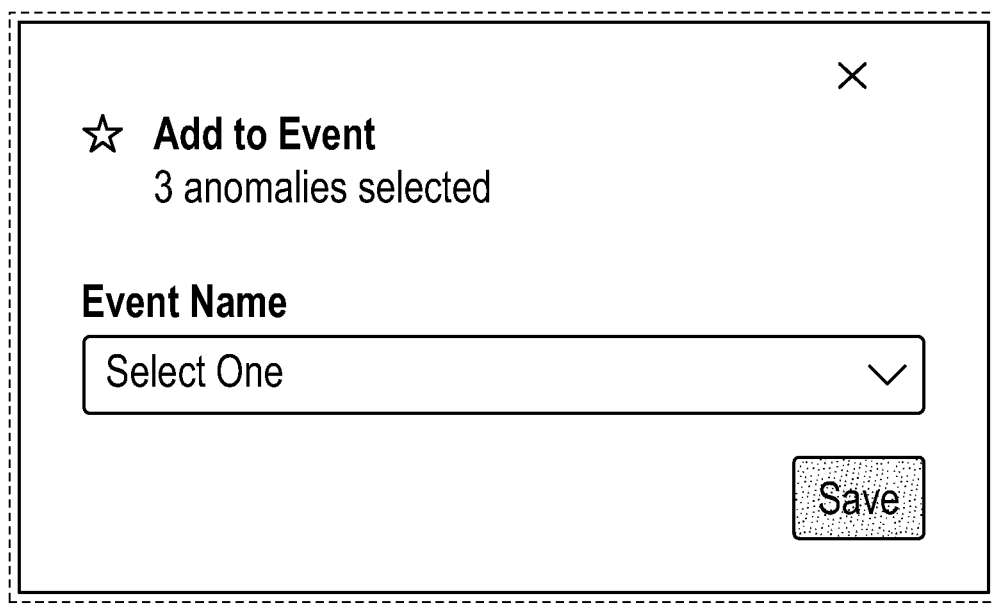

In some embodiments, upon display of the event addition prompt, e.g., of FIG. 19, the user may select, at block 1805, an interface element for the event name to which the observation is to be manually added. In some embodiments, the selection causes the anomaly addition tool 702 to instruct the visualization engine 770 to update the event addition prompt, e.g., as shown in FIG. 20, to produce interface elements enabling the user to view details of the selected events, including, e.g., a classification, description, rating and other information of the selected event.

In some embodiments, the updated event addition prompt, e.g., of FIG. 20, provides an interface element enabling a user to select, at block 1806, to save the observation or the specified event. Accordingly, the anomaly addition tool 702 may submit the association between the observation and the selected event to the database 760, thus adding the observation to the selected event via manual management.

Figure 21:
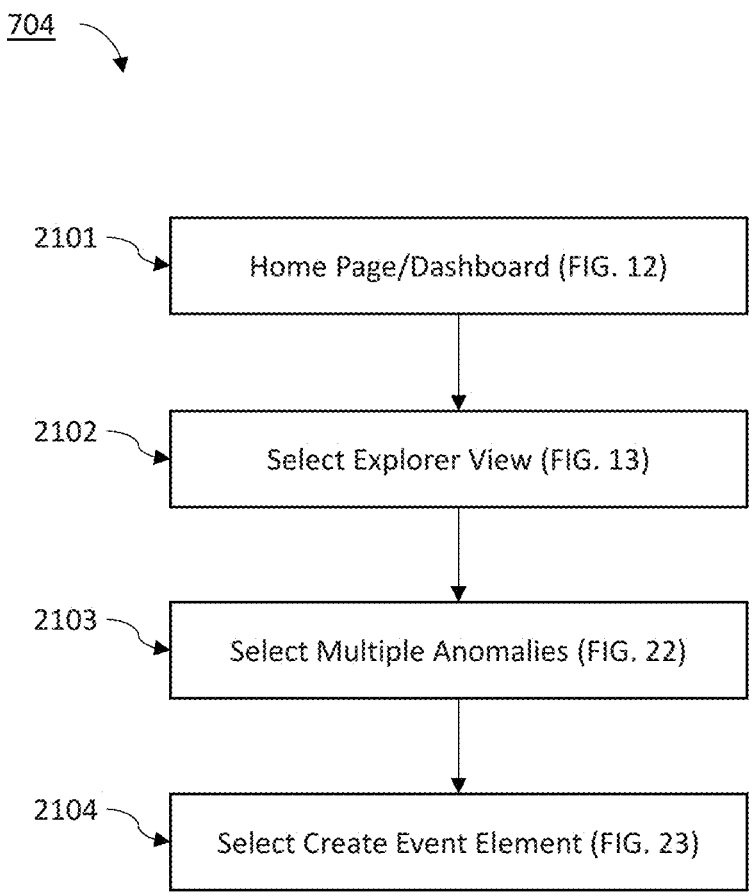

FIG. 21 depicts an exemplary flowchart of the event creation tool of the event management service for enable manual management of individual observations and events in accordance with one or more embodiments of the present invention.

In some embodiments, the event creation tool 704 provides users with the ability to select individual or multiple observations and create from the observations new events using, e.g., API tasks 15 in response to user inputs into the visualization engine 770. To do so, the event creation tool 704 may control the visualization engine 770 to produce, at block 2101, a home page or dashboard, such as the dashboard of FIG. 12, described above. In some embodiments, the dashboard may depict an overview of activities by the user and other users interacting with the system 100, as well as recorded observations and events.

In some embodiments, a user may interact with the dashboard by selecting, at block 2102, an interface element for the explorer view. In some embodiments, the selection causes the event creation tool 704 to control the visualization engine 770 to produce the explorer view, e.g., the explorer view described above with reference to FIG. 13, to enable user interaction. In some embodiments, the explorer view depicts individual observation data points, such as anomalies, change-points, patterns and/or outliers across datasets and date ranges according to user selections. In some embodiments, the explorer view provides the user with interface elements enabling selection and management of particular individual observations or user defined sets thereof.

In some embodiments, upon viewing the observations of the explorer view, e.g., of FIG. 13, the user may select, at block 2103, one or more interface elements for observations, such as change-points, anomalies, patterns and/or outliers, such as in the interface of FIG. 22. Selection of the observations causes the event creation tool 704 to instruct the visualization engine 770 to produce a prompt, such as the prompt depicted in FIG. 23, providing user interface elements to enable a user to perform one or more management actions related to the observations. For example, a user may utilize the prompt to add the observation to a new event to associate the selected observations together as part of, e.g., a common root cause, or other event.

Thus, in some embodiments, the prompt, e.g., of FIG. 23, enables the user to select, at block 2104, an interface element for the action in the prompt to create a new event with the selected observations. In some embodiments, the prompt may include additional elements enabling the user to specify details associated with the new event, such as, without limitation, an event name, a classification, a description, a rating, among other information and combinations thereof. As a result, the event creation tool 704 may submit the new event, including the name, description, classification or other information and the association between the selected observations and the new event to the database 760. As a result, a user created event and associated observations are added to the database 760.

Figure 24:
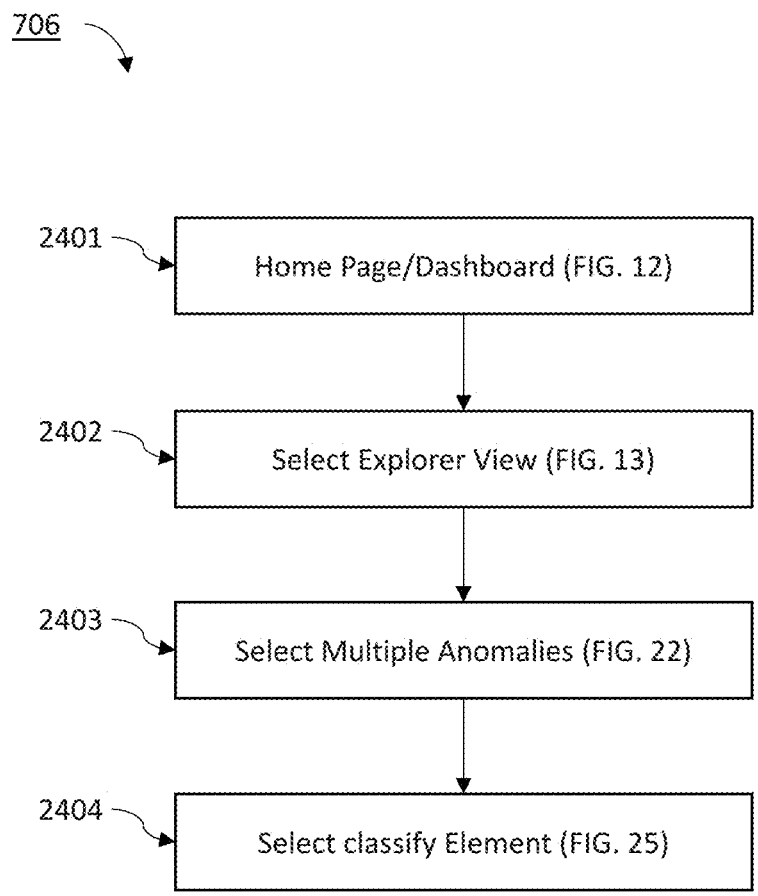

FIG. 24 depicts an exemplary flowchart of the bulk classification tool of the event management service to enable manual management of individual observations and events in accordance with one or more embodiments of the present invention.

In some embodiments, the bulk classification tool 706 provides users with the ability to select multiple observations and manage classifications thereof using, e.g., API tasks 15 in response to user inputs into the visualization engine 770. To do so, the bulk classification tool 706 may control the visualization engine 770 to produce, at block 2401, a home page or dashboard, such as the dashboard of FIG. 12, described above. In some embodiments, the dashboard may depict an overview of activities by the user and other users interacting with the system 100, as well as recorded observations and events.

In some embodiments, a user may interact with the dashboard by selecting, at block 2402, an interface element for the explorer view. In some embodiments, the selection causes the bulk classification tool 706 to control the visualization engine 770 to produce the explorer view, e.g., the explorer view described above with reference to FIG. 13, to enable user interaction. In some embodiments, the explorer view depicts individual observation data points, such as anomalies, change-points, patterns and/or outliers across datasets and date ranges according to user selections. In some embodiments, the explorer view provides the user with interface elements enabling selection and management of particular individual observations or user defined sets thereof using, e.g., the prompt of FIG. 22.

In some embodiments, upon viewing the observations of the explorer view, e.g., of FIG. 22, the user may select, at block 2403, an interface element for multiple observations, such as change-points, anomalies, patterns and/or outliers. Selection of the observations causes the bulk classification tool 706 to instruct the visualization engine 770 to produce a prompt, such as the prompt depicted in FIG. 25, providing user interface elements to enable a user to perform one or more management actions related to the observations. For example, a user may utilize the prompt to classify or reclassify the observations according to user selection to, e.g., correct or update classifications of observations. In some embodiments, by selecting many observations in the explorer view, the user may quickly and efficiently classify or reclassify observations having common classifications.

Figure 25:
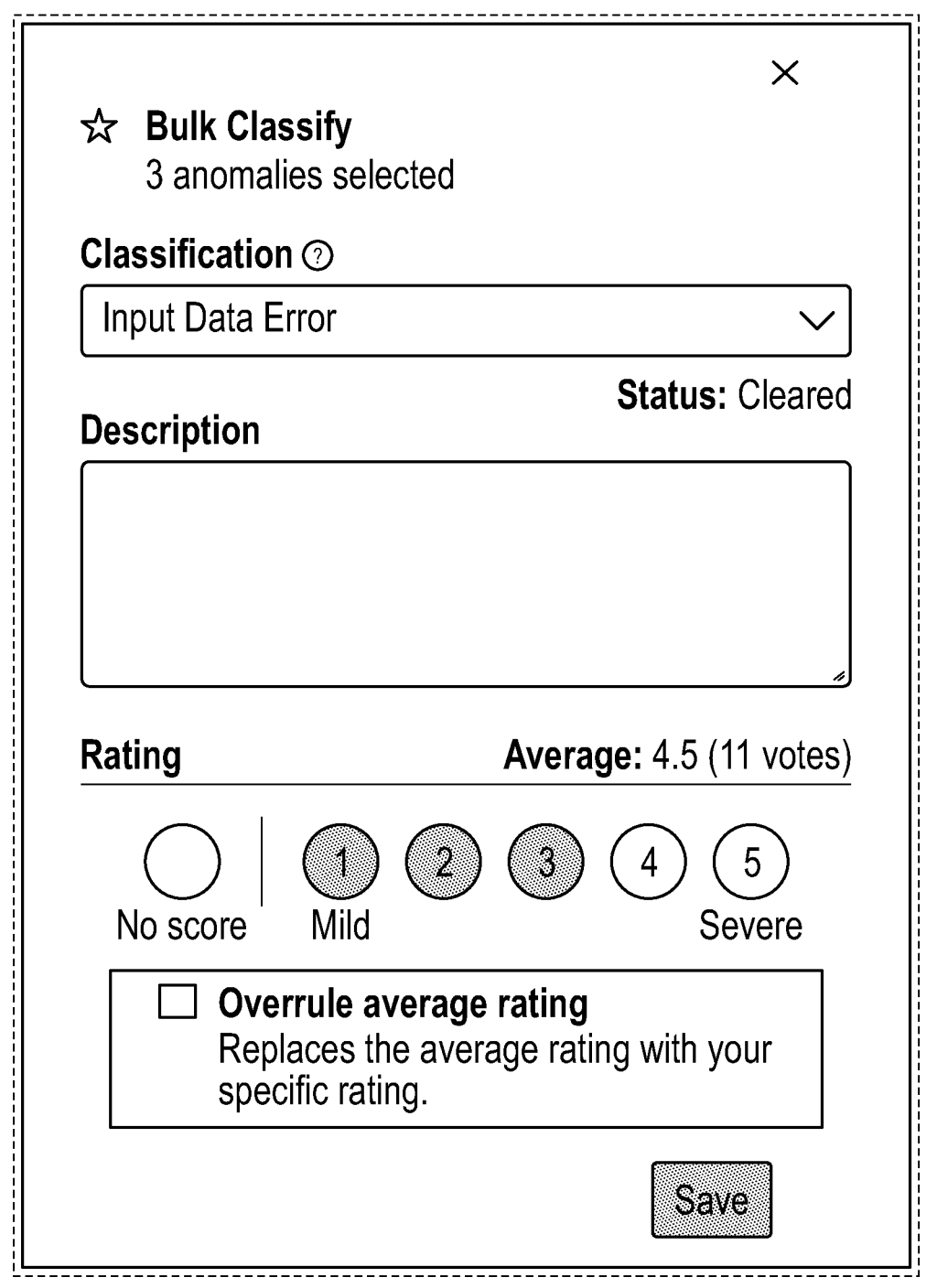

Thus, in some embodiments, the prompt, e.g., of FIG. 25, enables the user to select, at block 2404, an interface element for the action in the prompt to select a classification for the selected observations. In some embodiments, the prompt may include additional elements enabling the user to specify details associated with the classification, such as, without limitation, a description, and/or a rating, among other information and combinations thereof. As a result, the bulk classification tool 706 may submit the selected observations with the new classification, including the description, rating or other information to the database 760 to update the records associated with the selected observations.

Figure 26:
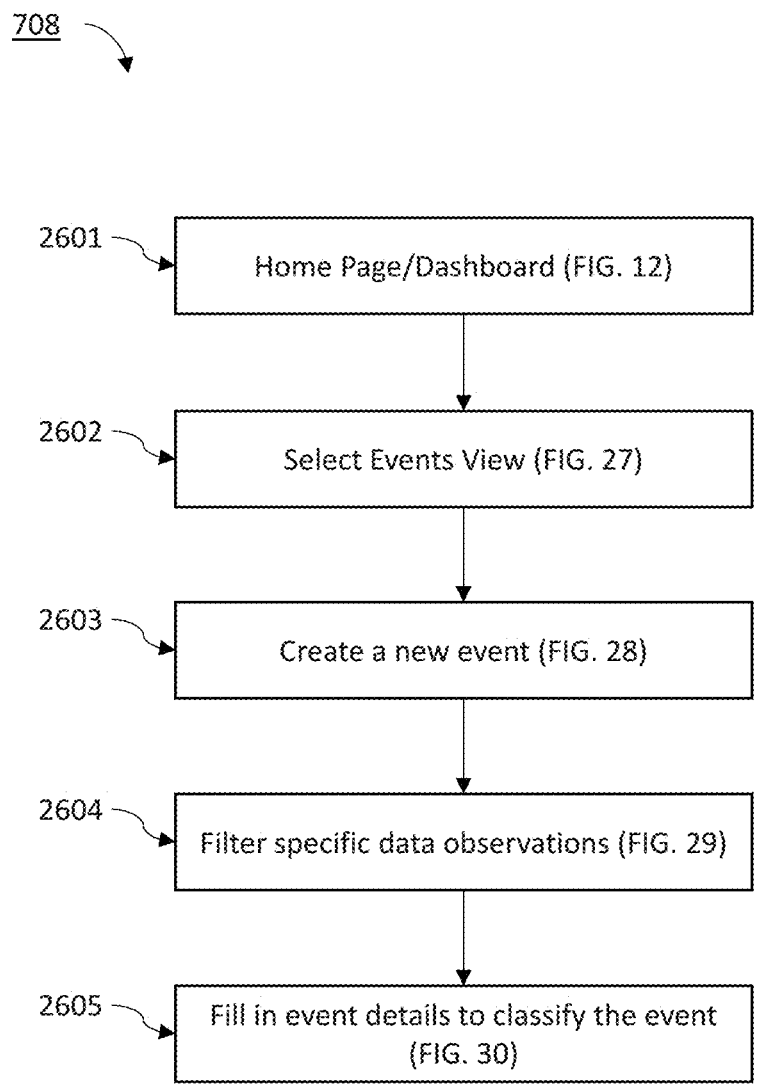

FIG. 26 depicts an exemplary flowchart of the event criteria tool of the event management service to enable manual management of individual observations and events in accordance with one or more embodiments of the present invention.

In some embodiments, the event criteria tool 708 provides users with the ability to select individual events to manage event details and associated observations, e.g., according to observation criteria, using, e.g., API tasks 15 in response to user inputs into the visualization engine 770. To do so, the event criteria tool 708 may control the visualization engine 770 to produce, at block 2601, a home page or dashboard, such as the dashboard of FIG. 12, described above. In some embodiments, the dashboard may depict an overview of activities by the user and other users interacting with the system 100, as well as recorded observations and events.

In some embodiments, a user may interact with the dashboard by selecting, at block 2602, an interface element for an events view. In some embodiments, the selection causes the event criteria tool 708 to control the visualization engine 770 to produce the events view, e.g., the events view depicted in FIG. 27, to enable user interaction with events. In some embodiments, the events view depicts, e.g., a log of detected events recorded in the database 760. In some embodiments, the events view provides user interface elements that enable a user to select options for managing the recorded events to, e.g., correct inaccuracies, inconsistencies or update the events. In some embodiments, the events view provides the user with an interface element enabling selection and management of a particular event to create a new event.

In some embodiments, a user may interact with the events view of FIG. 27 to select, at block 2603, and/or to create a new event. In some embodiments, selection to create the new event may cause the event criteria tool 708 to control the visualization engine 770 to produce an event creation prompt, e.g., the event creation prompt depicted in FIG. 28, to enable user creation of events. In some embodiments, the event creation prompt may include user interface elements to select or input a name for a new event.

Figure 28:
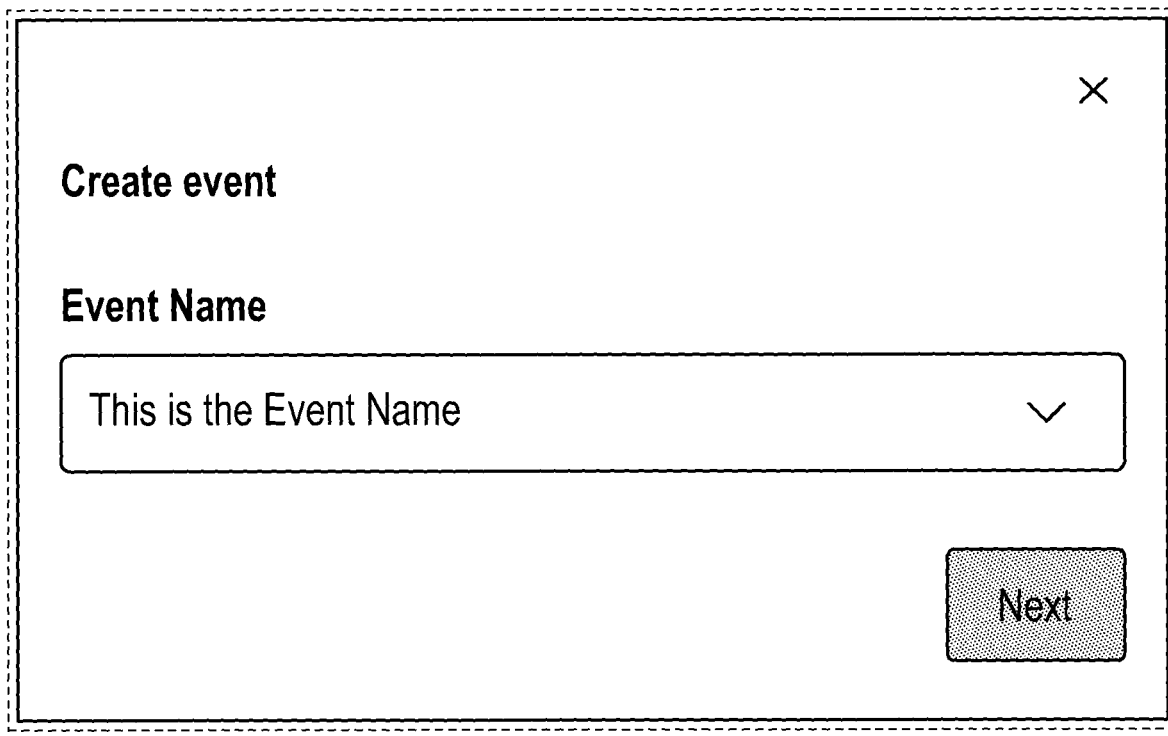

In some embodiments, the user may interact with the event creation prompt of FIG. 28 to input a new event name. In some embodiments, upon specifying a new name, the event creation prompt may be updated or replaced with user interface elements for the selection of observation criteria, as shown in FIG. 29. In some embodiments, using the new or updated event creation prompt, the user may select, at block 2604, observation criteria, such as, without limitation, anomaly criteria that characterize the types of observations to be associated with the new event. In some embodiments, the specification of observation criteria may cause the event criteria tool 708 to control the visualization engine 770 to filter observations recorded in the database 760 to determine association with the event automatically.

Figure 30:

In some embodiments, upon specifying the event criteria, the event creation prompt may be updated or replaced with user interface elements for the selection, at block 2605, of event information, as shown in FIG. 30. In some embodiments, the prompt may include elements enabling the user to specify details associated with the new event, such as, without limitation, an event name, a classification, a description, and/or a rating, among other information and combinations thereof. As a result, the event criteria tool 708 may submit the new event, including the name, description, classification or other information to the database 760. As a result, a user created event is added to the database 760 for later use in associating, manually or automatically, observations as part of the new event.

Figure 31:
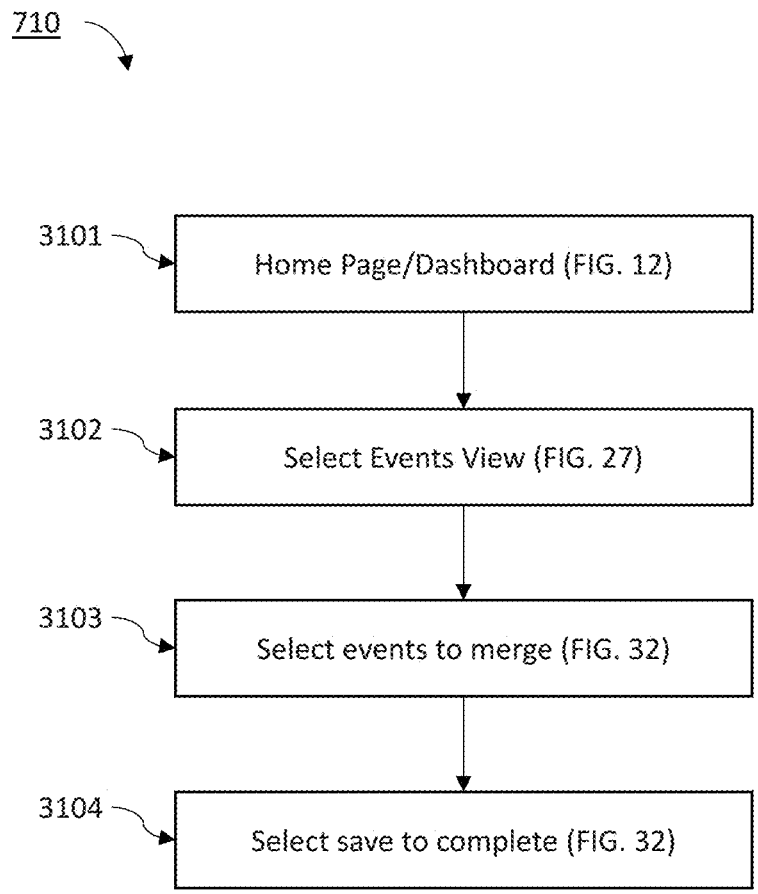

FIG. 31 depicts an exemplary flowchart of the event merge tool of the event management service to enable manual management of individual observations and events in accordance with one or more embodiments of the present invention.

In some embodiments, the event merge tool 710 provides users with the ability to select individual events to manage event details and merge similar to equivalent events, using, e.g., API tasks 15 in response to user inputs into the visualization engine 770. To do so, the event merge tool 710 may control the visualization engine 770 to produce, at block 3101, a home page or dashboard, such as the dashboard of FIG. 12, described above. In some embodiments, the dashboard may depict an overview of activities by the user and other users interacting with the system 100, as well as recorded observations and events.

In some embodiments, a user may interact with the dashboard by selecting, at block 3102, an interface element for an events view as depicted in FIG. 27. In some embodiments, the selection causes the event merge tool 710 to control the visualization engine 770 to produce the events view, e.g., the events view depicted in FIG. 27, to enable user interaction with events. In some embodiments, the events view depicts, e.g., a log of detected events recorded in the database 760. In some embodiments, the events view provides user interface elements that enable a user to select options for managing the recorded events to, e.g., correct inaccuracies, inconsistencies or update the events. In some embodiments, the events view provides the user with an interface element enabling selection and merging of multiple similar events into a single merged event.

In some embodiments, a user may interact with the events view of FIG. 27 to select, at block 3103, and/or to merge selected events. In some embodiments, selection to merge the selected events may cause the event merge tool 710 to control the visualization engine 770 to produce an event merge prompt, e.g., the event merge prompt depicted in FIG. 32, to enable user controlled merging of events. In some embodiments, the event creation prompt may include user interface elements to select or input a name for a new event.

In some embodiments, the user may interact with the event merge prompt of FIG. 32 to select, at block 3103, a "Merge From" event and a "Merge To" event. In some embodiments, other interface structures for merging events may be employed, however, in some embodiments, the event merge prompt may enable a particular event to be selected to be merged into another event. Selecting a "Merge From" event and "Merge To" event may cause the event merge tool 710 to import or re-associate observations from the "Merge From" event into the "Merge To" event. As a result, information, such as, without limitation, event name, classification, rating, description, or other event information, is maintained as the "Merge To" event information. Thus, the "Merge From" event information is effectively removed, and the observations associated with the "Merge From" event and event information are re-associated with (merged into) the "Merge To" event.

In some embodiments, to complete the merge, the event merge prompt of FIG. 32 may include an interface element enabling the user to select, at block 3104, and/or to save the merge, thereby completing re-association of the "Merge From" observations into the "Merge To" event. As a result, the merged event is updated in the database 760 with the new dataset of merged observations and associated event information for later, manual or automatic association of new observations.

Figure 33:
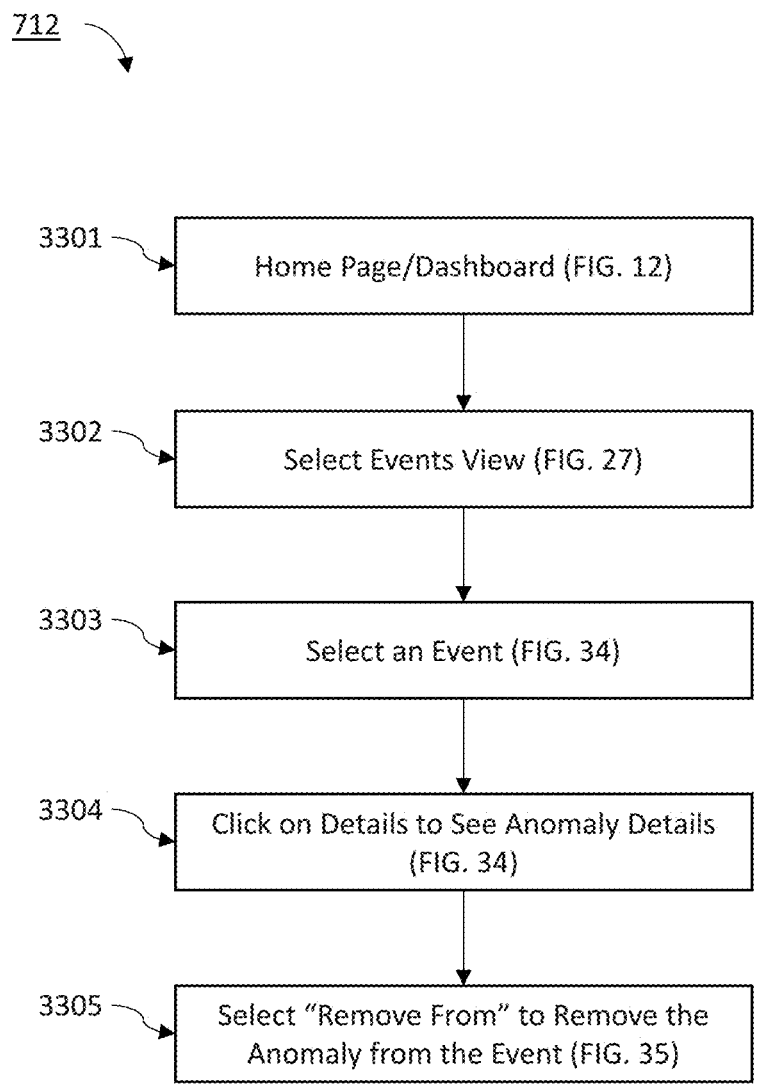

FIG. 33 depicts an exemplary flowchart of the event association tool of the event management service to enable manual management of individual observations and events in accordance with one or more embodiments of the present invention.

In some embodiments, the event association tool 712 provides users with the ability to select individual events to manage event details and associated observations, including anomalies, change-points, patterns and/or outliers, using, e.g., API tasks 15 in response to user inputs into the visualization engine 770. To do so, the event association tool 712 may control the visualization engine 770 to produce, at block 3301, a home page or dashboard, such as the dashboard of FIG. 12, described above. In some embodiments, the dashboard may depict an overview of activities by the user and other users interacting with the system 100, as well as recorded observations and events.

In some embodiments, a user may interact with the dashboard by selecting, at block 3302, an interface element for an events view as depicted in FIG. 27. In some embodiments, the selection causes the event association tool 712 to control the visualization engine 770 to produce the events view, e.g., the events view depicted in FIG. 27, to enable user interaction with events. In some embodiments, the events view depicts, e.g., a log of detected events recorded in the database 760. In some embodiments, the events view may provide user interface elements that enable a user to select options for managing the recorded events to, e.g., correct inaccuracies, inconsistencies or update the events. In some embodiments, the events view may provide the user with an interface element enabling selection and management of observations associated with the selected event.

In some embodiments, a user may interact with the events view of FIG. 27 to select, at block 3303, an event to manage. In some embodiments, a selection of the event instructs the event association tool 712 to cause the visualization engine 770 to produce an interface showing event information, e.g., as depicted in FIG. 34, such as, without limitation, event name, classification, description, rating, and observations or anomalies associated with the selected event. In some embodiments, the interface may also include interface elements for selecting the observations of the event and select actions to manage selected observations of the event.

In some embodiments, a user may interact with the interface of FIG. 34 to select, at block 3304, anomaly details for each or all selected observation of the event. In some embodiments, the anomaly details may include, e.g., an anomaly identifier or number, a group or type, a date of the anomaly, among other data and information. In some embodiments, the interface enables the user to select multiple anomaly details at a time to perform bulk management operations relative to the event, such as, without limitation, to remove the observations from the event, create a new event from the observations, add the observations to another event, or other operation.

In some embodiments, the interface elements of FIG. 35 may be programmed to allow the user to select, at block 3305, to perform an event management operation including to remove the selected observations or anomalies from the event. As a result of the interaction, the event association tool 712 may cause the selected observations to be removed from the event, thereby disassociating the selected observations from the record of the event in the database 760, thereby providing manual management of associations relative to the event and any other selected event.

Figure 36:
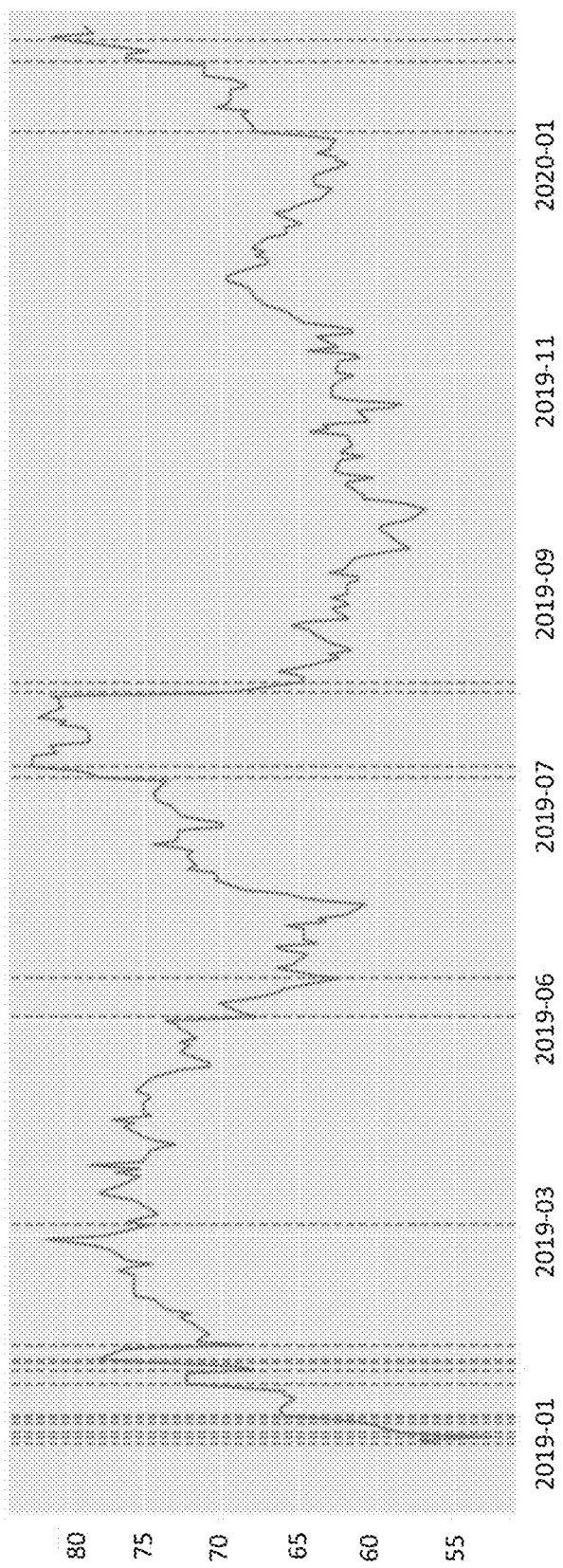
Figure 37:
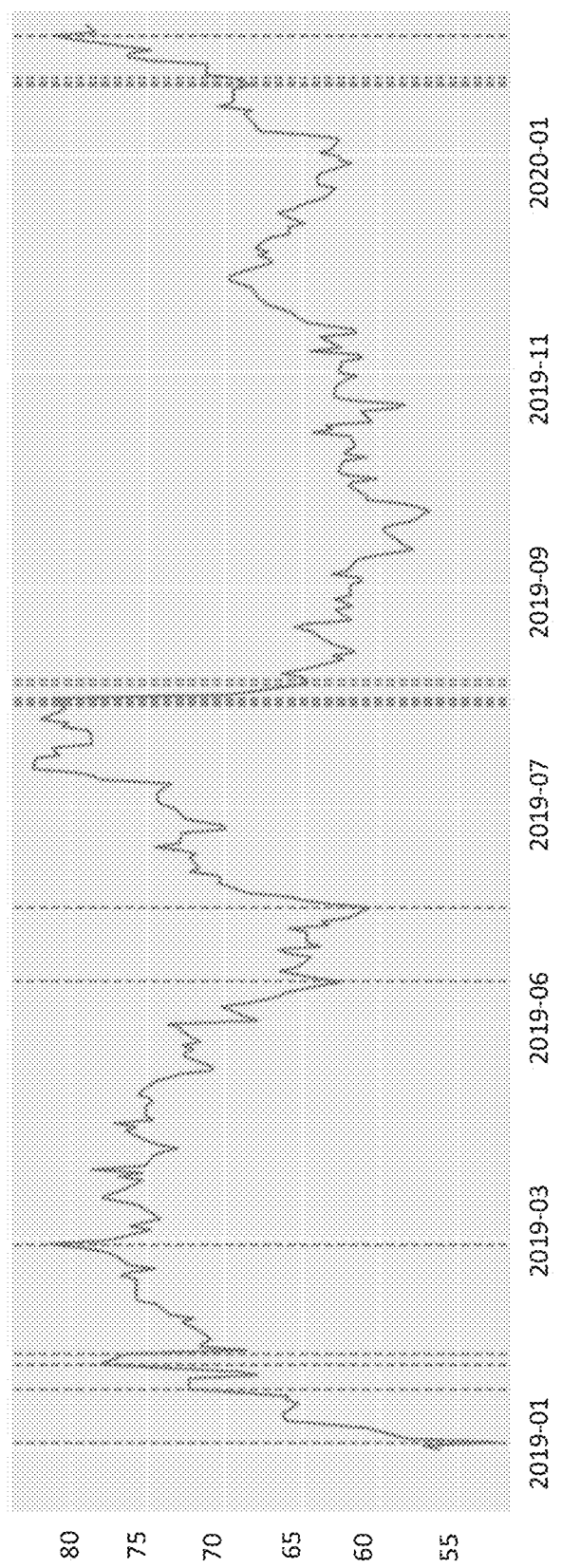
Figure 38:
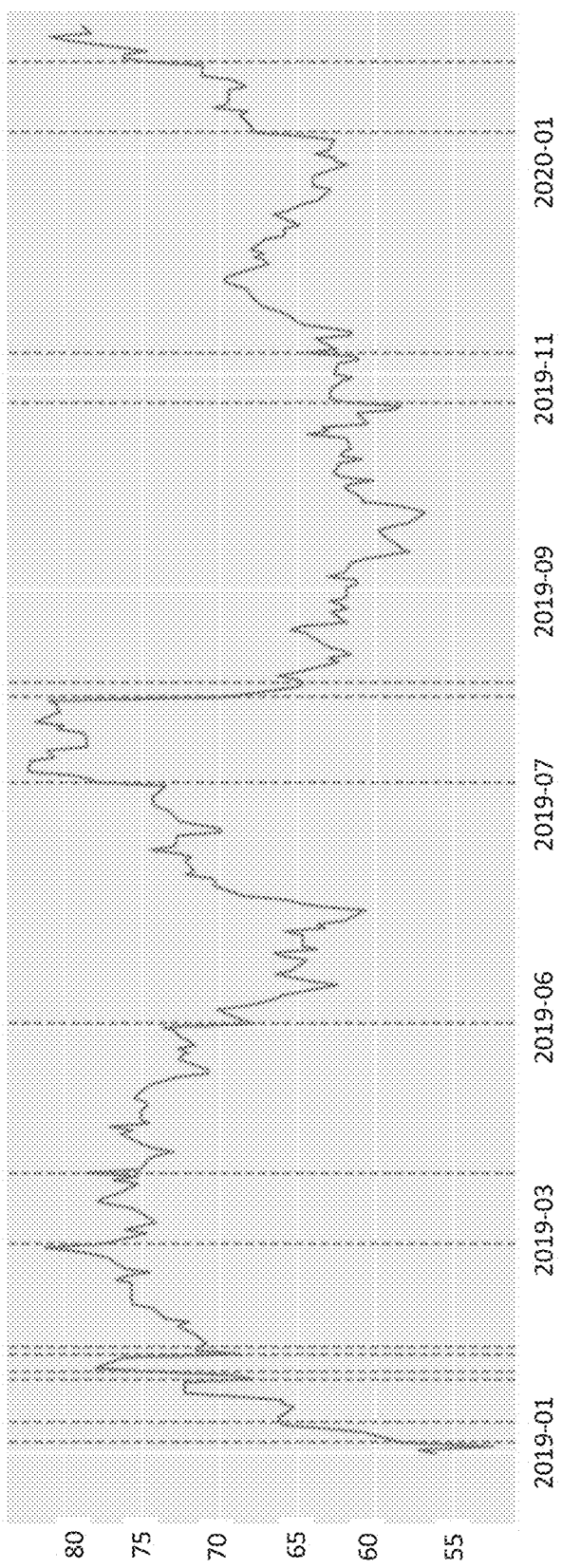

FIGS. 36-38 depict experimental results of anomaly detection in stock price data using various anomaly detection models for use with the anomaly recognition system of embodiments of the present invention.

In some embodiments, the detection model component 210 and/or the detection model component 510 may employ one or more detection models to identify anomalies, change-points, patterns and/or outliers, or combinations thereof. In some embodiments, each detection model of multiple candidate detection models were evaluated against stock price data for stock of a first company, where the graph depicts stock price as a function of date, and the vertical lines indicate dates of detected anomalies, change-points, patterns and/or outliers. FIG. 36 depicts the results of an EMA model for detection, FIG. 37 depicts the results of a Prophet model for detection, and FIG. 38 depicts the results of a Luminol model for detection. The performance of each model has been evaluated according to precision, recall, F1 score and accuracy, as set forth in Table 1 below:

TABLE 1

Comparison of Anomaly Detection for Stock Price

| Detector | Precision | Recall | F1 Score | Accuracy |
| --- | --- | --- | --- | --- |
| FIG. 36 | 0.62 | 0.87 | 0.72 | 96.53% |
| FIG. 37 | 0.27 | 0.53 | 0.36 | 90.31% |
| FIG. 38 | 0.62 | 0.66 | 0.64 | 96.19% |

Precision is a measure of the number of correct positive results divided by the number of all positive results returned by the classifier, and recall is a measure of the number of correct positive results divided by the number of all relevant samples (all samples that should have been identified as positive). However, F1 score is a combination of precision and recall, and thus provides a more comprehensive measure of the performance of a model for detecting anomalies, change-points, patterns and/or outliers, or combinations thereof.

Figure 39:
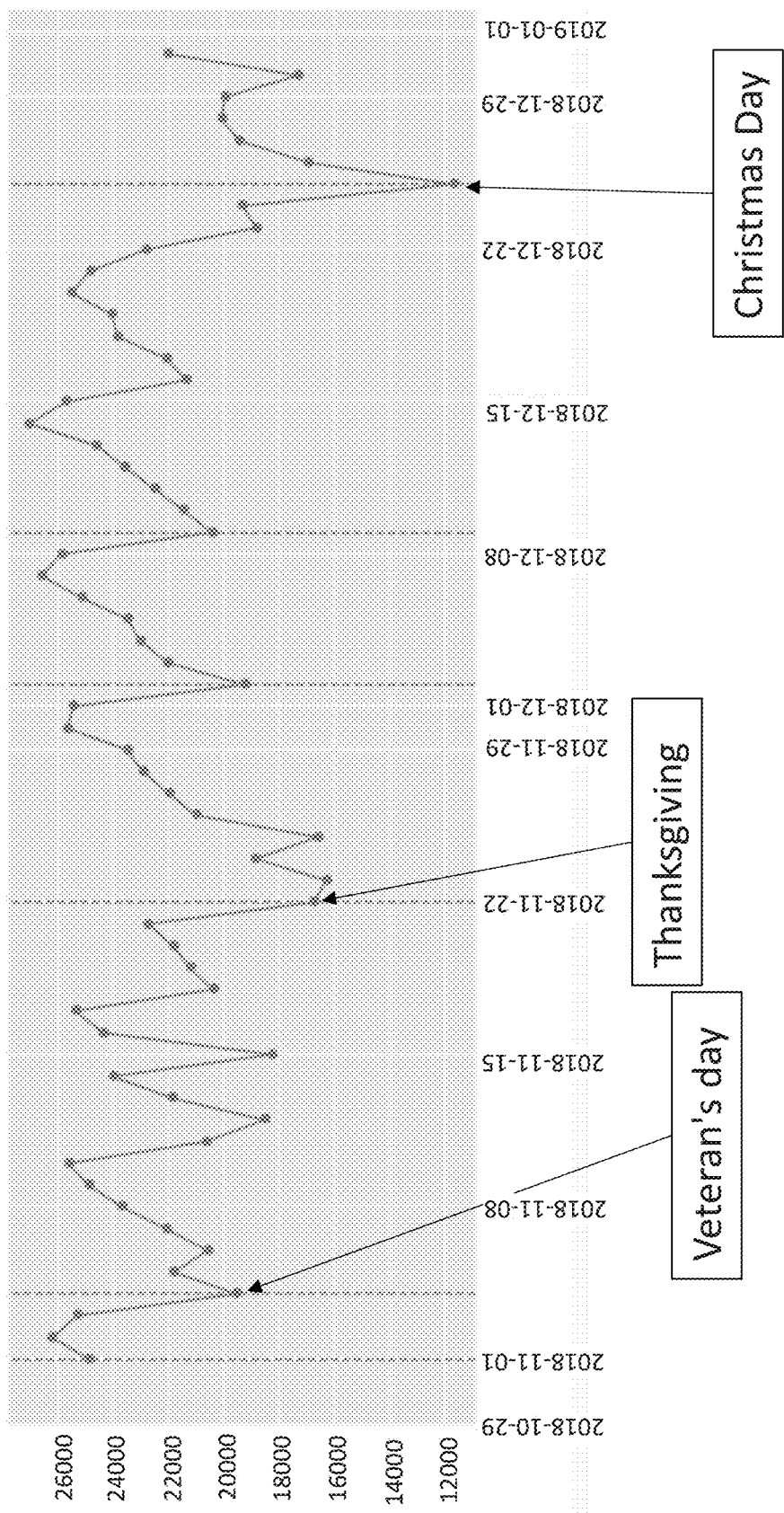
Figure 40:
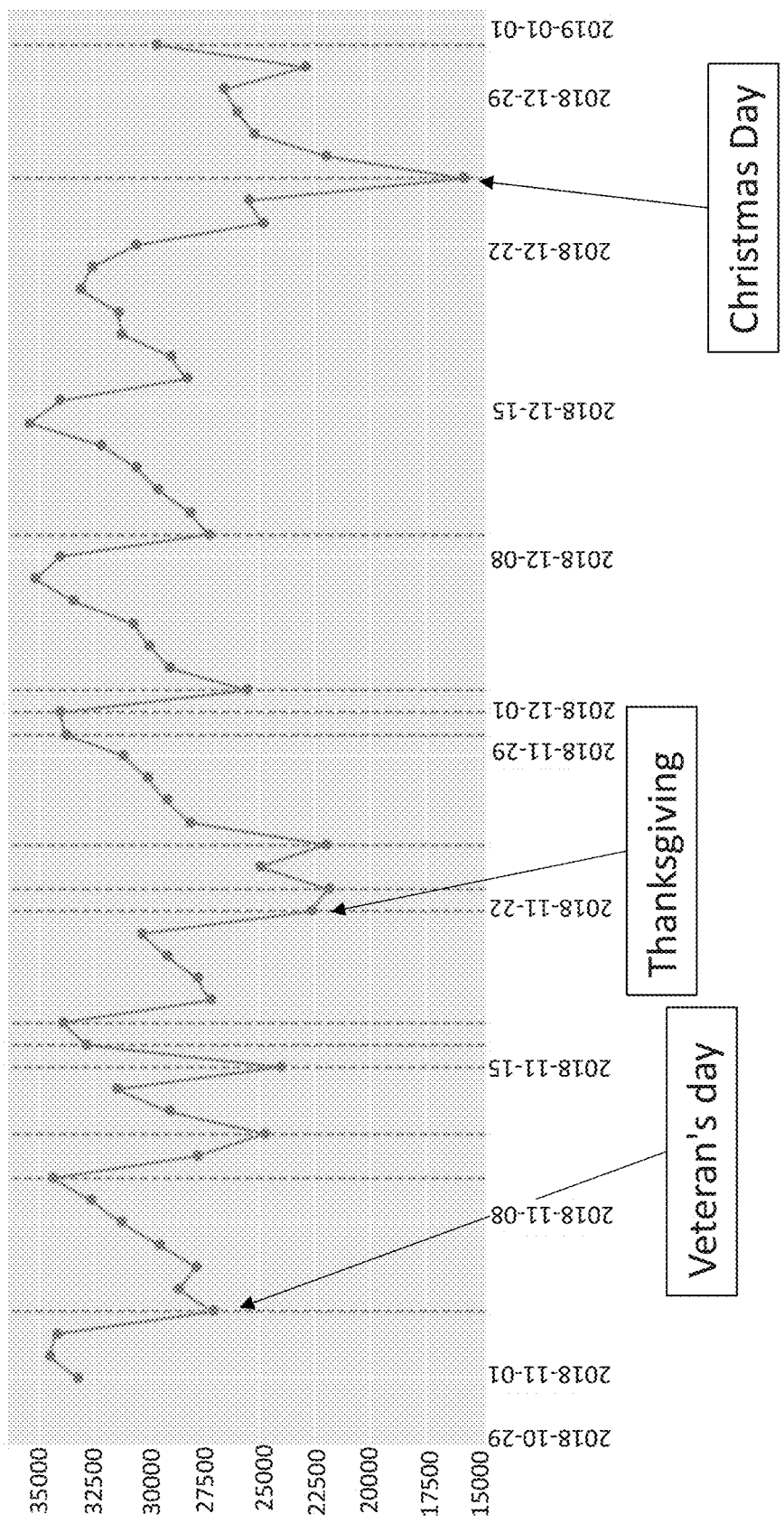
Figure 41:
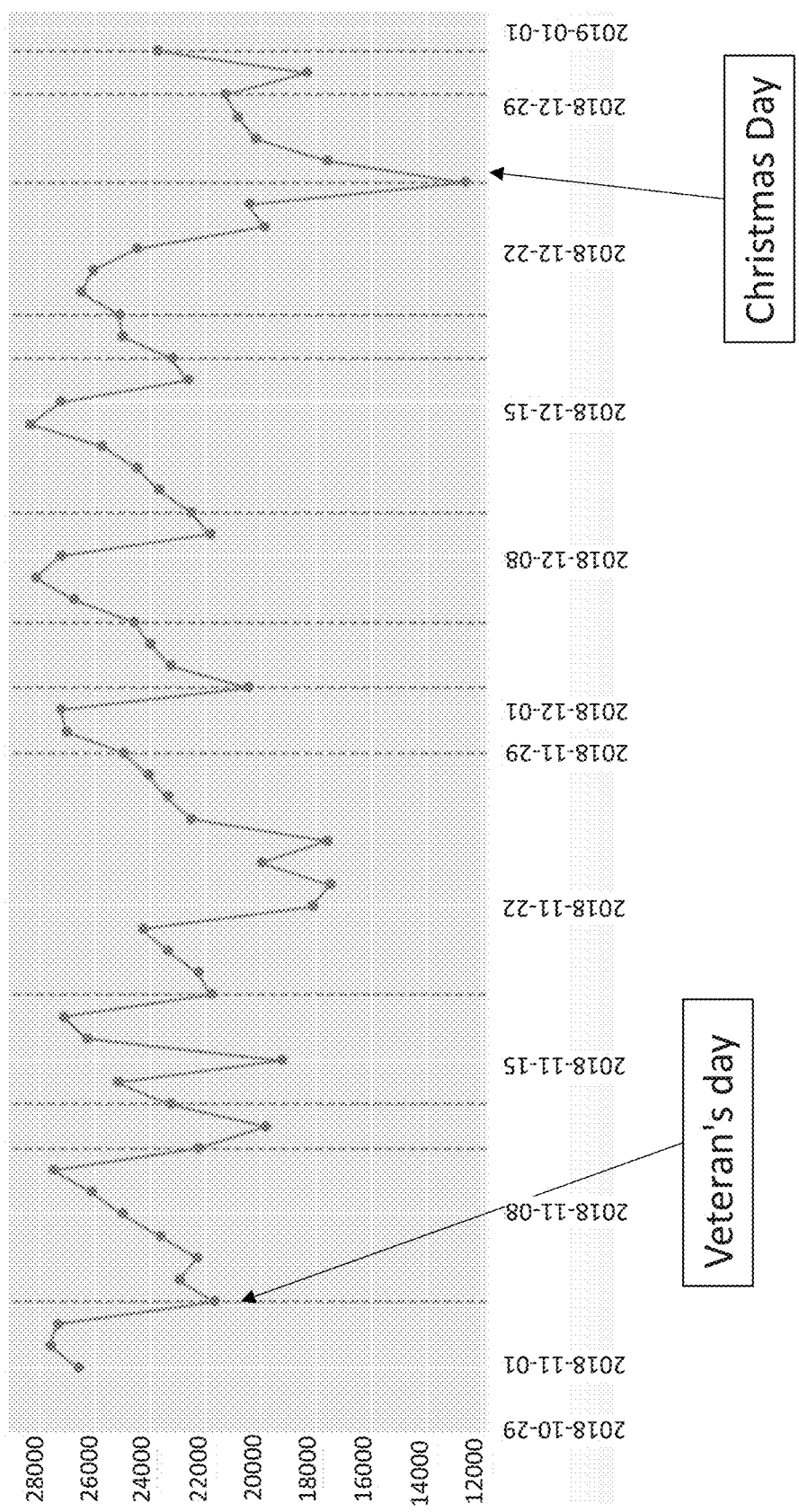

FIGS. 39-41 depict experimental results of anomaly detection in taxi ride counts data using the various anomaly detection models for use with the anomaly recognition system of embodiments of the present invention.

In some embodiments, the detection model component 210 and/or the detection model component 510 may employ one or more detection models to identify anomalies, change-points, patterns and/or outliers, or combinations thereof. In some embodiments, each detection model of multiple candidate detection models are evaluated against taxi ride data including numbers of taxi rides given, where the graph depicts the number of taxi rides as a function of date, and the vertical lines indicate dates of detected anomalies, change-points, patterns and/or outliers. FIG. 39 depicts the results of an EMA model for detection, FIG. 40 depicts the results of a Prophet model for detection, and FIG. 41 depicts the results of a Luminol model for detection. The performance of each model has been evaluated according to precision, recall, F1 score and accuracy, as set forth in Table 2 below:

TABLE 2

Comparison of Anomaly Detection for Taxi Ride Counts

| Detector | Precision | Recall | F1 Score | Accuracy |
| --- | --- | --- | --- | --- |
| FIG. 39 | 0.71 | 0.55 | 0.625 | 90.1% |
| FIG. 40 | 0.46 | 0.77 | 0.58 | 83.6% |
| FIG. 41 | 0.30 | 0.44 | 0.36 | 77.0% |

As described above, F1 score is a combination of precision and recall, and thus provides a more comprehensive measure of the performance of a model for detecting anomalies, change-points, patterns and/or outliers, or combinations thereof.

In particular, the result graphs for each model may be compared against the calendar and dates of United States holidays. As shown in FIG. 39, the EMA detector and Prophet detection correctly identified an anomaly on Veterans Day, Thanksgiving, and Christmas Day, while the Luminol detector only detected an anomaly on Veterans Day and Christmas Day.

Figure 42:
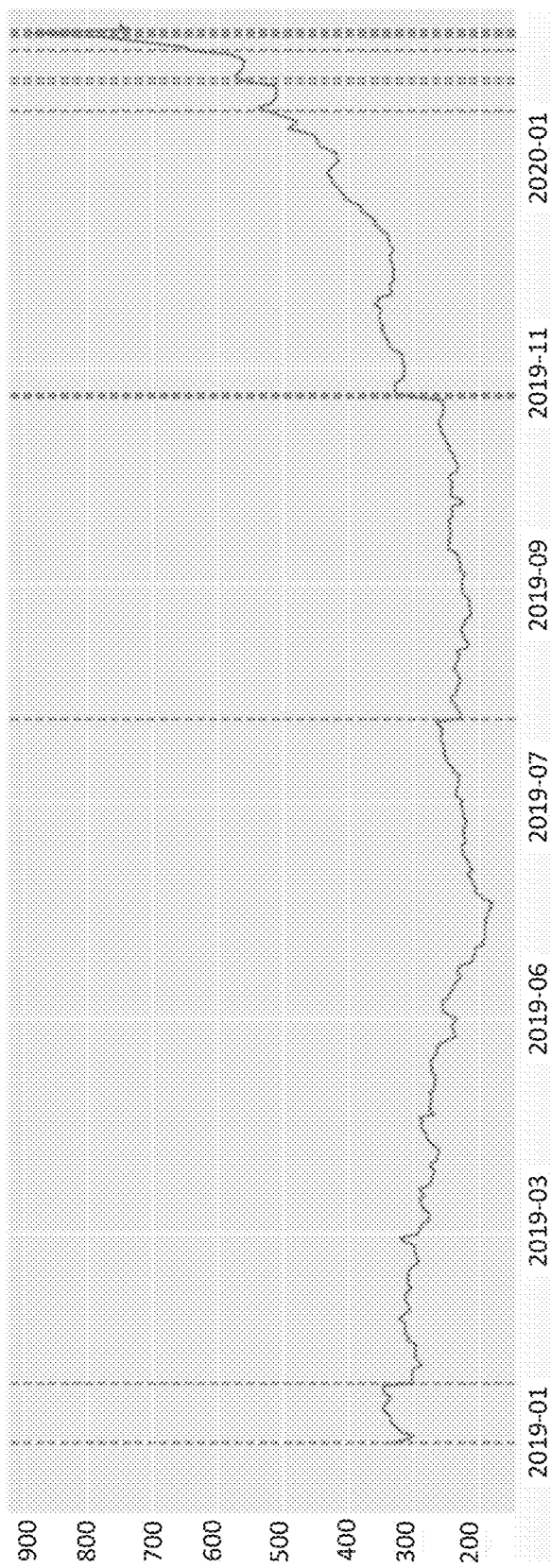

FIG. 42 depicts experimental results of anomaly detection in stock price data of a particular stock using the anomaly detector of the anomaly recognition system of embodiments of the present invention.

In some embodiments, the EMA detector has been shown to be the best performing detector of anomalies, change-points, outliers and patterns based on F1 Score, as shown above. Accordingly, the EMA detector has been tested against a second company's stock price to test performance for detection of anomalies, change-points, outliers and patterns. FIG. 42 shows the results of the test, where the graph depicts stock price as a function of date, with vertical markers indicating dates of detected anomalies, change-points, outliers or patterns. For this second company, the EMA detector exhibited a precision score of 0.58, a recall score of 1.0, an F1 Score of 0.73 and an accuracy of 98.26 percent.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems/platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, Wi-Fi, Wi-MAX, CDMA, satellite, Zigbee, and other suitable communication modes. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enabled devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate arrays (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java™, JavaScript™ Python™, Perl, QT, etc.).

In some embodiments, one or more of exemplary inventive computer-based systems of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of exemplary inventive computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a tweet, a map, an entire application (e.g., a calculator), etc. In some embodiments, as detailed herein, one or more of exemplary inventive computer-based systems of the present disclosure may be implemented across one or more of various computer platforms such as, but not limited to: (1) AmigaOS, AmigaOS 4, (2) FreeBSD, NetBSD, OpenBSD, (3) Linux™, (4) Microsoft Windows™, (5) OpenVMS, (6) OS X™ (Mac OS™), (7) OS/2, (8) Solaris, (9) Tru64 UNIX™, (10) VM, (11) Android™, (12) Bada, (13) BlackBerry OS™, (14) Firefox™ OS, (15) iOS™, (16) Embedded Linux™, (17) Palm OS, (18) Symbian, (19) Tizen, (20) WebOS, (21) Windows™ Mobile, (22) Windows™ Phone, (23) Adobe™ AIR™ (24) Adobe™ Flash™, (25) Adobe™ Shockwave™, (26) Binary Runtime Environment for Wireless (BREW), (27) Cocoa (API), (28) Cocoa Touch, (29) Java™ Platforms, (30) JavaFX, (31) JavaFX Mobile, (32) Microsoft™ XNA, (33) Mono, (34) Mozilla™ Prism, XUL and XULRunner, (35) .NET Framework, (36) Silverlight™, (37) Open Web Platform, (38) Oracle™ Database, (39) Qt, (40) SAP NetWeaver, (41) Smartface, (42) Vexi, and (43) Windows Runtime™.

In some embodiments, exemplary inventive computer-based systems of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-9,999,999,999), and so on.

In some embodiments, exemplary inventive computer-based systems of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the exemplary inventive computer-based systems/platforms, the exemplary inventive computer-based devices, and/or the exemplary inventive computer-based components of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH), WHIRLPOOL, RNGs).

The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

At least some aspects of the present disclosure will now be described with reference to the following numbered clauses.

Clause 1. A method comprising:
  receiving, by at least one processor, at least one data set;
  determining, by the at least one processor, a plurality of events in at least one respective data set using an ensemble detection model;
    wherein the ensemble detection model comprises a plurality of event detection models trained according to a respective plurality of independent event training data sets to identify respective types of events;
    wherein the plurality of events comprise at least one of:
      i) anomalies,
      ii) change-points,
      iii) patterns, and
      iv) outliers;
  applying, by the at least one processor, a classification model trained to recommend a classification of types of events according to a respective cause of each respective event to obtain a respective event type for each respective event in the set of events based at least in part on respective variables and respective dimensions;
  modifying, by the at least one processor, a respective event record of each respective event in the set of events with the respective event type for each respective event in the set of events;
  applying, by the at least one processor, a severity model trained to recommend a rank order of importance of each respective event to obtain a respective severity of each respective event in the set of events based at least in part on the respective event type, the respective variables and the respective dimensions;
  modifying, by the at least one processor, the respective event record of each respective event in the set of events with the respective severity of each respective event in the set of events;
  and causing to display, by the at least one processor, a visualization of the set of events on a screen of at least one computing device associated with at least one user responsive to a selection by the at least one user of a selected one or more of the respective event type for respective events and the respective severity of each respective event.

Clause 2. The method of clause 1, further comprising applying, by the at least one processor, an association model trained to recognize each respective subset of related events that are associated with a common root-cause to the initial plurality of events to obtain the set of events having a reduced amount of the plurality of events by replacing each respective subset of related events with each corresponding event based at least in part on a similarity of respective variables and respective dimensions.

Clause 3. The method of clause 1, further comprising:
applying, by the at least one processor, a root-cause model to recognize each respective root-cause of each respective event in the set of events based at least in part on the respective event type, the respective variables and the respective dimensions; and
modifying, by the at least one processor, the respective event record of each respective event in the set of events with the respective root-cause of each respective event in the set of events.

Clause 4. The method of clause 1, further comprising receiving, by the at least one processor, a visualization request from the at least one computing device via an associated application programming interface (API) target set.

Clause 5. The method of clause 1, further comprising receiving, by the at least one processor, a respective annotation to the respective event record by a respective user of the at least one user from a respective computing device of the at least one computing device;
wherein the respective annotation comprises a modification to the respective event type, the respective severity, or both.

Clause 6. The method of clause 5, further comprising causing to display, by the at least one processor, an indication of the respective annotation in the visualization of the set of events on the screen of the at least one computing device associated with the at least one user.

Clause 7. The method of clause 1, wherein the ensemble detection model comprises:
i) a plurality of event detection models, and
ii) a plurality of change-point detection models.

Clause 8. The method of clause 1, further comprising:
determining, by the at least one processor, a classification error of the classification model responsive to a respective annotation to the respective event by a respective user of the at least one user at a respective computing device of the at least one computing device; and
optimizing, by the at least one processor, the classification model based on the classification error.

Clause 9. The method of clause 1, further comprising:
determining, by the at least one processor, a severity error of the severity model responsive to a respective annotation to the respective event by a respective user of the at least one user at a respective computing device of the at least one computing device; and
optimizing, by the at least one processor, the classification model based on the classification error.

Clause 10. The method of clause 1, wherein the at least one data set comprise transaction data representative of merchant transactions.

Clause 11. A method comprising:
receiving, by at least one processor, at least one data set;
determining, by the at least one processor, a plurality of events in at least one respective data set using an ensemble detection model;
wherein the ensemble detection model comprises a plurality of event detection models trained according to a respective plurality of independent event training data sets to identify respective types of events;
wherein the plurality of events comprise at least one of:
i) anomalies,
ii) change-points,
iii) patterns, and
iv) outliers;
applying, by the at least one processor, a classification model trained to recommend a classification of types of events according to a respective cause of respective events to obtain a respective event type for each respective event in the set of events based at least in part on respective variables and respective dimensions;
applying, by the at least one processor, a severity model trained to recommend a rank order of importance of each respective event to obtain a respective severity of each respective events in the set of events based at least in part on the respective variables and the respective dimensions;
modifying, by the at least one processor, a respective event record of each respective event in the set of events with the respective event type for each respective event in the set of events and the respective severity of each respective event in the set of events; and
causing to display, by the at least one processor, a visualization of the set of events on a screen of at least one computing device associated with at least one user responsive to a selection by the at least one user of a selected one or more of the respective event type for respective events and the respective severity of each respective event.

Clause 12. The method of clause 11, further comprising applying, by the at least one processor, an association model trained to recognize each respective subset of related events that are associated with a common root-cause to the initial plurality of events to obtain the set of events having a reduced amount of the plurality of events by replacing each respective subset of related events with each corresponding event based at least in part on a similarity of respective variables and respective dimensions.

Clause 13. The method of clause 11, further comprising:
applying, by the at least one processor, a root-cause model to recognize each respective root-cause of each respective event in the set of events based at least in part on the respective event type, the respective variables and the respective dimensions; and
modifying, by the at least one processor, the respective event record of each respective event in the set of events with the respective root-cause of each respective event in the set of events.

Clause 14. The method of clause 11, further comprising receiving, by the at least one processor, a visualization request from the at least one computing device via an associated application programming interface (API) target set.

Clause 15. The method of clause 11, further comprising receiving, by the at least one processor, a respective annotation to the respective event record by a respective user of the at least one user from a respective computing device of the at least one computing device;
wherein the respective annotation comprises a modification to the respective event type, the respective severity, or both.

Clause 16. The method of clause 15, further comprising causing to display, by the at least one processor, an indication of the respective annotation in the visualization of the set of events on the screen of the at least one computing device associated with the at least one user.

Clause 17. The method of clause 11, wherein the ensemble detection model comprises:
i) a plurality of event detection models, and
ii) a plurality of change-point detection models.

Clause 18. The method of clause 11, further comprising:
determining, by the at least one processor, a classification error of the classification model responsive to a respective annotation to the respective event by a respective user of the at least one user at a respective computing device of the at least one computing device; and
optimizing, by the at least one processor, the classification model based on the classification error.

Clause 19. The method of clause 11, further comprising:
determining, by the at least one processor, a severity error of the severity model responsive to a respective annotation to the respective event by a respective user of the at least one user at a respective computing device of the at least one computing device; and
optimizing, by the at least one processor, the classification model based on the classification error.

Clause 20. The method of clause 11, wherein the at least one data set comprises transaction data representative of merchant transactions.

Clause 21. A system comprising:
at least one database configured to store at least one data set;
at least one processor, configured to:
receive the at least one data set;
determine a plurality of events in at least one respective data set using an ensemble detection model;
  wherein the ensemble detection model comprises a plurality of event detection models trained according to a respective plurality of independent event training data sets to identify respective types of events;
  wherein the plurality of events comprise at least one of:
    i) anomalies,
    ii) change-points,
    iii) patterns, and
    iv) outliers;
apply a classification model trained to recommend a classification of types of events according to a respective cause of respective events to obtain a respective event type for each respective event in the set of events based at least in part on respective variables and respective dimensions;
modify a respective event record of each respective event in the set of events with the respective event type for each respective event in the set of events;
apply a severity model trained to recommend a rank order of importance of each respective event to obtain a respective severity of each respective event in the set of events based at least in part on the respective event type, the respective variables and the respective dimensions;
modify the respective event record of each respective event in the set of events with the respective severity of each respective event in the set of events; and
cause to display a visualization of the set of events on a screen of at least one computing device associated with at least one user responsive to a selection by the at least one user of a selected one or more of the respective event type for respective events and the respective severity of each respective event.

Clause 22. The method of clause 21, wherein the at least one processor is further configured to apply an association model trained to recognize each respective subset of related events that are associated with a common root-cause to the initial plurality of events to obtain the set of events having a reduced amount of the plurality of events by replacing each respective subset of related events with each corresponding event based at least in part on a similarity of respective variables and respective dimensions.

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein may be utilized in any combination with each other. Further still, the various steps may be carried out in any desired order (and any desired steps may be added and/or any desired steps may be eliminated).

The invention claimed is:
1. A method comprising:
receiving, by at least one processor, at least one data set of at least one data stream from at least one data source;
  wherein the at least one data set comprises a plurality of time-varying data points;
  wherein each time-varying data point of the plurality of time-varying data points comprises at least one variable of at least one dimension;
submitting, by the at least one processor, each time-varying data point of the plurality of time-varying data points to at least one detection model to obtain, according to a plurality of trained detection parameters, a plurality of data irregularities associated with at least one data point of the plurality of time-varying data points;
  wherein the at least one detection model comprises at least one irregularity detection model comprising the plurality of trained detection parameters that are trained according to a respective plurality of independent event training data sets to identify types of the plurality of data irregularities;
  wherein the types of the plurality of data irregularities comprise at least one of:
    i) anomalies,
    ii) change-points,
    iii) patterns, or
    iv) outliers;
generating, by the at least one processor, a plurality of irregularity records in at least one event data store for the plurality of data irregularities, a particular irregularity record of the plurality of irregularity records corresponds to a particular data irregularity of the plurality of data irregularities;
submitting, by the at least one processor, each irregularity record of the plurality of irregularity records to an association machine learning model to obtain, according to a plurality of trained association parameters, at least one classification that is representative of a plurality of particular data irregularities of the plurality of data irregularities as being associated with a particular root cause event based at least in part on the at least one variable of the at least one dimension of each time-varying data point of each data irregularity;

wherein the at least one association machine learning model comprises at least one root cause model comprising the plurality of trained association parameters that are trained according to a respective plurality of independent event training data sets to classify the particular root cause event;

wherein the at least one detection model and the at least one association machine learning model are separate and distinct machine learning models;

automatically generating, by the at least one processor, a root cause event record representing the particular root cause event, wherein the root cause event record links to a plurality of particular irregularity records of the plurality of particular data irregularities;

wherein the root cause event record comprises at least one root cause event attribute associated with at least one irregularity attribute of each particular irregularity record of the plurality particular irregularity records linked to the root cause event record; and automatically applying, by the at least one processor, at least one subsequent change of the at least one root cause event attribute to the at least one irregularity attribute of each particular irregularity record.

2. The method of claim 1, further comprising receiving, by the at least one processor, a visualization request from at least one computing device via an associated application programming interface (API) target set.

3. The method of claim 1, further comprising receiving, by the at least one processor, an annotation to the root cause event record from at least one computing device;
   wherein the annotation comprises a modification to a root cause type.

4. The method of claim 3, further comprising causing to display, by the at least one processor, an indication of the respective annotation in a visualization of the root cause event record on a screen of the at least one computing device associated with the at least one user.

5. The method of claim 1, wherein the at least one detection model comprises:
   i) a plurality of anomaly detection models, and
   ii) a plurality of change-point detection models.

6. The method of claim 1, further comprising:
   identifying, by the at least one processor, a set of related data irregularities associated with the at least one root cause event based on an association model trained to identify the at least one root cause event using the at least one variable and the at least one dimension of each time-varying data point associated with each data irregularity.

7. The method of claim 1, further comprising:
   determining, by the at least one processor, an anomaly classification for the plurality of particular data irregularities when the plurality of particular data irregularities are identified based at least in part on a classification model trained to recognize the anomaly classification using the at least one variable and the at least one dimension of each time-varying data point associated with each data irregularity.

8. The method of claim 7, further comprising:
   determining, by the at least one processor, a root cause type of the root cause event associated with the plurality of particular data irregularities when the anomaly classification for the plurality of particular data irregularities is determined based at least in part on a root cause model trained to recognize the root cause type using the anomaly classification of the plurality of particular data irregularities and the at least one variable and the at least one dimension of each time-varying data point associated with each particular data irregularity in the plurality of particular data irregularities.

9. The method of claim 1, wherein the at least one data set comprise financial transaction data.

10. The method of claim 1, further comprising generating, by the at least one processor, an event management graphical user interface (GUI) to enable a user to manage events linking one or more data irregularities of the plurality of data irregularities;
    wherein the event management GUI comprises:
        an event explorer view depicting each data irregularities of the plurality of data irregularities in a time-varying representation;
        an event selection prompt selectable from the explorer view to enable user selection of a previously recorded event linking the one or more data irregularities of the plurality of data irregularities; and
        an event modification prompt selectable from the event selection prompt to modify the event linking the one or more data irregularities; and
        wherein the event modification prompt comprises user selectable event details comprising:
            i) an event name,
            ii) an event description, and
            iii) an event classification.

11. A system comprising:
    at least one data store configured to store at least one data set;
    at least one processor, configured to:
        receive at least one data set of at least one data stream from at least one data source;
            wherein the at least one data set comprises a plurality of time-varying data points;
            wherein each time-varying data point of the plurality of time-varying data points comprises at least one variable of at least one dimension;
        submit each time-varying data point of the plurality of time-varying data points to at least one detection model to obtain, according to a plurality of trained detection parameters, a plurality of data irregularities associated with at least one data point of the plurality of time-varying data points;
            wherein the at least one detection model comprises at least one irregularity detection model comprising the plurality of trained detection parameters that are trained according to a respective plurality of independent event training data sets to identify types of the plurality of data irregularities;
            wherein the types of the plurality of data irregularities comprise at least one of:
                i) anomalies,
                ii) change-points,
                iii) patterns, or
                iv) outliers;
        generate a plurality of irregularity records in at least one event data store for the plurality of data irregularities, a particular irregularity record of the plurality of irregularity records corresponds to a particular data irregularity of the plurality of data irregularities;
        submit each irregularity record of the plurality of irregularity records to an association machine learning model to obtain, according to a plurality of trained association parameters, at least one classification that is representative of a plurality of particular data irregularities of the plurality of data irregularities as being associated with a particular root cause event based at least in part on the at least one variable of the at least one dimension of each time-varying data point of each data irregularity;

wherein the at least one association machine learning model comprises at least one root cause model comprising the plurality of trained association parameters that are trained according to a respective plurality of independent event training data sets to classify the particular root cause event;

wherein the at least one detection model and the at least one association machine learning model are separate and distinct machine learning models;

automatically generate a root cause event record representing the particular root cause event, wherein the root cause event record links to a plurality of particular irregularity records of the plurality of particular data irregularities;

wherein the root cause event record comprises at least one root cause event attribute associated with at least one irregularity attribute of each particular irregularity record of the plurality particular irregularity records linked to the root cause event record; and automatically apply at least one subsequent change of the at least one root cause event attribute to the at least one irregularity attribute of each particular irregularity record.

12. The system of claim 11, wherein the at least one processor is further configured to receive an annotation to the root cause event record at least one computing device;
wherein the annotation comprises a modification to a root cause type.

13. The system of claim 12, wherein the at least one processor is further configured to cause to display an indication of the respective annotation in a visualization of the root cause event record on a screen of the at least one computing device associated with the at least one user.

14. The system of claim 11, wherein the detection model comprises:
i) a plurality of anomaly detection models, and
ii) a plurality of change-point detection models.

15. The system of claim 11, wherein the at least one processor is further configured to:
identify a set of related data irregularities associated with the at least one root cause event based on an association model trained to identify the at least one root cause event using the at least one variable and the at least one dimension of each time-varying data point associated with each data irregularity.

16. The system of claim 11, wherein the at least one processor is further configured to:
determine an anomaly classification for the plurality of particular data irregularities when the plurality of particular data irregularities are identified based at least in part on a classification model trained to recognize the anomaly classification using the at least one variable and the at least one dimension of each time-varying data point associated with each data irregularity.

17. The system of claim 16, wherein the at least one processor is further configured to:
determine a root cause type of the root cause event associated with the plurality of particular data irregularities when the anomaly classification for the plurality of particular data irregularities is determined based at least in part on a root cause model trained to recognize the root cause type using the anomaly classification of the plurality of particular data irregularities and the at least one variable and the at least one dimension of each time-varying data point associated with each particular data irregularity in the plurality of particular data irregularities.

18. The system of claim 11, wherein the at least one data set comprise transaction data representative of merchant transactions.

19. The system of claim 11, wherein the at least one processor is further configured to receive an annotation to the root cause event record by a user of the at least one user from a computing device of the at least one computing device;
wherein the annotation comprises a removal of a selected data irregularity from the plurality of particular data irregularities.

20. The system of claim 11, wherein the at least one processor is further configured to generate an event management graphical user interface (GUI) to enable a user to manage events linking one or more data irregularities of the plurality of data irregularities;
wherein the event management GUI comprises:
an event explorer view depicting each data irregularities of the plurality of data irregularities in a time-varying representation;
an event selection prompt selectable from the explorer view to enable user selection of a previously recorded event linking the one or more data irregularities of the plurality of data irregularities; and
an event modification prompt selectable from the event selection prompt to modify the event linking the one or more data irregularities; and
wherein the event modification prompt comprises user selectable event details comprising:
i) an event name,
ii) an event description, and
iii) an event classification.

* * * * *